(12) United States Patent
Yamaguchi et al.

(10) Patent No.: US 7,502,070 B2
(45) Date of Patent: Mar. 10, 2009

(54) METHOD AND APPARATUS FOR PROCESSING A DATA SERIES INCLUDING PROCESSING PRIORITY DATA

(75) Inventors: Takao Yamaguchi, Kyoto (JP); Minoru Etoh, Katano (JP); Hiroshi Arakawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/626,271

(22) Filed: Jul. 24, 2003

(65) Prior Publication Data

US 2004/0120345 A1 Jun. 24, 2004

Related U.S. Application Data

(62) Division of application No. 09/194,008, filed as application No. PCT/JP98/01084 on Mar. 13, 1998, now Pat. No. 6,674,477.

(30) Foreign Application Priority Data

| Mar. 17, 1997 | (JP) | ................................... | 9-062667 |
| Apr. 9, 1997 | (JP) | ................................... | 9-090640 |
| Jul. 4, 1997 | (JP) | ................................... | 9-179342 |
| Aug. 22, 1997 | (JP) | ................................... | 9-226027 |
| Aug. 22, 1997 | (JP) | ................................... | 9-226045 |
| Dec. 2, 1997 | (JP) | ................................... | 9-332101 |

(51) Int. Cl.
*H04N 7/12* (2006.01)
*H04N 7/16* (2006.01)
*H04N 7/26* (2006.01)

(52) U.S. Cl. .............................. 348/387.1; 375/240.02; 375/240.08; 375/240.26

(58) Field of Classification Search ............ 375/240.01, 375/240.02, 240.08, 240.26; 348/460, 465, 348/552; 725/58, 51, 55, 60, 61, 131–134, 725/139–142, 151–153, 112, 113, 35, 36; 726/30; 705/52

See application file for complete search history.

(56) References Cited

U.S. PATENT DOCUMENTS 4,593,194 A * 6/1986 Graham et al. ......... 250/231.16

(Continued)

FOREIGN PATENT DOCUMENTS

JP 63-73786 4/1988

(Continued)

OTHER PUBLICATIONS

H. Shimamura et al., "A Modeling of Multimedia Presentation with Quality Control", Research Report of Information Processing Society, 94-DPS-66-20, pp. 115-120, Jul. 8, 1994.

(Continued)

*Primary Examiner*—Victor R Kostak
(74) *Attorney, Agent, or Firm*—RatnerPrestia

(57) ABSTRACT

A reception control section 11 for receiving the information including data and its transmission format information from a memory or communication channel, a separating section 12 for analyzing and separating received information, a transmitting section 13 for transmitting information to a memory or transmission channel, a video extending section 14 for extending a video, and video-extension control section 15 control the processing state of said video extending section 14 for extending at least one or more videos and a video synthesizing apparatus constituted with a video synthesizing section 16 for synthesizing videos in accordance with extended information, an output section 17 for outputting a synthesized result, and a terminal control section 18 for controlling the above means makes it possible to synthesize a plurality of videos at the same time and correspond to a dynamic change of transmission format information.

21 Claims, 57 Drawing Sheets

U.S. PATENT DOCUMENTS

| | | | | |
|---|---|---|---|---|
| 4,672,606 | A | * | 6/1987 | Bourgonje et al. ........... 370/445 |
| 4,706,121 | A | * | 11/1987 | Young ........................... 348/27 |
| 4,879,611 | A | * | 11/1989 | Fukui et al. .................... 360/69 |
| 4,908,707 | A | * | 3/1990 | Kinghorn ..................... 348/460 |
| 5,038,211 | A | * | 8/1991 | Hallenbeck .................. 348/460 |
| 5,111,292 | A | * | 5/1992 | Kuriacose et al. ...... 375/240.01 |
| 5,151,789 | A | * | 9/1992 | Young ......................... 725/133 |
| 5,231,492 | A | | 7/1993 | Dangi et al. |
| 5,412,416 | A | * | 5/1995 | Nemirofsky .................. 725/36 |
| 5,420,801 | A | * | 5/1995 | Dockter et al. .............. 345/501 |
| 5,465,385 | A | * | 11/1995 | Ohga et al. .................... 725/58 |
| 5,512,939 | A | | 4/1996 | Zhou |
| 5,532,754 | A | * | 7/1996 | Young et al. ................... 725/47 |
| 5,535,216 | A | * | 7/1996 | Goldman et al. ............. 370/503 |
| 5,561,649 | A | * | 10/1996 | Lee et al. .................. 369/47.23 |
| 5,610,841 | A | * | 3/1997 | Tanaka et al. ................ 725/115 |
| 5,617,145 | A | | 4/1997 | Huang et al. |
| 5,657,414 | A | * | 8/1997 | Lett et al. ....................... 386/35 |
| 5,659,653 | A | * | 8/1997 | Diehl et al. .................... 386/46 |
| 5,686,954 | A | * | 11/1997 | Yoshinobu et al. ............ 725/43 |
| 5,699,362 | A | * | 12/1997 | Makam ....................... 370/437 |
| 5,699,474 | A | | 12/1997 | Suzuki et al. |
| 5,703,908 | A | * | 12/1997 | Mammone et al. .......... 375/278 |
| 5,784,522 | A | * | 7/1998 | Yamamura .................... 386/46 |
| 5,850,304 | A | * | 12/1998 | Elmers et al. ................ 398/107 |
| 5,856,979 | A | * | 1/1999 | Vogel et al. .................. 370/503 |
| 5,928,330 | A | | 7/1999 | Goetz et al. |
| 5,931,908 | A | * | 8/1999 | Gerba et al. ................. 709/219 |
| 5,953,694 | A | * | 9/1999 | Pillekamp ................... 704/201 |
| 6,008,802 | A | * | 12/1999 | Iki et al. ...................... 715/721 |
| 6,021,432 | A | * | 2/2000 | Sizer et al. ................... 709/217 |
| 6,025,837 | A | * | 2/2000 | Matthews et al. ............ 715/721 |
| 6,038,545 | A | * | 3/2000 | Mandeberg et al. ............ 705/15 |
| 6,088,360 | A | | 7/2000 | Amaral et al. |
| 6,094,457 | A | | 7/2000 | Linzer et al. |
| 6,097,878 | A | * | 8/2000 | Saib ............................. 386/83 |
| 6,101,025 | A | * | 8/2000 | Naganuma ............. 359/341.33 |
| 6,108,706 | A | * | 8/2000 | Birdwell et al. ............. 709/229 |
| 6,144,709 | A | * | 11/2000 | Piirainen et al. ............. 375/343 |
| 6,205,490 | B1 | * | 3/2001 | Karapetkov et al. ......... 709/249 |
| 6,208,799 | B1 | * | 3/2001 | Marsh et al. ................... 386/83 |
| 6,215,762 | B1 | * | 4/2001 | Dent ........................... 370/208 |
| 6,324,694 | B1 | * | 11/2001 | Watts et al. .................... 725/32 |
| 6,351,467 | B1 | * | 2/2002 | Dillon ......................... 370/432 |
| 6,388,997 | B1 | * | 5/2002 | Scott ........................... 370/280 |
| 6,469,753 | B1 | * | 10/2002 | Klosterman et al. ......... 348/552 |
| 6,674,958 | B2 | * | 1/2004 | Wehmeyer et al. ............ 386/83 |
| 6,732,369 | B1 | * | 5/2004 | Schein et al. ................. 725/39 |
| 6,990,680 | B1 | * | 1/2006 | Wugofski ..................... 725/58 |

FOREIGN PATENT DOCUMENTS

| | | |
|---|---|---|
| JP | 02-86241 | 3/1990 |
| JP | 03-276941 | 12/1991 |
| JP | 04-003684 | 1/1992 |
| JP | 04-92536 | 3/1992 |
| JP | 05-30138 | 2/1993 |
| JP | 05-64167 | 3/1993 |
| JP | 05-137125 | 6/1993 |
| JP | 05-244435 | 9/1993 |
| JP | 05-327758 | 12/1993 |
| JP | 06-70307 | 3/1994 |
| JP | 06-276480 | 9/1994 |
| JP | 06-339137 | 12/1994 |
| JP | 06-350649 | 12/1994 |
| JP | 07-264573 | 10/1995 |
| JP | 07-312756 | 11/1995 |
| JP | 08-18524 | 1/1996 |
| JP | 08-149420 | 6/1996 |
| JP | 08-294123 | 11/1996 |
| JP | 09-98430 | 4/1997 |
| JP | 09-191453 | 7/1997 |
| JP | 09-214447 | 8/1997 |
| JP | 10-164530 | 6/1998 |
| JP | 10-232658 | 9/1998 |
| JP | 10-243374 | 9/1998 |

OTHER PUBLICATIONS

S. Oh et al., "The QoS Architecture in the Distributed Multimedia System Symphony", Research Report of Information Processing Society, 95-DPS-70-7, pp. 39-44, May 25, 1995.

Hiroshi Fujiwara "Saishin MPEG Kyokasho", ASCII, pp. 236-237, Aug. 1, 1994 (with partial English translation).

Notice of Reasons of Rejection for Japanese Application No. 2002-230064 mailed Jan. 7, 2003 (with English translation).

Decision of Rejection for Japanese Application No. 10-065581 mailed Jan. 7, 2003 (with partial English translation).

K. Hashimoto et al., "QoS Guarantee Functions for Continuous Media Services", Research Report of Information Processing Society, vol. 95, No. 61, 95-DPS-71, pp. 97-102, Jul. 13, 1995.

D. Horie et al., "Realization of An Audio Adjustment Mechanism Considering Environment In A Distributed Multimedia System", Research Report of Information Processing Society, vol. 96, No. 20, 96-DPS-75, pp. 79-84, Mar. 1, 1996.

T. Yamaguchi et al., "Synchronized Audio and Visual Decoding and Transmission Scheme that is tolerant to Variation of Processing Environment", Research Report of Information Processing Society, vol. 98, No. 15, 98-OS-77 and 98-DPS-87-, pp. 147-153, Feb. 27, 1998.

T. Nakajima, "Operating System Supports for Continuous Media", ITE Technical Report vol. 18, No. 39, pp. 43-48, Jul. 7, 1994.

Notice of Reasons for Rejection mailed Sep. 17, 2002 for corresponding Japanese patent application.

Latest MPEG Handbook, Ascll Corporation, Tokyo, Dec. 21, 1995, p. 102-107 and 236-237.

Japanese language search report for Int'l Appln. No. PCT/JP98/01084 dated Jul. 21, 1998.

English translation of Japanese language search report.

Tatsuo Nakajima, "Continuous Media Objects with Media Scaling," Proceedings of the Internal Conference, 1998.

* cited by examiner

Fig. 3

○ Information showing start position capable of processing data or not

- Flag for random access (Random access flag), e.g. Intra-frame (I-picture) in the case of picture

- Flag showing access unit (Access flag), e.g. Frame in the case of picture, GOB unit AL : Adaptation layer
ES : Elementary stream
PTS : Presentation·time·stamp Header information of data — Data (Picture or sound for each frame)

| AL | ES |

- Information showing start position capable of processing data or not
- Information showing data reproducing time (PTS)
- Information showing data processing priority Fig. 4
○TS:Transport stream(Transmission packet)
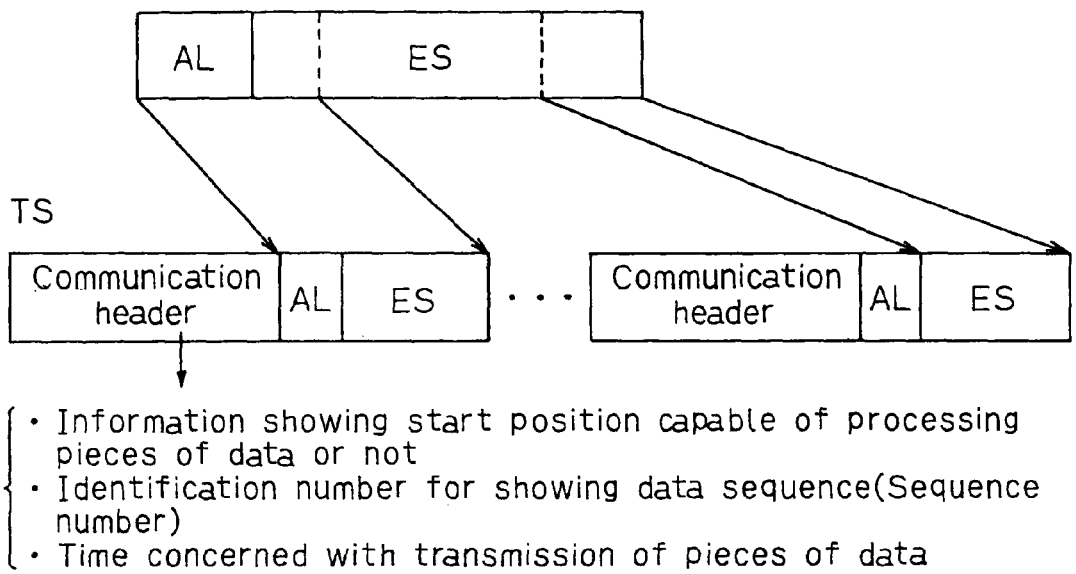
- Information showing start position capable of processing pieces of data or not
- Identification number for showing data sequence(Sequence number)
- Time concerned with transmission of pieces of data
○Handling time stamp and marker bit
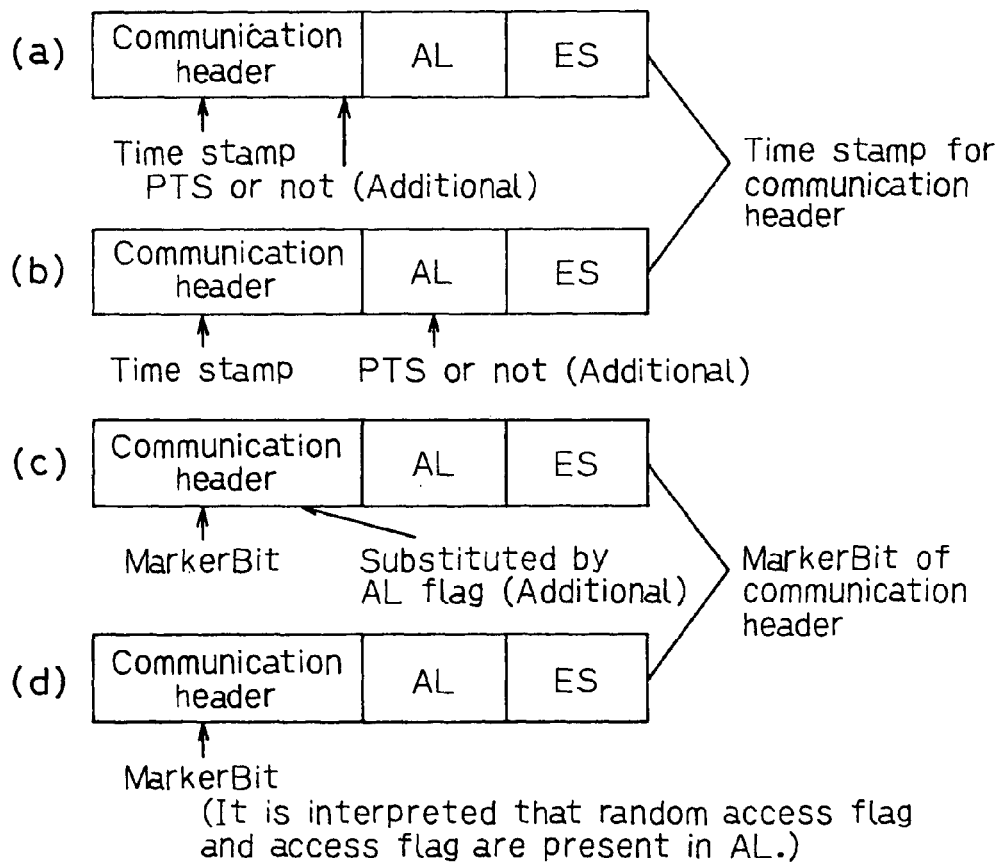
(It is interpreted that random access flag and access flag are present in AL.)

Fig. 6(a)

Method for making the most use of RTP base

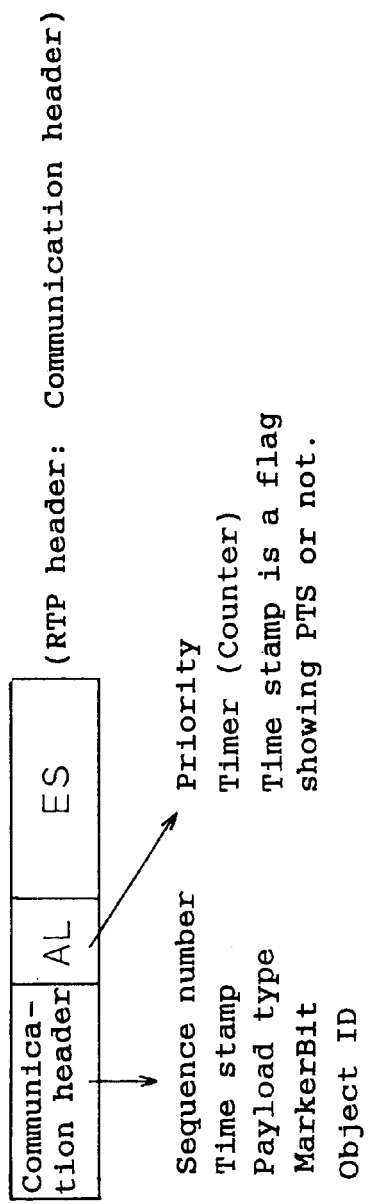

(RTP header: Communication header)

Sequence number
Time stamp
Payload type
MarkerBit
Object ID

Priority
Timer (Counter)
Time stamp is a flag showing PTS or not.

Fig. 6(b)

Method for simplifying the communication header

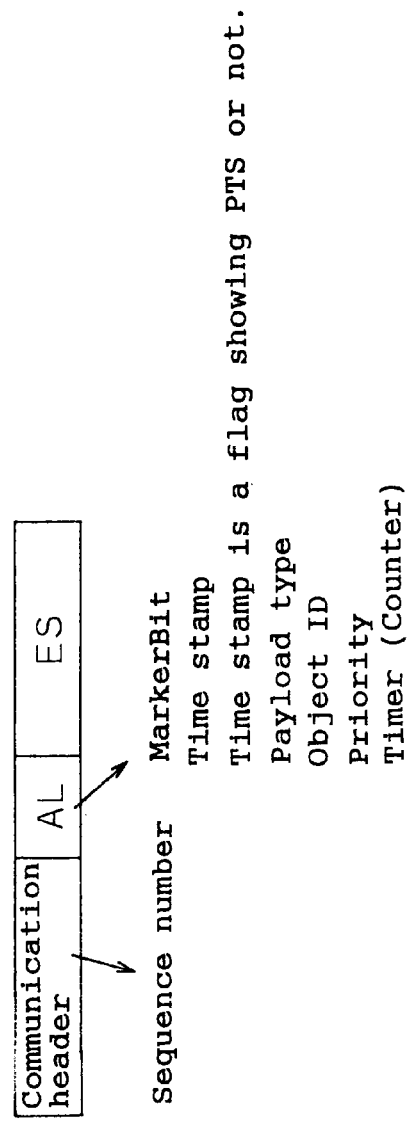

Sequence number
MarkerBit
Time stamp
Time stamp is a flag showing PTS or not.
Payload type
Object ID
Priority
Timer (Counter)

Fig. 6(c) Method for changing every AL information to communication header

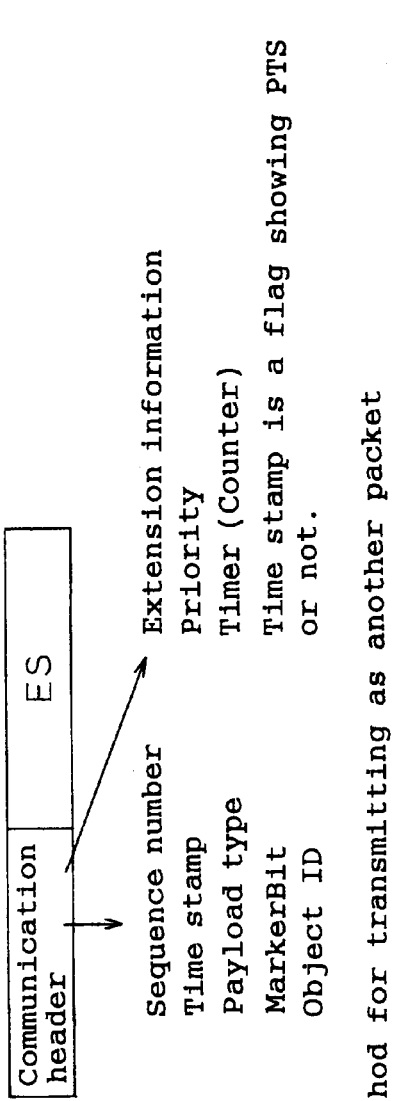

Sequence number
Time stamp
Payload type
MarkerBit
Object ID

Extension information
Priority
Timer (Counter)
Time stamp is a flag showing PTS or not.

Fig. 6(d) Method for transmitting as another packet

Object ID
Time stamp is a flag showing PTS or not.
Payload type
Priority
Timer (Counter)

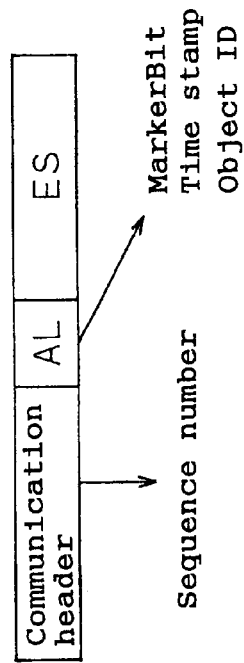

MarkerBit
Time stamp
Object ID

Sequence number

Fig. 8

Broadcast program transmitting procedure

⟨Broadcast type and communication type including return channel⟩

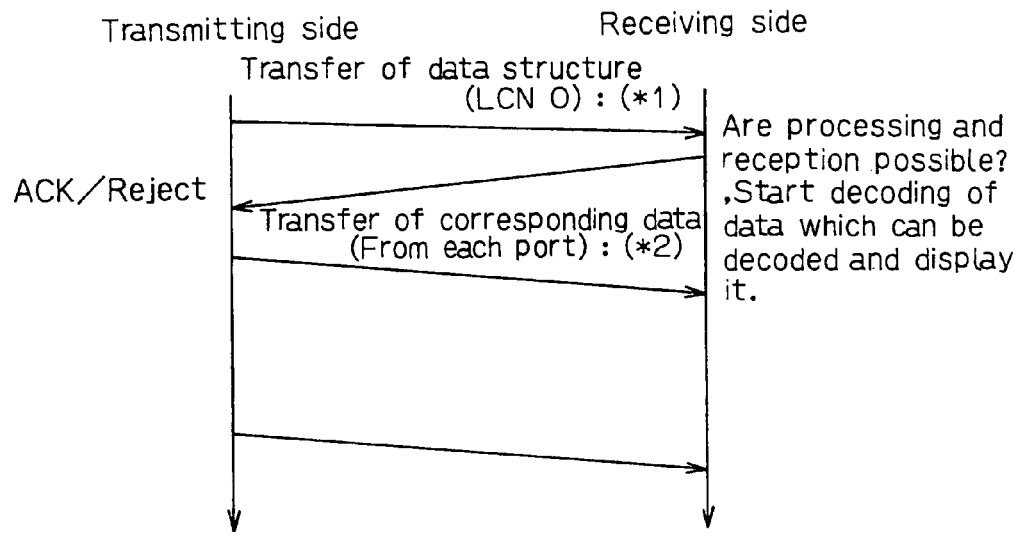

⟨Broadcast type (with no return channel)⟩

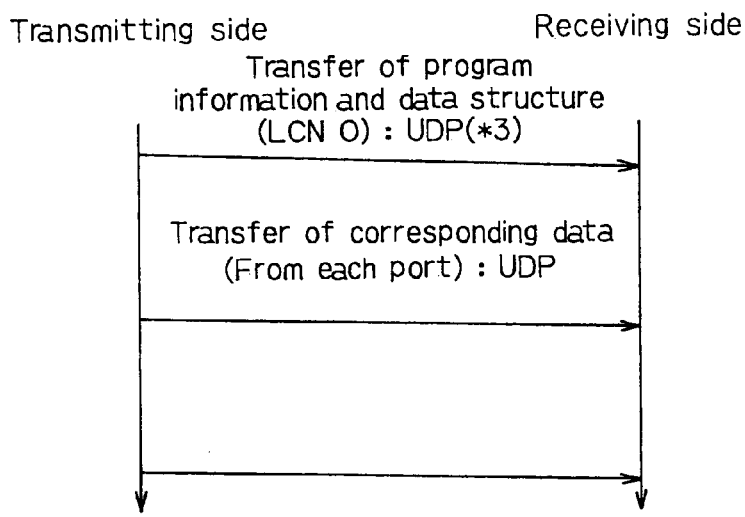

(*1) Must be a system for detecting and retransmitting a packet loss like TCP.
(*2) RTP/RTCP or TCP/IP
(*3) Same data (picture or sound) or control information (broadcast program or data structure) is continuously repeatedly transmitted. A packet is detected and sequence is kept at a receiving terminal in accordance with a sequence number. (To be used in a local closed region. Traffic becomes too large.)

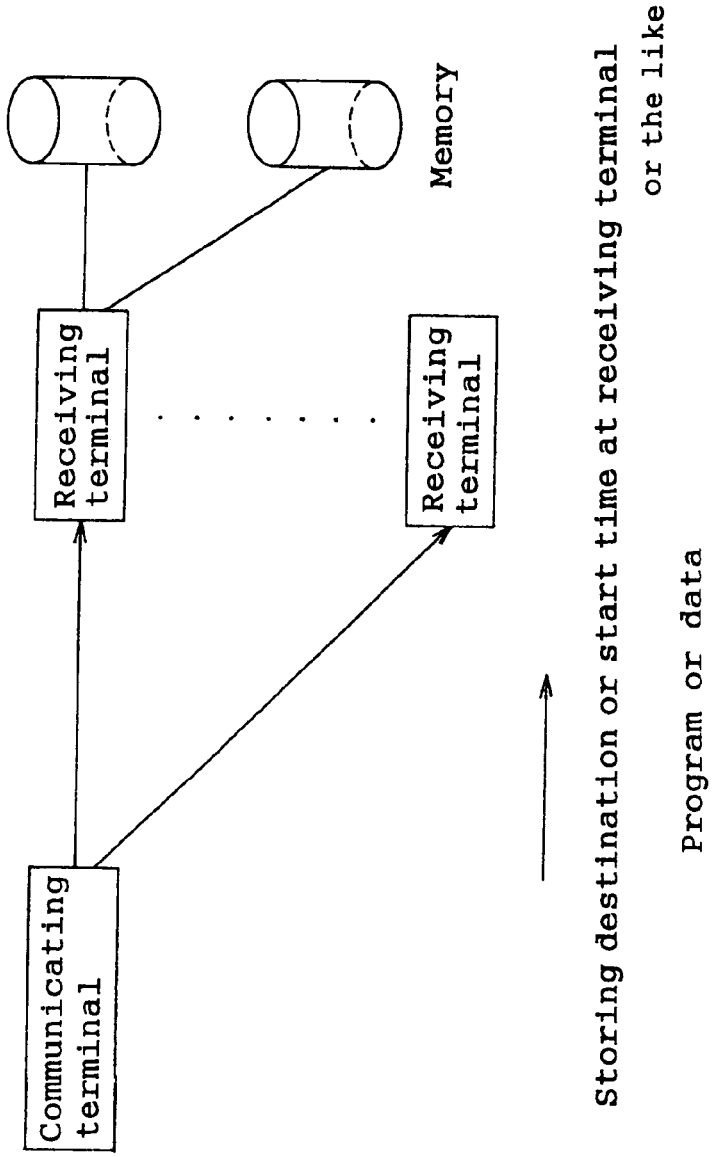

Fig. 11(a)
<Hierarchical image of object>
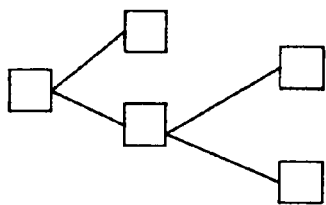
<Transmission image of object>
<1. Broadcast type>
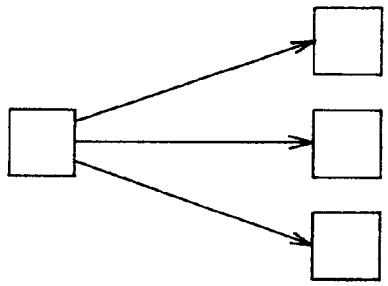
<2. Communication type>
RTP/RTCP (Program ID of each logical
channel is fixed.)
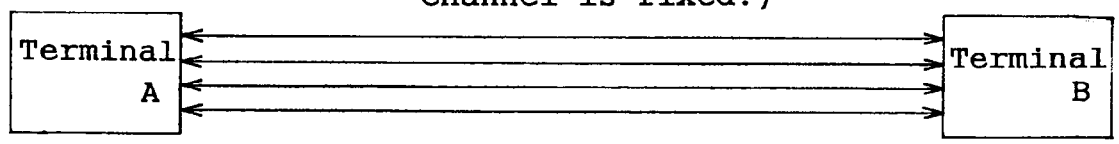
LCN0 (control)

Fig. 11(b)

```
==============================
-Capability exchange definitions(original from H.245)
==============================
TerminalCapabilitySet              ::=SEQUENCE
{
  sequenceNumber                   SequenceNumber, multiplexCapability              MultiplexCapabilityOPTIONAL
  capabilityTable                  SET SIZE(1..256) OF Capability
                                   TableEntryOPTIONAL,
  capabilityDescriptors            SET SIZE(1..256) OF Capability
                                   DescriptorOPTIONAL,
  mpeg4Capability                  MPEG4CapabilityOPTIONAL.
  ...
}
```

Fig. 12

```
===============================================
-MPEG4 Capability definitions
===============================================
MPEG4Capability                  ::=SEQUENCE
{
  sequenceNumber                 SequenceNumber,
  NumberOfProcessObject          SEQUENCE
  {
      MaxNumberOfVideo           INTEGER(0..1023),
      ...
      MaxNumberOfSounds          INTEGER(0..1023),
      ...
      MaxNumberOfMux             INTEGER(0..1023),
  }
  reconfigurationALCapability    BOOLEAN,
  ...
}
MPEG4CapabilityAck               ::=SEQUENCE
{
  sequenceNumber                 SequenceNumber,
  ...
}
MPEG4CapabilityReject            ::=SEQUENCE
{
  sequenceNumber                 SequenceNumber,
  NumberOfProcessObject          SEQUENCE
  {
      maxNumberOfVideo           MaxNumberOfVideo,
      ...
      maxNumberOfSounds          MaxNumberOfSounds
      ...
      MaxNumberOfMux             maxNumberOfMux,
  }
  reconfigurationALCapability    BOOLEAN,
  ...
}
```

Fig. 13(a)

```
==========================================
-Group MUX definitions
==========================================
CreateGroupMux                  ::=SEQUENCE
{
  sequenceNumber                SequenceNumber,
  GroupMuxID                    INTEGER(0..1023),
  lanportNumber                 LANPortNumber,
  ...
}
CreateGroupMuxAck               ::=SEQUENCE
{
  sequenceNumber                SequenceNumber,
  ...
}
CreateGroupMuxReject            ::=SEQUENCE
{
  sequenceNumber                SequenceNumber,
  cause                         CHOICE
  {
     ...
  }
  ...
}
```

Fig. 13(b)

```
DestoryGroupMux              ::=SEQUENCE
{
  sequenceNumber             SequenceNumber,
  GroupMuxID                 INTEGER(0..1023),
  ...
}
DestoryGroupMuxAck           ::=SEQUENCE
{
  sequenceNumber             SequenceNumber,
  ...
}
DestoryGroupMuxReject        ::=SEQUENCE
{
  sequenceNumber             SequenceNumber,
  cause                      CHOICE
  {
     ...
  }
  ...
}
```

Fig. 13(c)

```
PortNumberStructure              ::=SEQUENCE
{
  sequenceNumber                 SequenceNumber,
  lanPortNumber                  LANPortNumber,
  numberOfLogicalNumber          INTEGER(1..15),
  SEQUENCE SIZE(1..15) OF PortStructureElement,
  ...
}
PortStructureElement             ::=SEQUENCE
{
  logicalPortNumber              LogicalPortNumber,
  ...
}
PortNumberStructureAck           ::=SEQUENCE
{
  sequenceNumber                 SequenceNumber,
  ...
}
PortNumberStructureReject        ::=SEQUENCE
{
  sequenceNumber                 SequenceNumber,
  cause                          CHOICE
  {
    ...
  }
  ...
}
```

Fig. 14

```
==========================================
 —Logical channel signalling definitions(original from H.245)
 —MPEG4 Object Create Operation(for LANPortNumber)
==========================================
OpenLogicalChannel              ::=SEQUENCE
{
    fowardLogicalChannelNumber      LogicalChannelNumber, fowardLogicalChannelParameters  SEQUENCE
    {
      portNumber                    INTEGER(0..65535)OPTIONAL,
      dataType                      DataType,
      multiplexParameters           CHOICE
      {
        h222LogicalChannelParameters   H222LogicalChannelParameters,
        h223LogicalChannelParameters   H223LogicalChannelParameters,
        v76LogicalChannelParameters    v76LogicalChannelParameters,
        ...,
        h2250LogicalChannelParameters  H2250LogicalChannelParameters,
        h223AnnexALogicalChannelParameters
        H223AnnexALogicalChannelParameters
        MPEG4LogicalChannelParameters  MPEG4LogicalChanelParameters,
        ...
      },
      ...,
    },
    ...,
}
```

Fig. 15

```
MPEG4LogicalChannelParameters    ::=SEQUENCE
{
    -H.225BASE                   INTEGER(0..65535),
    LANportNumber                INTEGER(0..255),
    ProgramID
    ProgramName                  OCTETSTRING(SIZE(128)),
    ...
}
BroadcastChannelProgram          ::=SEQUENCE
{
    sequenceNumber               SequenceNumber,
    numberOfChannelNumber        INTEGER(0..1023),
    SEQUENCE SIZE(1..1023) OF MPEG4LogicalChannelParameters
}
ChangeLogicalChannelAttribute    ::=SEQUENCE
{
    sequenceNumber               SequenceNumber
    lanportNumber                LANPortNumber,
    ProgramID                    INTEGER(0..255),
    ...
}
ChangeLogicalChannelAttributeAck ::=SEQUENCE
{
    sequenceNumber               SequenceNumber,
    ...
}
ChangeLogicalChannelAttributeReject ::=SEQUENCE
{
    sequenceNumber               SequenceNumber,
    cause                        CHOICE
    {
        ...
    }
    ...
}
```

Fig. 16(a)

```
=======================================
-MPEG4 Object Class definition
=======================================
MPEG4 Object Class definition       ::=SEQUENCE
{
    sequenceNumber          SequenceNumber,
    ProgramID               INTEGER(0..255),
    NumberOfObjectsList     INTEGER(0..1023),
    SEQUENCE SIZE(1..1023) OF ObjectStructureElement
}
ObjectStructureElement              ::=SEQUENCE
{
    SSRC                    INTEGER(0..16777215),
    LANPortNumber           INTEGER(1024.5000),
O                                   --forRPT(Video&Sound)
    ScrambleFlag            BOOLEAN,
CGDOffset                   INTEGER(0..255),
MediaType                   INTEGER(0..255),
...

}

MPEG4 Object Class definitionAck    ::=SEQUENCE
{
    sequenceNumber          SequenceNumber,
    ...

}
MPEG4 Object Class definitionReject ::=SEQUENCE
{
    sequenceNumber          SequenceNumber,
    cause                   CHOICE
    {
        ...
    }
    ...
}
```

Fig. 16(b)

```
==========================================
-Adaptation Layer Reconfiguration Request definitions
==========================================
ALReconfiguration                  ::=CHOICE
{
  sequenceNumber                   SequenceNumber,
  RandomAccessFlagMaxBit           INTEGER(0...2),
  PresentationTimeStampsMaxBit     INTEGER(0...32),
  CGDPriorityMaxBit                INTEGER(0...8),
                                     --forVideo and Sound
  ...
}
==========================================
-Adaptation Layer Reconfiguration Response definitions
==========================================
ALReconfigurationAck               ::=SEQUENCE
{
  sequenceNumber                   SequenceNumber,
  ...
}
ALReconfigurationReject            ::=SEQUENCE
{
  sequenceNumber                   SequenceNumber,
  cause                            CHOICE
    {
        ...
    }
  ...
}
```

<Relation between AL, ES, and RTP>

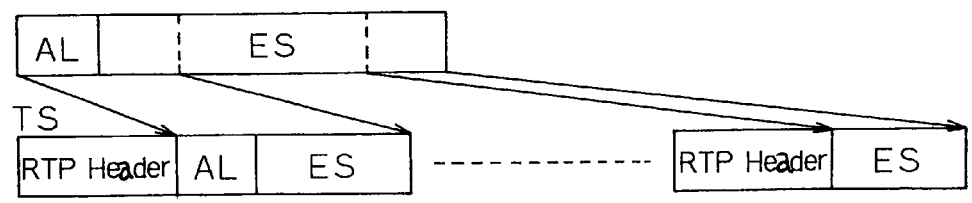

Fig. 17

```
==========================================
-Setup Program and Data Request definitions
==========================================
Setup Request                    ::=CHOICE
{
  sequenceNumber                 SequenceNumber,
  SSRC IMEGER(0..16777215)2^32,
  Logical Channel Number,        INTEGER(1024...5000),
  setupitem                      CHOICE
  {
    executeProgramNumber         INTEGER(0...255),
    dataNumber                   INTEGER(0...255),
    executeCommandNumber         INTEGER(0...255),
  },
  nofitycounter                  CHOICE
  {
    flag                         BOOLEAN
    counter                      INTEGER(0...255),
    timer                        INTEGER(0...255),
  },
  ...,
}
```

Fig. 18

```
===========================================
=
-control and AL attribute definitions
===========================================

ControlALdefinition              ::=CHOICE
{
   sequenceNumber                SequenceNumber,
   AL                            CHOICE
   {
      RandomAccessFlagUse        BOOLEAN,
      PresentationTimeStampUse   BOOLEAN,
      CGDPriorityUse             BOOLEAN,
      ...
   },
```

Fig. 19(a)

```
classES_header{
    uint(4)     headerID;
    uint(24)    bufferSizeES;
    uint(1)     useTimeStamps;
    . . . . . . .
    . . . . . . .
    uint(16)    sequenceNumberMaxBit;
    uint(1)     useHeaderExtension;
    if (useHeaderExtension){
                uint(1)     accessUintStartFlag;
                uint(1)     randomAccessPointFlag;
                uint(1)     OCRsetFlag;
                uint(4)     degradationPriorityMaxBit;
    }
    uint(3)     reserved:
}
```

Fig. 19(b)

```
========================================
 —Adaptation Layer PDU header configuration Request and Command definition
========================================
AL configuration                  ::=SEQUENCE
{
    sequenceNumber                SequenceNumber,
    defaultHeaderConfiguration    BOOLEAN,
    headerID                      INTEGER(0..4),
    MPEG4ALPDUHeaderConfig        SEQUENCE
    {
        accessUintStartFlag       BOOLEAN,
        randomAccessPointFlag     BOOLEAN,
        OCRsetFlag                BOOLEAN,
        degradationPriorityMaxBit INTEGER(0..4),
        ...
    }
}
```

Fig. 28(c)
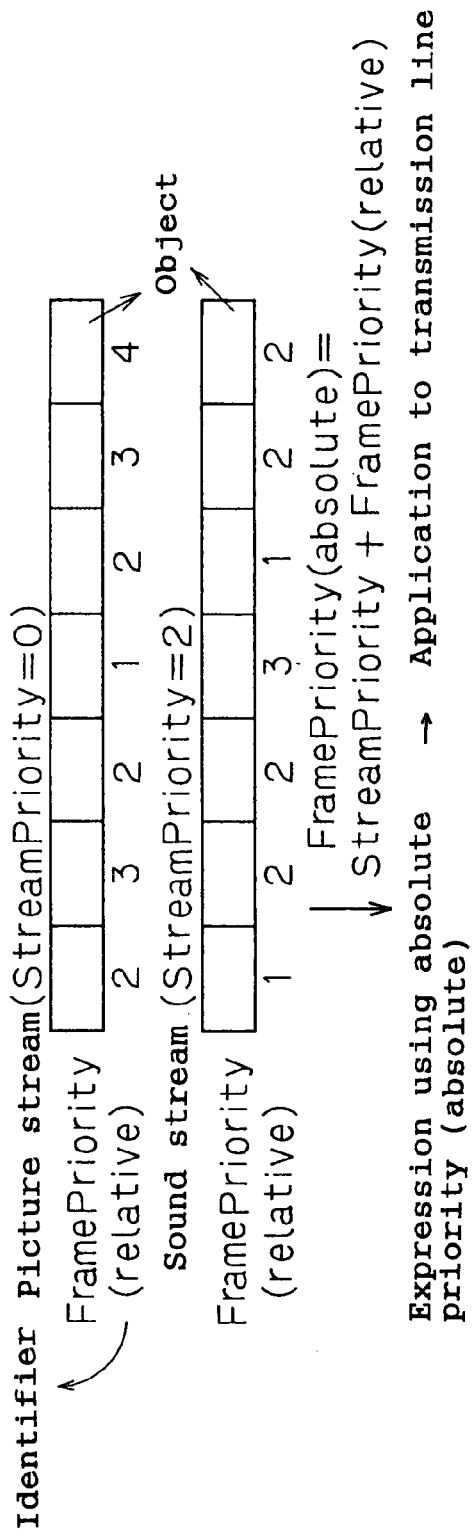
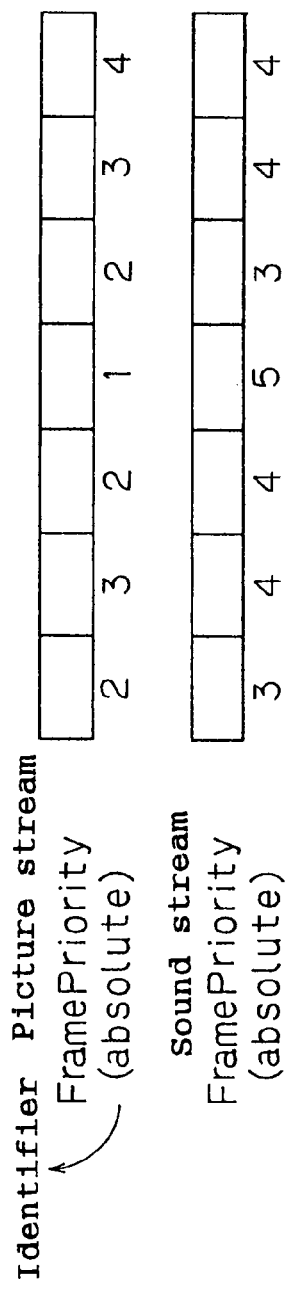

| Description method |
|---|
| Stream A AND stream B |
| Stream A OR stream B |
| Stream A EX-OR stream B |

Fig. 31

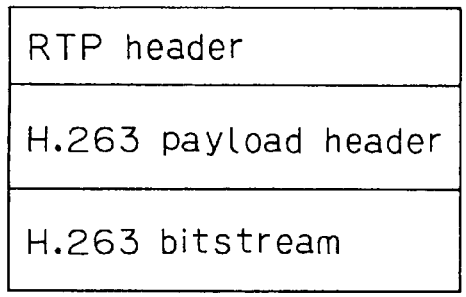

o Mode A: GOB, picture boundary

Presence or absence of mode or PB, start
and end positions of bit stream, and        Core
execution timing states of options of     ⟶ infor-
resolution, frame type, and H.263         mation DBQUANT,TR(for B frame),  ⟶ To be set when
    TR(for P frame)             PB frame is present o Mode B: MB boundary without PB Core information for Mode A Information for quantization value (GQUANT), GOB number,
absolute address of first MB in GOB, and movement vector
(Horizontal and vertical directions)

o Mode C: MB boundary with PB

Information for Mode B

DBQUANT,TR(for B frame),TR(for P frame)

Relating of communication payload

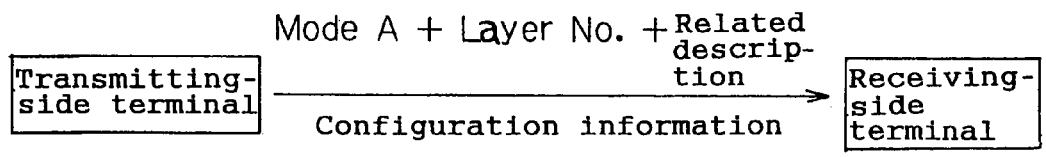

METHOD AND APPARATUS FOR PROCESSING A DATA SERIES INCLUDING PROCESSING PRIORITY DATA

This application is a divisional of U.S. patent application Ser. No. 09/194,008, filed Mar. 17, 1999, now U.S. Pat. No. 6,674,477 which is a U.S. National Phase Application of PCT International Application PCT/JP98/01084 filed Mar. 13, 1998.

TECHNICAL FIELD

The present invention relates to audio-video transmitter and audio-video receiver, data-processing apparatus and method, waveform-data-transmitting method and apparatus and waveform-data-receiving method and apparatus, and video-transmitting method and apparatus and video-receiving method and apparatus.

BACKGROUND ART

There has been an apparatus which satisfies the sense of real existence that a counterpart is present in front of you and aims at realistic picture communication by extracting, for example, a person's picture out of the scenery picture of a space in which you are present and superimposing the person's picture, a person's picture sent from the counterpart, and the picture of a virtual space to be displayed commonly with a previously-stored counterpart on each other and displaying them (Japanese Patent Publication No. 4-24914).

Particularly, in the case of the prior art, inventions concerned with acceleration for performing picture synthesis and a method for reducing memories are made (e.g. Official gazette of Japanese Patent Publication No. 5-46592: Picture synthesizer).

Though a communication system using picture synthesis for synthesizing two-dimensional static pictures or three-dimensional CG data has been proposed by the prior art, specific discussion on a method for realizing a system for simultaneously synthesizing a plurality of video(picture) and a plurality of audio and displaying them has not been performed from the following viewpoints.

That is, there has been a problem that no specific discussion has been performed from the following viewpoints:

(A1) a method for transmitting (communicating and broadcasting) and controlling pictures and audio under the environment in which data and control information (information transmitted by a packet different from that of data to control the processing of terminal side) are independently transmitted by using a plurality of logical transmission lines constructed by software on one real transmission line or more;

(A2) a method for dynamically changing header information (corresponding to data control information of the present invention) to be added to data for a picture or audio to be transmitted;

(A3) a method for dynamically changing header information (corresponding to transmission control information of the present invention) to be added for transmission;

(A4) a method for transmitting information by dynamically multiplexing and separating a plurality of logical transmission lines;

(A5) a method for transmitting pictures and audio considering the read and rise periods of program or data; and (A6) a method for transmitting pictures and audio considering zapping.

However, the method for changing encoding systems and a method of discussing data in frames in accordance with the frame type of a picture have been proposed so far as a method for dynamically adjusting the amount of data to be transmitted to a network (H. Jinzenji and T. Tajiri, A study of distributive-adaptive-type VOD system, D-81, System Society of Institute of Electronics, Information and Communication Engineers (IEICE) (1995)).

A dynamic throughput scalable algorithm capable of providing a high-quality video under a restricted processing time is proposed as a method for adjusting throughput at the encoder side (T. Osako, Y. Yajima, H. Kodera, H. Watanabe, K. Shimamura: Encoding of software video using a dynamic throughput scalable algorithm, Thesis Journal of IEICE, D-2, Vol. 80-D-2, No. 2, pp. 444-458 (1997)).

Moreover, there is an MPEG1/MPEG2 system as an example of realizing synchronous reproduction of video and audio.

(B1) The conventional method for discussing a picture correspondingly to the frame type of the video has a problem that it is difficult to preponderantly reproduce an important scene cut synchronously with audio by handling a plurality of video streams or a plurality of audio streams and reflecting the intention of an editor because the grading of the information which can be handled is in a single stream.

(B2) Moreover, it must be possible that a decoder decodes every supplied bit stream because it is a prerequisite that MPEG1/MPEG2 is realized by hardware. Therefore, it is a problem how to correspond to the case of exceeding the throughput of the decoder.

Moreover, to transmit video, there have been some systems including a system such as H.261 (ITU-T Recommendation H.261-Video codec for audio-visual services at px 64) and they have been mounted by hardware. Therefore, the case has not occurred that decoding is not completed within a designated time because of considering the upper limit of a necessary performance when designing hardware.

The above-designated time denotes a time required to transmit a bit stream obtained by coding a sheet of video. If decoding is not completed within the time, an extra time becomes a delay. If the delay is accumulated, the delay from the transmitting side to the receiving side increases and the system cannot be used as a video telephone. This state must be avoided.

Moreover, when decoding cannot be completed within a designated time because a communication counterpart generates an out-of-spec bit stream, a problem occurs that a video cannot be transmitted.

The above problem occurs not only for a video but also for audio data.

However, in recent years, because the network environment formed by personal computers (PCs) has been arranged as the result of spread of internet and ISDN, the transmission rate has been improved and it has been possible to transmit a video by using PCs and a network. Moreover, requests for transmission of video by users have been rapidly increased. Furthermore, a video can be completely decoded by software because CPU performances have been improved.

However, because the same software can be executed by personal computers different in structure such as a CPU, bus width, or accelerator, it is difficult to previously consider the upper limit of a necessary performance and therefore, a problem occurs that a picture cannot be decoded within a designated time.

Moreover, when coded data for a video having a length exceeding the throughput of a receiver is transmitted, coding cannot be completed within a designated time.

Problem (C1): Decreasing a delay by decoding a picture within a designated time.

When inputting a video as the waveform data of the present invention or outputting a video as the waveform data of the present invention as means for solving the problem 1, a problem may be left that the substantial working efficiency of a transmission line is lowered because a part of a transmitted bit stream is not used. Moreover, there are some coding systems that generate a present decoded video in accordance with a last decoded picture (e.g. P picture). However, because the last decoded picture is not completely restored by the means for solving the problem 1, there is a problem that deterioration of the picture quality influentially increases as time passes.

Problem (C2): In the case of the means for solving the problem 1, the substantial working efficiency of a transmission line is lowered. Moreover, picture-quality deterioration is spread.

Furthermore, in the case of mounting by software, the frame rate of a picture is determined by the time required for one-time coding. Therefore, when the frame rate designated by a user exceeds the throughput of a computer, it is impossible to correspond to the designation.

Problem (C3): When the frame rate designated by a user exceeds the throughput of a computer, it is impossible to correspond to the designation.

DISCLOSURE OF THE INVENTION

When considering the problems (A1) to (A6), it is an object of the present invention to provide an audio-video transmitter and audio-video receiver and data-processing apparatus and method in order to solve at least any one of the problems.

Moreover, when considering the problems (B1) and (B2), it is another object of the present invention to provide data-processing apparatus and method in order to solve at least one of the problems.

Furthermore, when considering the problems (C1) to (C3), it is still another object of the present invention to provide waveform-data-receiving method and apparatus and waveform-data-transmitting method and apparatus, and video-transmitting method and apparatus and video-receiving method and apparatus in order to solve at least one of the problems.

The present invention is an audio-video transmitting apparatus comprising transmitting means for transmitting the content concerned with a transmitting method and/or the structure of data to be transmitted or an identifier showing the content as transmission format information through a transmission line same as that of the data to be transmitted or a transmission line different from the data transmission line; wherein One aspect of the present invention is the audio-video transmitting apparatus, wherein said transmission format information is included in at least one of data control information added to said data to control said data, transmission control information added to said data to transmit said data, and information for controlling the processing of the terminal side.

Another aspect of the present invention is the audio-video transmitting apparatus, wherein at least one of said data control information, transmission control information, and information for controlling the processing of said terminal side is dynamically changed.

Still another aspect of the present invention is the audio-video transmitting apparatus, wherein said data is divided into a plurality of packets, and said data control information or said transmission control information is added not only to the head packet of said divided packets but also to a middle packet of them.

Yet another aspect of the present invention is the audio-video transmitting apparatus, wherein an identifier showing whether to use timing information concerned with said data as information showing the reproducing time of said data is included in said transmission format information.

Still yet another aspect of the present invention is the audio-video transmitting apparatus, wherein said transmission format information is the structural information of said data and a signal which is output from a receiving apparatus receiving the transmitted structural information of said data and which can be received is confirmed and thereafter, said transmitting means transmits corresponding data to said receiving apparatus.

A further aspect of the present invention is the audio-video transmitting apparatus, wherein said transmission format information include (1) an identifier for identifying a program or data to be used by a receiving apparatus later and (2) at least one of a flag, counter, and timer as information for knowing the point of time in which said program or data is used or the term of validity for using said program or data.

Still a further aspect of the present invention is the audio-video transmitting apparatus, wherein said point of time in which said program or data is used is transmitted as transmission control information by using a transmission serial number for identifying a transmission sequence or as information to be transmitted by a packet different from that of data to control terminal-side processing.

Still yet a further aspect of the present invention is the audio-video transmitting apparatus, wherein storing means for storing a plurality of contents concerned with said transmitting method and/or said structure of data to be transmitted and a plurality of its identifiers are included, and said identifier is included in at least one of said data control information, transmission control information, and information for controlling terminal-side processing as said transmission format information.

Another aspect of the present invention is the audio-video transmitting apparatus, wherein storing means for storing a plurality of contents concerned with said transmitting method and/or said structure of data to be transmitted are included, and Still another aspect of the present invention is the audio-video transmitting apparatus, wherein a default identifier showing whether to change the contents concerned with said transmitting method and/or structure of data to be transmitted is added.

Still yet another aspect of the present invention is the audio-video transmitting apparatus, wherein said identifier or said default identifier is added to a predetermined fixed-length region of information to be transmitted or said predetermined position.

A further aspect of the present invention is an audio-video receiving apparatus comprising: receiving means for receiving said transmission format information transmitted from the audio-video transmitting apparatus; and transmitted-information interpreting means for interpreting said received transmission-format information.

A still further aspect of the present invention is the audio-video receiving apparatus, wherein storing means for storing a plurality of contents concerned with said transmitting method and/or said structure of data to be transmitted and a plurality of its identifiers are included, and the contents stored in said storing means are used to interpret said transmission format information.

A still yet further aspect of the present invention is an audio-video transmitting apparatus comprising: information multiplexing means for controlling start and end of multiplexing the information for a plurality of logical transmission lines for transmitting data and/or control information is included; wherein, not only said data and/or control information multiplexed by said information multiplexing means but also control contents concerned with start and end of said multiplexing by said information multiplexing means are transmitted as multiplexing control information, and said data includes video data and/or audio data.

Another aspect of the present invention is the audio-video transmitting apparatus, wherein it is possible to select whether to transmit said multiplexing control information by arranging said information without multiplexing it before said data and/or control information or transmit said multiplexing control information through a transmission line different from the transmission line for transmitting said data and/or control information.

Still another aspect of the present invention is an audio-video receiving apparatus comprising: receiving means for receiving said multiplexing control information transmitted from the audio-video transmitting apparatus of claim 15 and said multiplexed data and/or control information; and separating means for separating said multiplexed data and/or control information in accordance with said multiplexing control information.

Yet another aspect of the present invention is an audio-video receiving apparatus comprising: main looking-listening means for looking at and listening to a broadcast program; and auxiliary looking-listening means for cyclically detecting the state of a broadcast program other than the broadcast program looked and listened through said main looking-listening means; wherein said detection is performed so that a program and/or data necessary when said broadcast program looked and listened through said main looking-listening means is switched to other broadcast program can be smoothly processed, and said data includes video data and/or audio data.

Still yet another aspect of the present invention is the audio-video transmitting apparatus, wherein priority values can be changed in accordance with the situation by transmitting the offset value of information showing the priority for processing of said data.

A further aspect of the present invention is an audio-video receiving apparatus comprising: receiving means for receiving encoded information to which the information concerned with the priority for processing under an overload state is previously added; and priority deciding means for deciding a threshold serving as a criterion for selecting whether to process an object in said information received by said receiving means; wherein the timing for outputting said received information is compared with the elapsed time after start of processing or the timing for decoding said received information is compared with the elapsed time after start of processing to change said threshold in accordance with the comparison result, and video data and/or audio data are or is included as said encoding object.

A still further aspect of the resent invention is the audio-video transmitting apparatus, wherein retransmission-request-priority deciding means for deciding a threshold serving as a criterion for selecting whether to request retransmission of some of said information not received because it is lost under transmission when it is necessary to retransmit said information is included, and said decided threshold is decided in accordance with at least one of the priority controlled by said priority deciding means, retransmission frequency, lost factor of information, insertion interval between in-frame-encoded frames, and grading of priority.

A yet further aspect of the present invention is an audio-video transmitting apparatus comprising: retransmission-priority deciding means for deciding a threshold serving as a criterion for selecting whether to request retransmission of some of said information not received because it is lost under transmission when retransmission of said unreceived information is requested is included, wherein said decided threshold is decided in accordance with at least one of the priority controlled by the priority deciding means of said audio-video receiving apparatus, retransmission frequency, lost factor of information, insertion interval between in-frame-encoded frames, and grading of priority.

A still yet further aspect of the present invention is an audio-video transmitting apparatus for transmitting said encoded information by using the priority added to said encoded information and thereby thinning it when (1) an actual transfer rate exceeds the target transfer rate of information for a video or audio or (2) it is decided that writing of said encoded information into a transmitting buffer is delayed as the result of comparing the elapsed time after start of transmission with a period to be decoded or output added to said encoded information.

Another aspect of the present invention is a data processing apparatus comprising: receiving means for receiving a data series including (1) time-series data for audio or video, (2) an inter-time-series-data priority showing the priority of the processing between said time-series-data values, and (3) a plurality of in-time-series-data priorities for dividing said time-series data value to show the processing priority between divided data values; and data processing means for performing processing by using said inter-time-series-data priority and said in-time-series-data priority together when pluralities of said time-series-data values are simultaneously present.

Still another aspect of the present invention is a data processing apparatus comprising: receiving means for receiving a data series including (1) time-series data for audio or video, (2) an inter-time-series-data priority showing the priority of the processing between said time-series-data values, and (3) a plurality of in-time-series-data priorities for dividing said time-series data value to show the processing priority between divided data values; and data processing means for distributing throughput to each of said time-series-data values in accordance with said inter-time-series-data priority and moreover, adaptively deteriorating the processing quality of the divided data in said time-series data in accordance with said in-time-series-data priority so that each of said time-series-data values is kept within said distributed throughput.

Yet another aspect of the present invention is a data processing apparatus characterized by, when an in-time-series-data priority for a video is added every frame of said video and said video for each frame is divided into a plurality of packets, adding said in-time-series-data priority only to the header portion of a packet for transmitting the head portion of a frame of said video accessible as independent information.

Still yet another aspect of the present invention is the data processing apparatus, wherein said in-time-series-data priority is described in the header of a packet to perform priority processing.

A further aspect of the present invention is the data processing apparatus, wherein the range of a value capable of expressing said in-time-series-data priority is made variable to perform priority processing.

A still further aspect of the present invention is a data processing method comprising the steps of: inputting a data series including time-series data for audio or video and an inter-time-series-data priority showing the processing priority between said time-series data values; and processing priorities by using said inter-time-series-data priority as the value of a relative or absolute priority.

A yet further aspect of the present invention is a data processing method comprising the steps of: classifying time-series data values for audio or video; inputting a data series including said time-series data and a plurality of in-time-series-data priorities showing the processing priority between said classified data values; and processing priorities by using said in-time-series-data priority as the value of a relative or absolute priority.

Moreover, the present invention is characterized by:

inputting, for example, a video as waveform data in accordance with the waveform-data-transmitting method; or outputting, for example, a video as waveform data in accordance with the waveform-data-receiving.

Moreover, the present invention is characterized by:

(d) outputting the execution time of each group obtained through estimation in accordance with the waveform-data-receiving method; or (d) inputting a data string constituted with the execution time of each group; and (e) computing the execution frequency of each group for completing decoding within a time required to transmit a code length determined by the designation of a rate controller or the like in accordance with each execution time of the receiving means in accordance with the wave-data-transmitting method.

Furthermore, the present invention is characterized by:

(d) estimating the execution time of each group in accordance with the processing time required to encode a video and each execution frequency output by counting means; and (e) estimating the processing time required to encode a video by using the above execution time and computing the execution frequency of each group in which the processing time does not exceed a time usable to process one sheet of picture determined by a frame rate given as the designation of a user in accordance with the waveform-data-transmitting method.

The present invention has the above structure to obtain the execution frequency of indispensable processing and that of dispensable processing, transmit the execution frequencies to the receiving side, and estimate the time required for each processing in accordance with the execution frequencies and the decoding time.

By reducing each execution frequency of dispensable processing so that the time required for decoding becomes shorter than a designated time in accordance with the estimated time of each processing, it is possible to control the decoding time to the designated time or shorter and keep a delay small.

Moreover, it is possible to set the decoding execution time to a value equal to or less than a designated time by transmitting the execution time of indispensable processing and that of dispensable processing estimated by the receiving side to the transmitting side and determining each execution frequency at the transmitting side in accordance with each execution time.

Moreover, it is possible to set the encoding estimation time to a value equal to or less than a user designated time by estimating the execution time of indispensable processing and that of dispensable processing and determining each execution frequency in accordance with each execution time and the user designated time determined by a frame rate designated by a user.

BRIEF DESCRIPTION OF THE DRAWINGS

FIG. 3 is an illustration showing a method for transmitting and controlling video and audio by using a plurality of logical transmission lines;

FIG. 4 is an illustration showing a method for dynamically changing header information added to the data for a video or audio to be transmitted;

FIGS. 6(a) to 6(d) are illustrations showing examples of a method for adding AL information;

FIG. 8 is an illustration showing a procedure for transmitting a broadcasting program;

FIG. 9(b) is an illustration showing a method for transmitting a video or audio considering the read and rise time of program or data when the program or data is transmitted;

FIG. 11(a) is an illustration showing a specific example of the protocol to be actually transferred between terminals;

FIG. 11(b) is an illustration showing a specific example of the protocol to be actually transferred between terminals;

FIG. 12 is an illustration showing a specific example of the protocol to be actually transferred between terminals;

FIG. 13(a) is an illustration showing a specific example of the protocol to be actually transferred between terminals;

FIG. 13(b) is an illustration showing a specific example of the protocol to be actually transferred between terminals;

FIG. 13(c) is an illustration showing a specific example of the protocol to be actually transferred between terminals;

FIG. 14 is an illustration showing a specific example of the protocol to be actually transferred between terminals;

FIG. 15 is an illustration showing a specific example of the protocol to be actually transferred between terminals;

FIG. 16(a) is an illustration showing a specific example of the protocol to be actually transferred between terminals;

FIG. 16(b) is an illustration showing a specific example of the protocol to be actually transferred between terminals;

FIG. 17 is an illustration showing a specific example of the protocol to be actually transferred between terminals;

FIG. 18 is an illustration showing a specific example of the protocol to be actually transferred between terminals;

FIG. 19(a) is an illustration showing a specific example of the protocol to be actually transferred between terminals;

FIG. 19(b) is an illustration showing a specific example of the protocol to be actually transferred between terminals;

FIGS. 28(a) to 28(c) are illustrations showing the grading for adding a priority;

FIG. 31 is an illustration showing a method for making data correspond to a communication payload;

DESCRIPTION OF SYMBOLS

Figure 1:
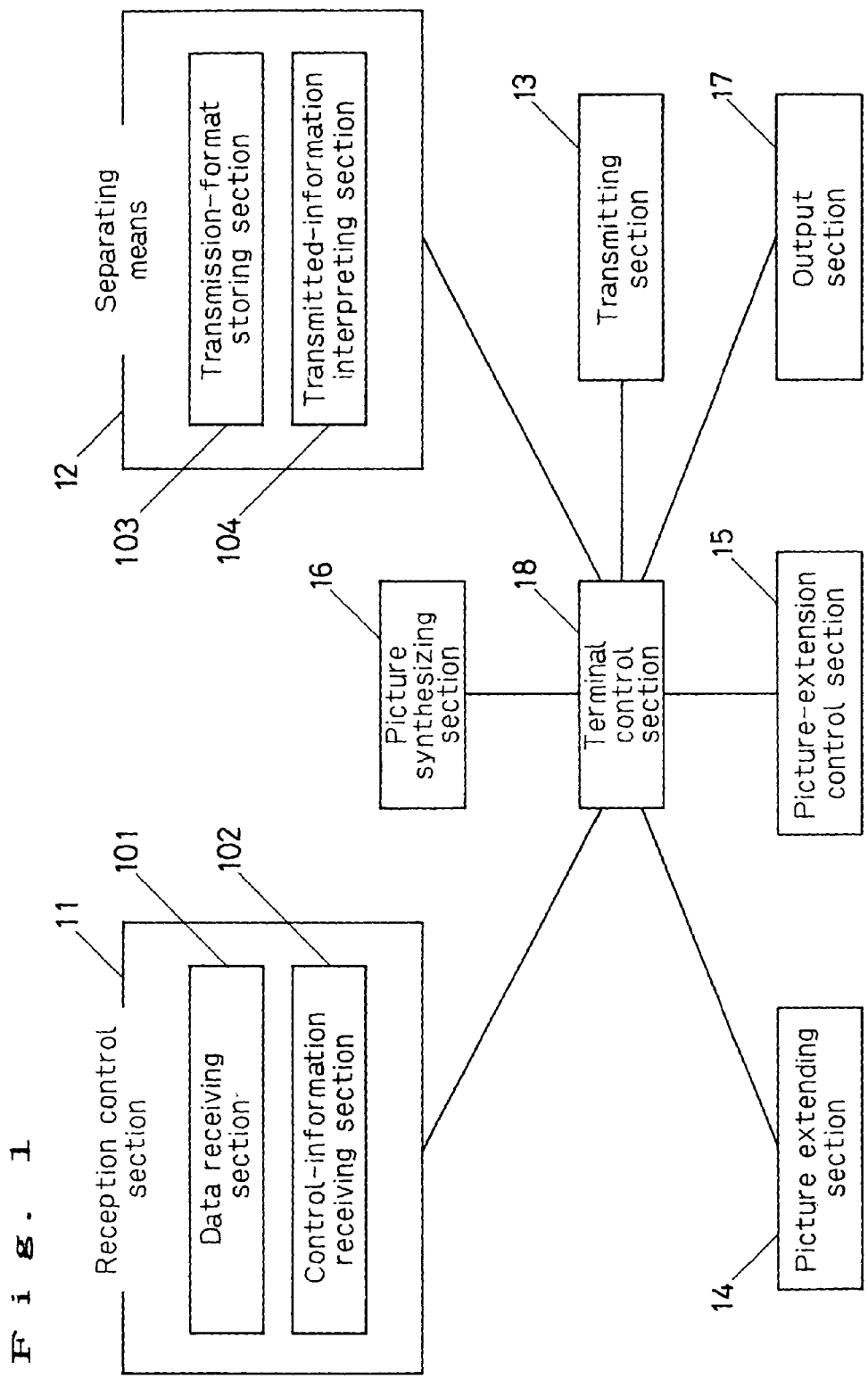
FIG. 1 is a schematic block diagram of the audio-video transceiver of an embodiment of the present invention.

11 Reception control section
12 Separating section
13 Transmitting section
14 Video extending section (Picture extending section)
15 Video-extension control section (Picture-extension control section)
16 Video synthesizing section (Picture synthesizing section)
17 Output section
18 Terminal control section
4011 Transmission control section
4012 Video encoding section (Picture encoding section)
4012 Reception control section
4014 Video decoding section (Picture decoding section)
4015 Video synthesizing section (Picture synthesizing section)
4016 Output section
4101 Video encoder (Picture encoder)
4102 Video decoder (Picture decoder)
301 Receiving means
302 Estimating means
303 Video decoder(i.e. Dynamic-picture or Moving picture decoder)
304 Frequency reducing means
306 Output terminal
307 Input terminal
3031 Variable decoding means
3032 Inverse orthogonal transforming means
3033 Switching unit
3034 Movement compensating means
3035 Execution-time measuring means The entire disclosure of U.S. patent application Ser. No. 09/194,008, filed Mar. 17, 1999. is expressly incorporated by reference herein.

BEST MODE FOR CARRYING OUT THE INVENTION

Embodiments of the present invention are described by referring to the accompanying drawings.

The embodiments described below mainly solve any one of the above problems (A1) to (A6).

"picture (or video)" used for the present invention includes a static-picture and a moving-picture. Moreover, a purposed picture can be a two-dimensional picture like computer graphics (CG) or three-dimensional picture data constituted with a wire-frame model.

FIG. 1 is a schematic block diagram of the audio-video transceiver of an embodiment of the present invention.

In FIG. 1, a reception control section 11 for receiving information and a transmitting section 13 for transmitting information are information transmitting means such as a coaxial cable, CATV, LAN, and modem. Communication environment can be the environment in which a plurality of logical transmission lines can be used without considering multiplexing means such as internet or the environment in which multiplexing means must be considered such as analog telephone or satellite broadcast.

Moreover, a system for bidirectionally transferring video and audio between terminals such as a picture telephone or teleconference system or a system for broadcasting broadcast-type video and audio through satellite broadcast, CATV, or internet are listed as terminal connection systems. The present invention takes such terminal connection systems into consideration.

A separating section 12 shown in FIG. 1 is means for analyzing received information and separating data from control information. Specifically, the section 12 is means for decomposing the header information for transmission added to data and data or decomposing the header for data control added to the data and the contents of the data. A picture extending section 14 is means for extending a received video.

For example, a video to be extended can be the compressed picture of a standardized moving(dynamic) or static picture such as H.261, H.263, MPEG1/2, or JPEG or not.

The picture-extension control section 15 shown in FIG. 1 is means for monitoring the extended state of a video. For example, by monitoring the extended stat of a picture, it is possible to empty-read a receiving buffer without extending the picture when the receiving buffer almost causes overflow and restart the extension of the picture after the picture is ready for extension.

Moreover, in FIG. 1, a picture synthesizing section 16 is means for synthesizing an extended picture. A picture synthesizing method can be defined by describing a picture and its structural information (display position and display time (moreover, a display period can be included)), a method for grouping pictures, a picture display layer (depth), an object ID (SSRC to be described later), and the relation between attributes of them with a script language such as JAVA, VRML, or MHEG. The script describing the synthesizing method is input or output through a network or a local memory.

Moreover, an output section 17 is a display or printer for outputting a picture synthesized result. A terminal control section 18 is means for controlling each section. Furthermore, it is possible to use a structure for extending an audio instead of a picture (it is possible to constitute the structure by changing a picture extending section to an audio extending section, a picture extension control section to an audio extension control section, and a picture synthesizing section to an audio synthesizing section) or a structure for extending a picture and an audio and synthesizing and displaying them while keeping temporal synchronization.

Furthermore, it is possible to transmit a picture and an audio by using a picture compressing section for compressing a picture, a picture compression control section for controlling the picture compressing section, an audio compressing section for compressing an audio, and an audio compression control section for controlling the audio compressing section.

Figure 2:
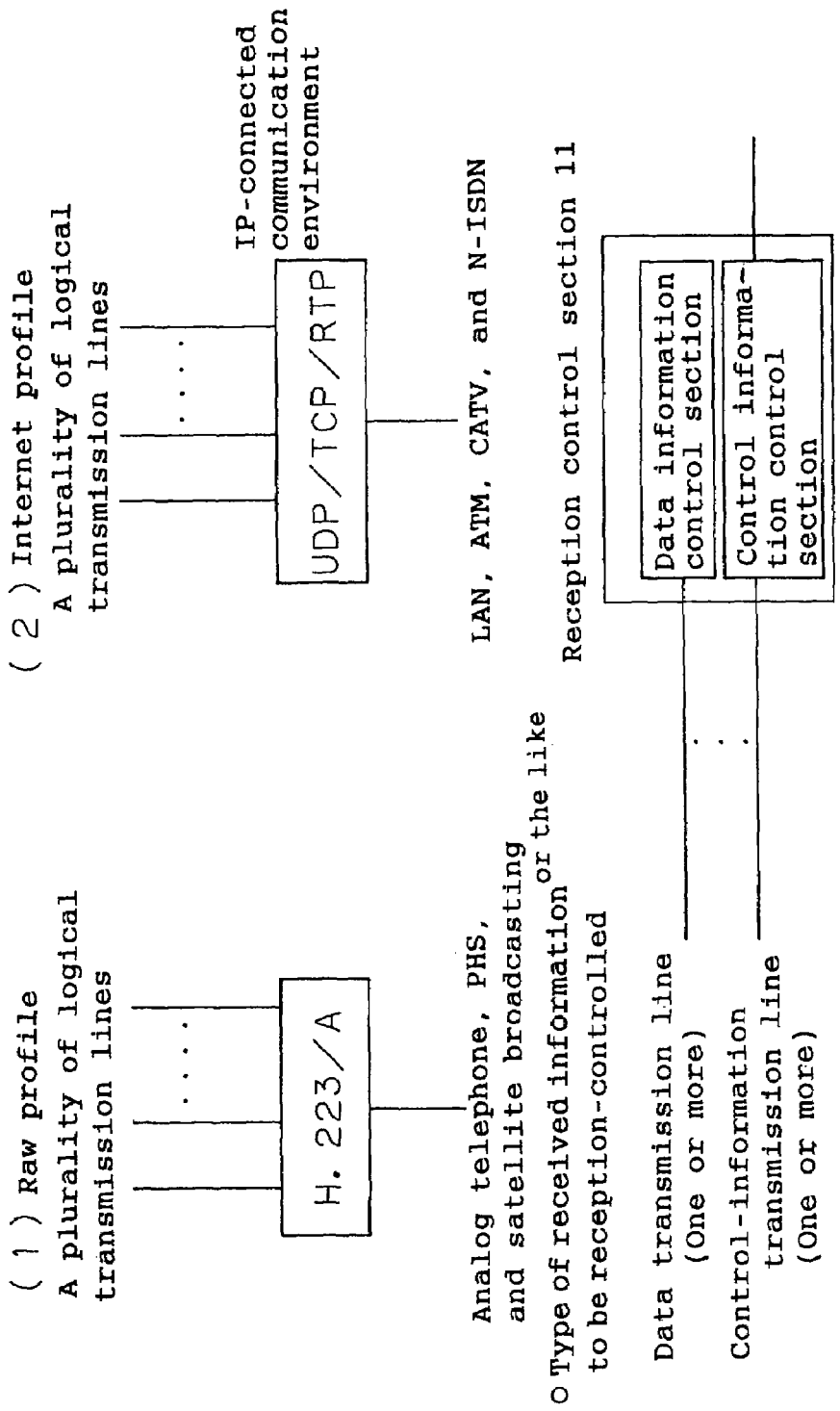
FIG. 2 is an illustration showing a reception control section and a separating section.

FIG. 2 is an illustration showing a reception control section and a separating section.

By constituting the reception control section 11 shown in FIG. 1 with a data receiving section 101 for receiving data and a control information receiving section 102 for receiving the control information for controlling data and the separating section 12 with a transmission format storing section 103 for storing a transmission structure (to be described later in detail) for interpreting transmission contents and a transmission information interpreting section 104 for interpreting transmission contents in accordance with the transmission structure stored in the transmission format storing section 103, it is possible to independently receive data and control information. Therefore, for example, it is easy to delete or move a received video or audio while receiving it.

As described above, it is possible for the communication environment purposed by the reception control section 11 to use a communication environment (internet profile) in which a plurality of logical transmission lines can be used without considering multiplexing means like internet or a communication environment (Raw profile) in which multiplexing means must be considered like analog telephone or satellite broadcast. However, a user premises a communication environment in which a plurality of logical transmission lines (logical channels) are prepared (for example, in the case of a communication environment in which TCP/IP can be used, the expression referred to as "communication port" is generally used).

Moreover, as shown in FIG. 2, it is assumed that the reception control section 11 receives one type of data transmission line or more and one type of control logical transmission line for controlling data to be transmitted or more. It is also possible to prepare a plurality of transmission lines for transmitting data and only one transmission line for controlling data. Moreover, it is possible to prepare a transmission line for controlling data every data transmission like the RTP/RTCP also used for H.323. Furthermore, when considering the broadcast using UDP, it is possible to use a communication system using a single communication port (multicast address).

FIG. 3 is an illustration for explaining a method for transmitting and controlling video and audio by using a plurality of logical transmission lines. The data to be transmitted is referred to as ES (Elementary Stream), which can be picture information for one frame or picture information in GOBs or macroblocks smaller than one frame in the case of a picture.

In the case of an audio, it is possible to use a fixed length decided by a user. Moreover, the data-control header information added to the data to be transmitted is referred to as AL (Adaptation Layer information). The information showing whether it is a start position capable of processing data, information showing data-reproducing time, and information showing the priority of data processing are listed as the AL information. Data control information of the present invention corresponds to the AL information. Moreover, it is not always necessary for the ES and AL used for the present invention to coincide with the contents defined by MPEG1/2.

The information showing whether it is a start position capable of processing data specifically includes two types of information. First one is a flag for random access, that is, the information showing that it can be individually read and reproduced independently of preceding or following data such as intra-frame (I picture) in the case of a picture. Second one is the information capable of defining an access flag as a flag for showing that it can be individually read, that is, the information showing that it is the head of pictures in GOBs or macroblocks in the case of a picture. Therefore, absence of an access flag shows the middle of data. Both random access flag and access flag are not always necessary as the information showing that it is a start position capable of processing data.

There is a case in which no problem occurs even if both the flags are not added in the case of the real time communication such as a teleconference system. However, to simply perform edition, a random access flag is necessary. It is also possible to decide whether a flag is necessary or which flag is necessary through a communication channel before transferring data.

The information indicating a data reproducing time shows the information for time synchronization when a picture and an audio are reproduced, which is referred to as PTS (Presentation Time Stamp) in the case of MEPG1/2. Because time synchronization is not normally considered in the case of the real time communication such as a teleconference system, the information representing a reproducing time is not always necessary. The time interval between encoded frames may be necessary information.

By making the receiving side adjust a time interval, it is possible to prevent a large fluctuation of frame intervals. However, by making the receiving side adjust the reproducing interval, a delay may occur. Therefore, it may be decided that the time information showing the frame interval between encoded frames is unnecessary.

To decide whether the information showing a data reproducing time represents a PTS or frame interval, it is also possible to decide that the data reproducing time is not added to data before transmitting the data and communicate the decision to a receiving terminal through the communication channel and transmit the data together with decided data control information.

When the information showing the priority for processing data cannot be processed or transmitted due to the load of a receiving terminal or that of a network, it is possible to reduce the load of the receiving terminal or network by stopping the processing or transmission of the data.

The receiving terminal is able to process the data with the picture-extension control section 15 and the network is able to process the data with a relay terminal or router. The priority can be expressed by a numerical value or a flag. Moreover, by transmitting the offset value of the information showing the data-processing priority as control information or data control information (AL information) together with data and adding the offset value to the priority previously assigned to a video or audio in the case of a sudden fluctuation of the load of a receiving terminal or network, it is possible to set a dynamic priority corresponding to the operation state of a system.

Furthermore, by transmitting the information for identifying presence/absence of scramble, presence/absence of copyright, and original or copy as control information together with a data identifier (SSRC) separately from data as control information, it is simplified to cancel the scramble at a relay node.

Moreover, the information showing the data processing priority can be added every stream constituted with the aggregation of frames of a plurality of pictures or audios or every frame of video or audio.

Figure 46:
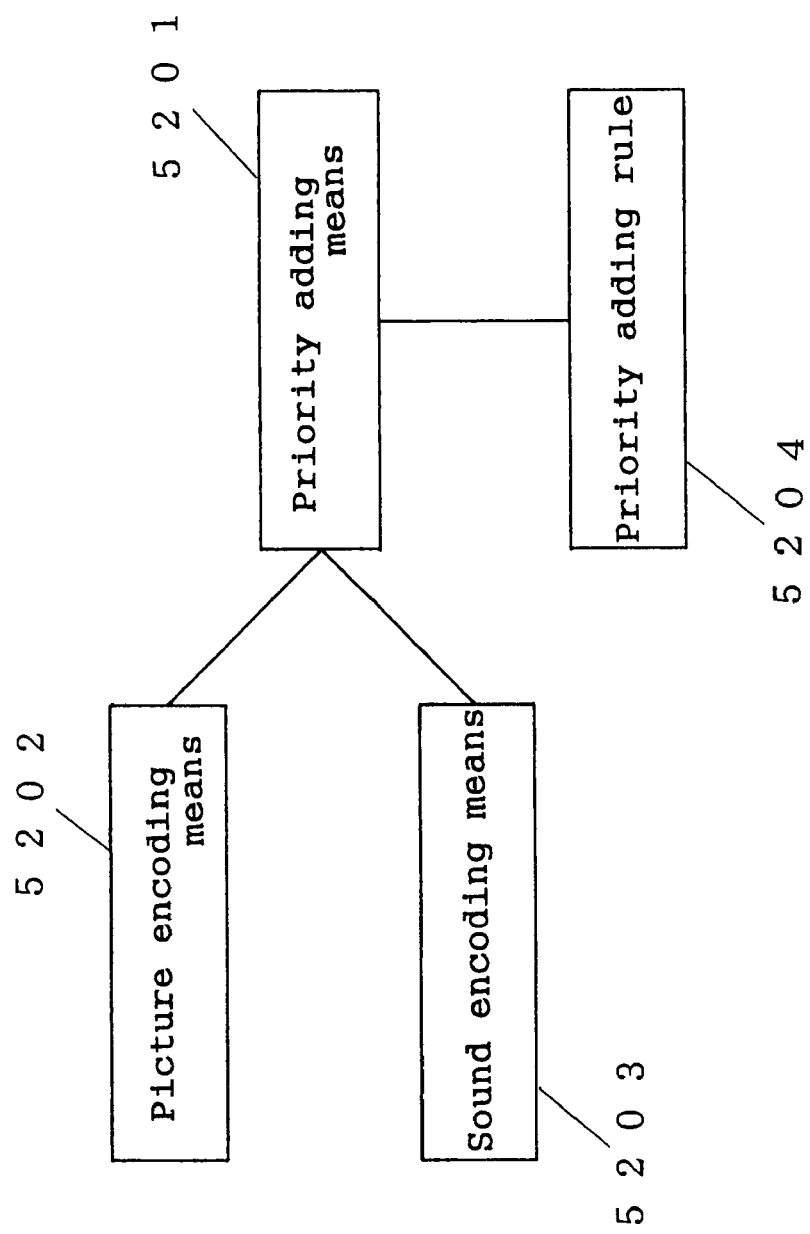
FIG. 46 is an illustration for explaining priority adding means for adding a priority to a video and audio of an audio-video transmitter of the present invention.

Priority adding means for deciding the encoded-information processing priority under overload in accordance with the predetermined rules by the encoding method such as H.263 or G.723 and making the encoded information correspond to the decided priority is provided for a transmitting terminal unit (see FIG. 46).

FIG. 46 is an illustration for explaining priority adding means 5201 for adding a priority to a picture and an audio.

That is, as shown in FIG. 46, a priority is added to encoded-video data (to be processed by video encoding means 5202) and encoded-audio data (to be processed by audio encoding means 5203) in accordance with predetermined rules. The rules for adding priorities are stored in priority adding rules 5204. The rules include rules for adding a priority higher than that of a P-frame (inter-frame encoded picture frame) to an I-frame (intra-frame encoded picture frame) and rules for adding a priority lower than that of an audio to a picture. Moreover, it is possible to change the rules in accordance with the designation of a user.

Priority-adding objects are scene changes in the case of a picture or an audio block and audioless block in the case of a picture frame, stream, or audio designated by an editor or user.

To add a priority in picture or audio frames for defining the processing priority under overload, the following methods are considered: a method for adding a priority to a communication header and a method for embedding a priority in the header of a bit stream in which a video or audio is encoded under encoding. The former makes it possible to obtain the information for priority without decoding it and the latter makes it possible to independently handle a single bit stream without depending on a system.

When one picture frame (e.g. intra-frame encoded I-frame or inter-frame encoded P- or B-frame) is divided into a plurality of transmission packets, a priority is added only to a communication header for transmitting the head of a picture frame accessible as independent information in the case of a picture (when priorities are equal in the same picture frame, it is possible to assume that the priorities are not changed before the head of the next accessible picture frame appears).

Moreover, it is possible to realize configuration in accordance with control information by making the range of a value capable of expressing a priority variable (for example, expressing time information with 16 bits or 32 bits depending on the purpose).

Figure 47:
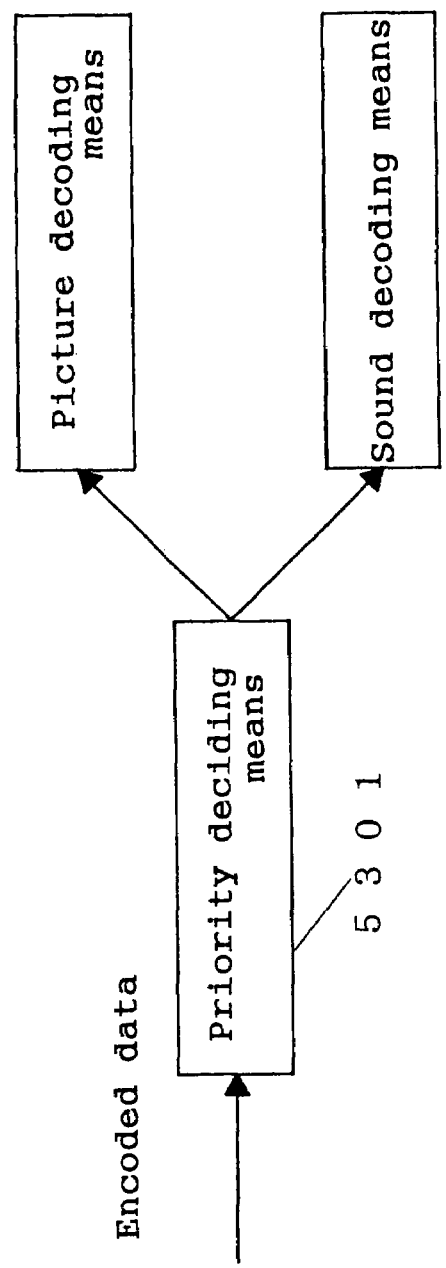
FIG. 47 is an illustration for explaining priority deciding means for deciding whether to perform decoding by interpreting the priority added to a video and audio of an audio-video receiver of the present invention.

Furthermore, in the case of a decoder, priority deciding means for deciding a processing method is provided for a receiving terminal unit in accordance with the priority under overload of received various encoded pieces of information (see FIG. 47).

FIG. 47 is an illustration for interpreting priorities added to a picture and an audio and explaining priority deciding means 5301 for deciding whether to perform decoding.

That is, as shown in FIG. 47, the priorities include a priority added to each stream of each picture or audio and a priority added to each frame of a picture or audio. It is possible to use these priorities independently or by making a frame priority correspond to a stream priority. The priority deciding means 5301 decides a stream or frame to be decoded in accordance with these priorities.

Decoding is performed by using two types of priorities for deciding a processing priority under overload at a terminal.

Figure 24:
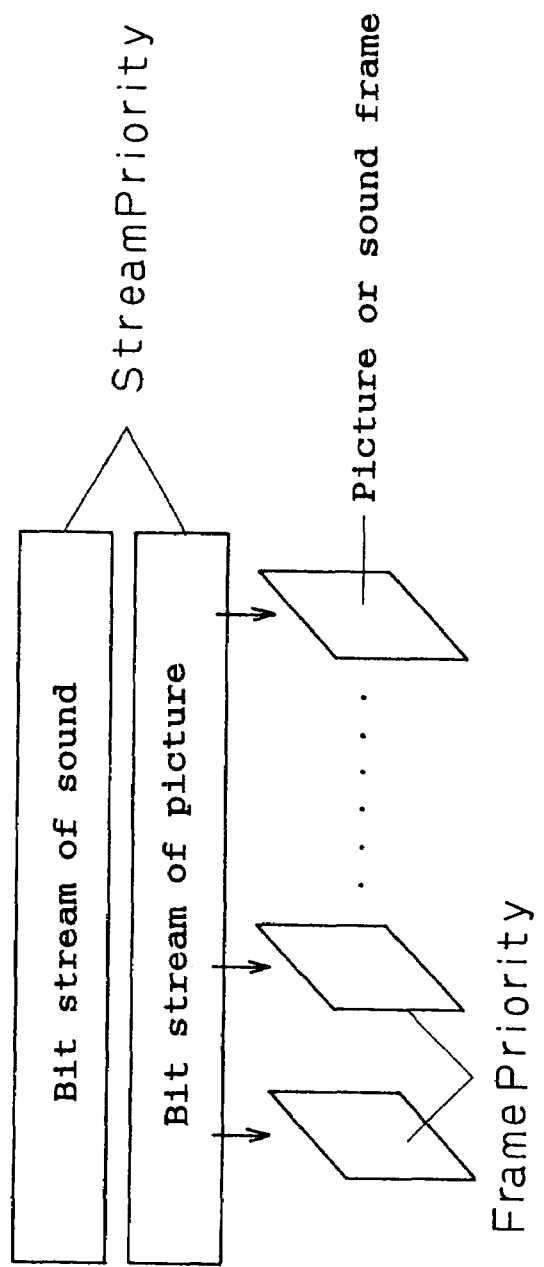
FIG. 24 is an illustration showing stream priority and object priority.

That is, a stream priority (inter-time-series priority) for defining a relative priority between bit streams such as a picture and audio and a frame priority (intra-time-series priority) for defining a relative priority between decoding units such as picture frames in the same stream are defined (FIG. 24).

The former stream priority makes it possible to handle a plurality of videos or audios. The latter frame priority makes it possible to change scenes or add different priorities even to the same intra-frame encoded picture frames (I-frame) in accordance with the intention of an editor.

By making a stream priority correspond to a time assigned to an operating system (OS) for encoding or decoding a picture or audio or a processing priority and thereby controlling the stream priority, it is possible to control a processing time at an OS level. For example, in the case of Windows95/NT of Microsoft Corporation, a priority can be defined at five OS levels. By realizing encoding or decoding means by software in threads, it is possible to decide a priority at an OS level to be assigned to each thread in accordance with the stream priority of a purposed stream.

The frame priority and stream priority described above can be applied to a transmission medium or data-recording medium. For example, by defining the priority of a packet to be transmitted as an access unit priority, it is possible to decide a priority concerned with packet transmission or a priority for processing by a terminal under overload in accordance with the relation between frame priority and stream priority such as the relation of Access Unit Priority=Stream Priority−Frame Priority.

Moreover, it is possible to decide a priority by using a floppy disk or optical disk as a data-recording medium. Furthermore, it is possible to decide a priority by using not only a recording medium but also an object capable of recording a program such as an IC card or ROM cassette. Furthermore, it is possible to use a repeater for a picture or audio such as a router or gateway for relaying data.

As a specific method for using a priority, when a receiving terminal is overloaded, priority deciding means for deciding the threshold of the priority of encoded information to be processed is set to a picture-extension control section or audio-extension control section and the time to be displayed (PTS) is compared with the elapsed time after start of processing or the time to be decoded (DTS) is compared with the time elapsed time after start of processing to change thresholds of the priority of encoded information to be processed in accordance with the comparison result (it is also possible to refer to the insertion interval of I-frame or the grading of a priority as the information for changing thresholds).

Figure 20A:
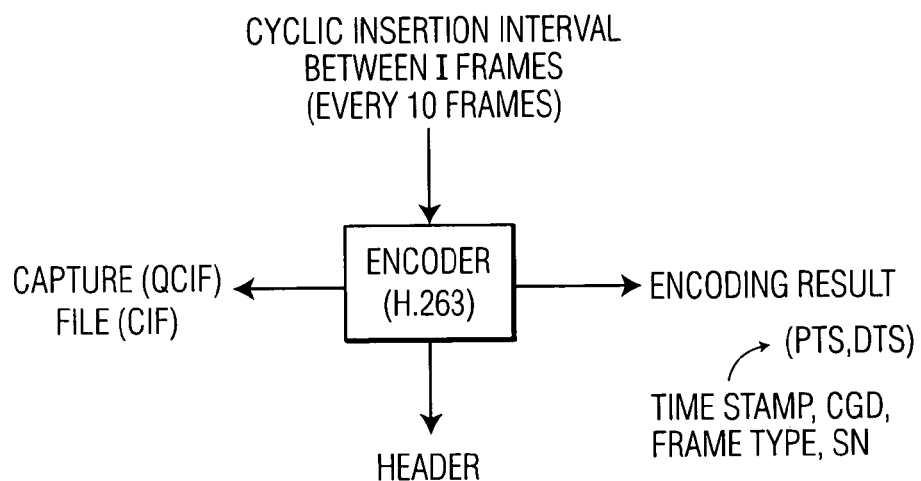
FIGS. 20(a) to 20(c) are block diagrams of demonstration systems of CGD of the present invention.

In the case of the example shown in FIG. 20(a), a picture with the size of captured QCIF or CIF is encoded by an encoder (H.263) under encoding to output a time stamp (PTS) showing the time for decoding (DTS) or the time for displaying the picture, priority information showing processing sequence under overload (CGD, Computational Graceful Degradation), frame type (SN), and sequence number together with encoded information.

Figure 20B:
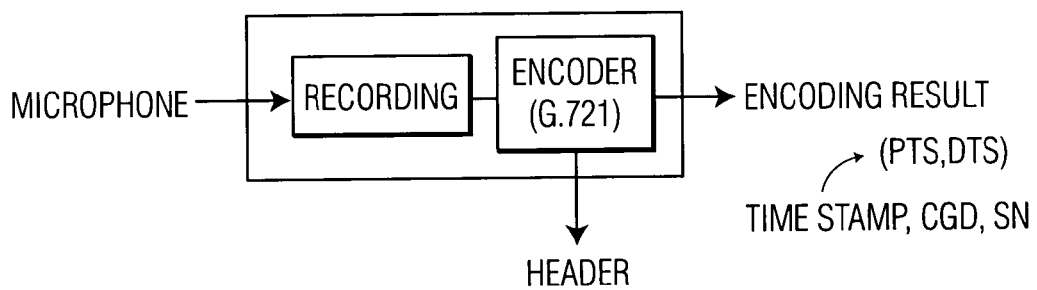

Moreover, in the case of the example shown in FIG. 20(b), an audio is also recorded through a microphone and encoded by an encoder (G.721) to output a time stamp (PTS) showing the time for decoding (DTS) or the time for reproducing an audio, priority information (CGD), and sequence number (SN) together with encoded information.

Figure 20C:
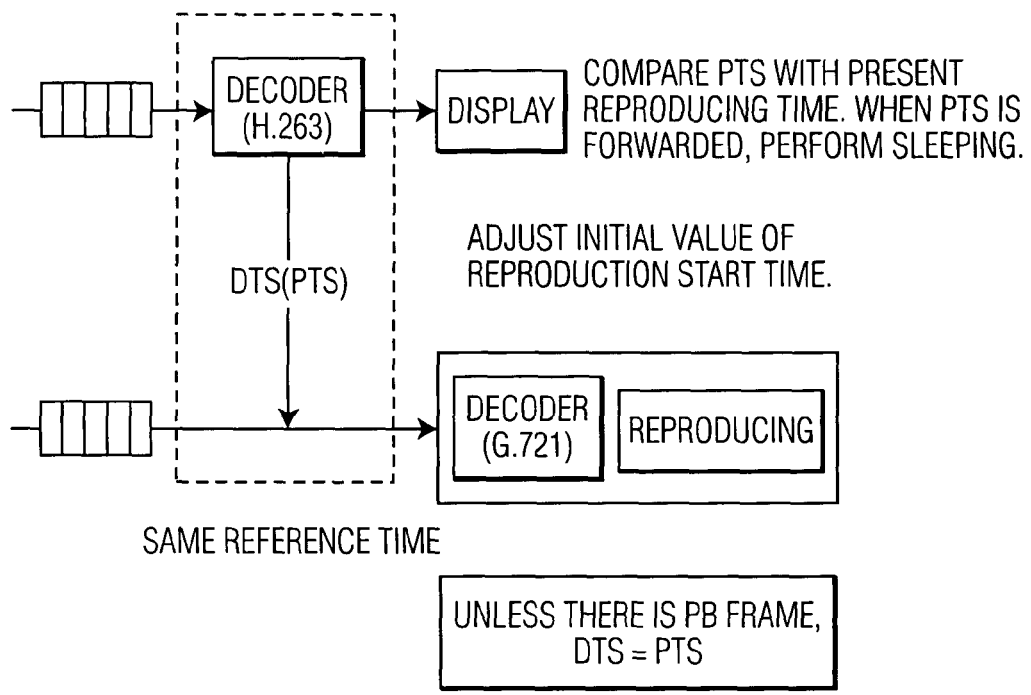

Under decoding, as shown in FIG. 20(c), a picture and an audio are supplied to separate buffers to compare their respective DTS (decoding time) with the elapsed time after start of processing. When DTS is not delayed, the picture and the audio are supplied to their corresponding decoders (H.263 and G.721).

Figure 21:
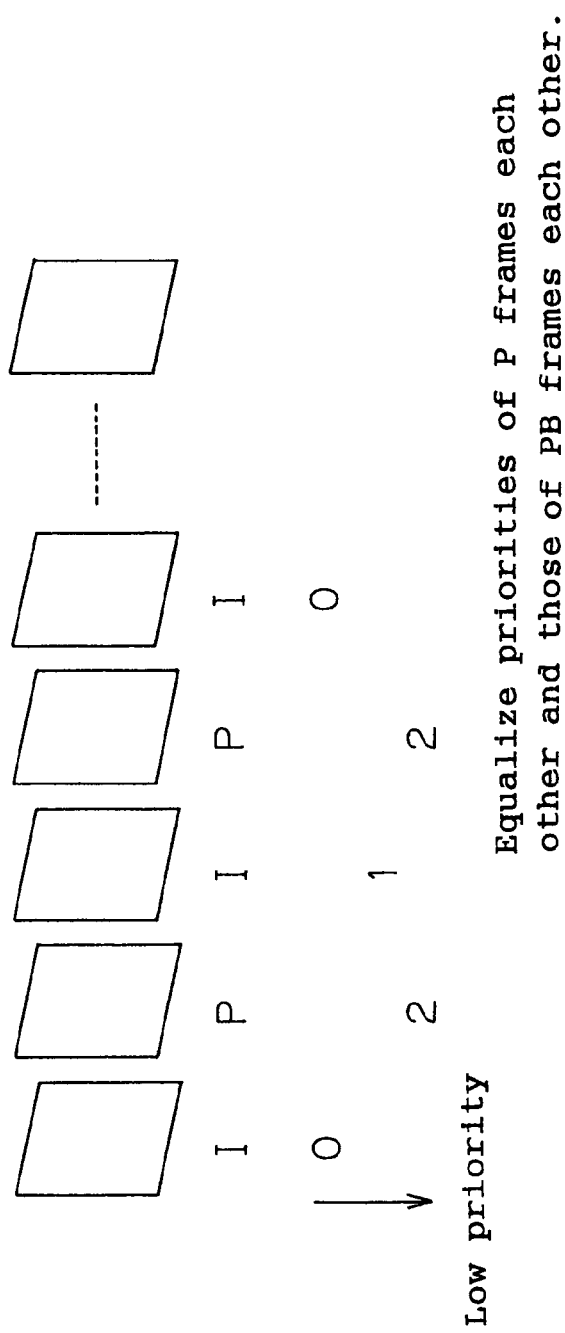
FIG. 21 is an illustration showing a method for adding a priority under overload at an encoder.

The example in FIG. 21 describes a method for adding a priority by an encoder under overload. For a picture, high priorities of "0" and "1" are assigned to I-frame (intra-frame encoded picture frame) (the smaller a numerical becomes, the lower a priority becomes). P-frame has a priority of "2" which is lower than that of I-frame. Because two levels of priorities are assigned to I-frame, it is possible to reproduce only I-frame having a priority of "0" when a terminal for decoding has a large load. Moreover, it is necessary to adjust the insertion interval of I-frame in accordance with a priority adding method.

Figure 22:
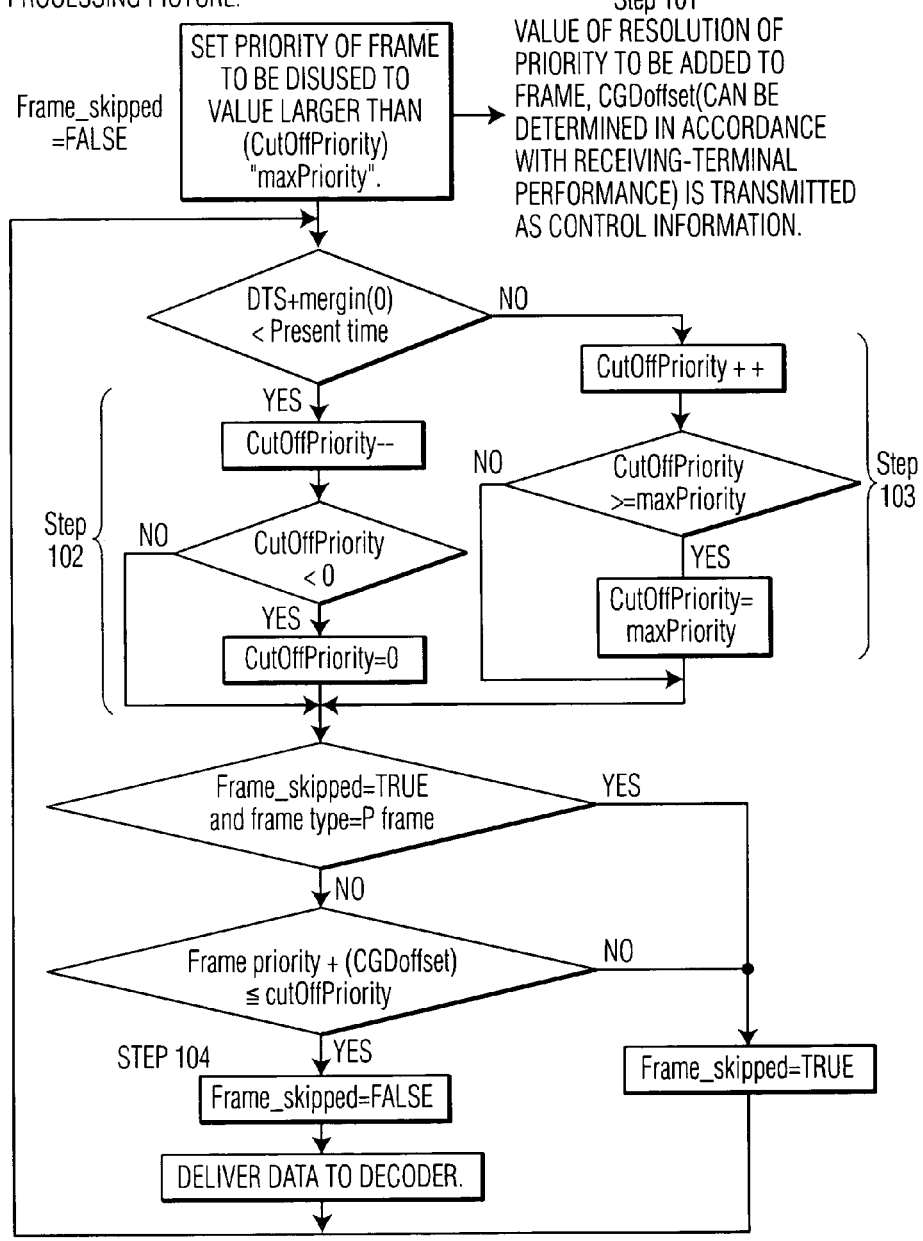
FIG. 22 is an illustration describing a method for deciding a priority at a receiving terminal under overload.

The example in FIG. 22 shows an illustration showing a method for deciding a priority at a receiving terminal under overload. The priority of a frame to be disused is set to a value larger than a cutOffPriority. That is, every picture frame is assumed as an object to be processed. It is possible to previously know the maximum value of priorities added to picture frames by communicating it from the transmitting side to the receiving side (step 101).

When DTS is compared with the elapsed time after start of processing and resultantly, the elapsed time is larger than DTS (when decoding is not in time), the threshold of the priority of a picture or audio to be processed is decreased to thin out processings (step 102). However, when the elapsed time after start of processing is smaller than DTS (decoding is in time), the threshold of a priority is increased in order to increase the number of pictures or audio which can be processed (step 103).

If the image from one before is skipped by P-frame, no processing is performed. If not, a priority offset value is added to the priority of a picture frame (or audio frame) to compare the priority offset value with the threshold of the priority. When the offset value does not exceed the threshold, data to be decoded is supplied to a decoder (step 104).

A priority offset allows the usage of previously checking the performance of a machine and communicating the offset to a receiving terminal (it is also possible that a user issues designation at the receiving terminal) and the usage of changing priorities of a plurality of video and audio streams in streams (for example, thinning out processings by increasing the offset value of the rearmost background).

When a multi-stream is purposed, it is also possible to add a priority for each stream and decide the skip of decoding of a picture or audio. Moreover, in the case of real time communication, it is possible to decide whether decoding is advanced or delayed at the terminal by handling the TR (Temporary Reference) of H.263 similarly to DTS and realize the skipping same as described above.

Figure 23:
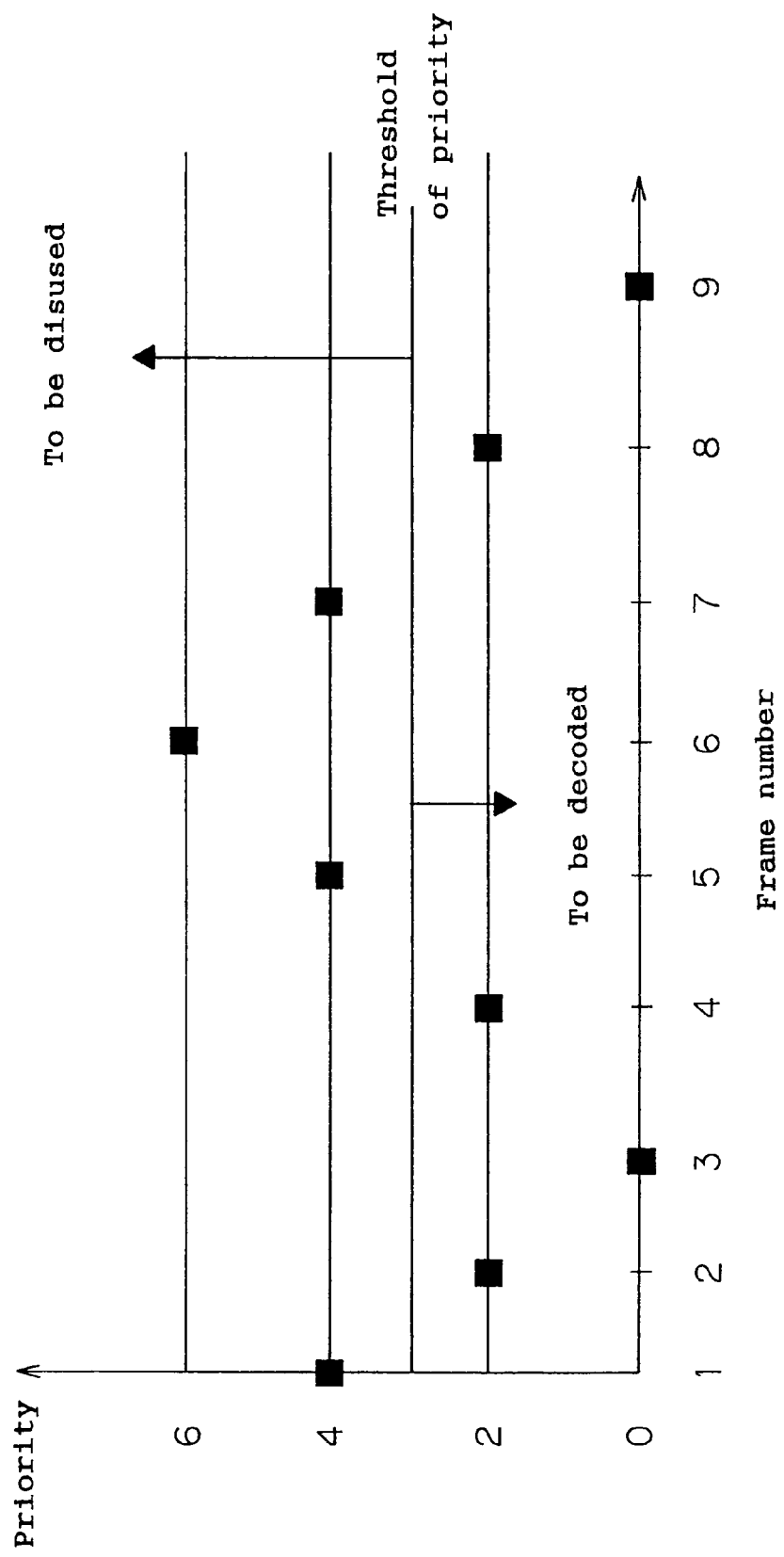
FIG. 23 is an illustration showing temporal change of priorities.

FIG. 23 is an illustration showing temporal change of priorities by using the above algorithm.

FIG. 23 shows the change of a priority to be added to a picture frame. This priority is a priority for deciding whether to perform decoding when a terminal is overloaded, which is added every frame. The smaller the value of a priority becomes, the higher the priority becomes. In the case of the example in FIG. 23, 0 has the highest priority. When the threshold of a priority is 3, a frame having a priority to which a value larger than 3 is added is disused without being decoded and a frame having a priority to which a value of 3 or less is added is decoded. By selectively discussing frames in accordance with priorities, it is possible to control the load of a terminal. It is also possible to dynamically decide the priority threshold in accordance with the relation between the present processing time and the decoding time (DTS) to be added to each frame. This technique can be applied not only to a picture frame but also to an audio in accordance with the same procedure.

In the case of a transmission line such as internet, when it is necessary to retransmit encoded information lost under transmission, it is possible to retransmit only a picture or audio required by the receiving side by providing a retransmission request priority deciding section for deciding the threshold of the priority of the encoded information to be retransmitted for a reception control section and deciding the threshold of the priority added to the encoded information whose retransmission should be requested in accordance with the information for priority, retransmission frequency, loss rate of information, insertion interval of intra-frame encoded frame, grading of priority (e.g. five-level priority) which are controlled by the priority deciding section. If the retransmission frequency or loss rate of information is too large, it is necessary to raise the priority of the information to be retransmitted and lower the retransmission or loss rate. Moreover, by knowing the priority used for the priority deciding section, it is possible to prevent the information to be processed from being transmitted.

In the case of a transmitting terminal, when an actual transfer rate exceeds the target transfer rate of the information of the transmitting terminal or when writing of the encoded information into a transmitting buffer is delayed as the result of comparing the elapsed time after start of transfer processing with the time added to the encoded information to be decoded or displayed, it is possible to transmit a picture or audio matching with the target rate by using a priority added to encoded information and used by the priority deciding section of the receiving terminal when the terminal is overloaded and thereby thinning out transmissions of information. Moreover, by introducing the processing skipping function under overload performed at the receiving-side terminal into the transmitting-side terminal, it is possible to control a failure due to overload of the transmitting-side terminal.

By making it possible to transmit only necessary information out of the above-described AL information according to necessity, it is possible to adjust the amount of information to be transmitted to a narrow-band communication channel such as an analog telephone line. It is possible to recombine the AL information (data control information) used for the transmitting side by deciding the data control information to be added to data at a transmitting-side terminal before transmitting the data, communicating the data control information to be used to a receiving terminal as control information (for example, using only a random access flag), and rewriting at the receiving-side terminal based on the obtained control information the information about a transmission structure (showing which AL information is used) stored in the transmission format storing section 103 (see FIG. 16).

FIG. 4 is an illustration for explaining a method for dynamically changing header information added to the data for a picture or audio to be transmitted. In the case of the example in FIG. 4, the data (ES) to be transmitted is decomposed into data pieces and the identifying information (sequence number) for showing the sequence of data, the information (marker bit) showing whether it is a start position capable of processing data pieces, and time information (time stamp) concerned with transfer of data pieces are added to data pieces in the form of communication headers by assuming that the above pieces of information correspond to transmission control information of the present invention.

Specifically, RTP (Realtime Transfer Protocol, RFC1889) uses the information for the above sequence number, marker bit, time stamp, object ID (referred to as SSRC), and version number as communication headers. Though a header-information item can be extended, the above items are always added as fixed items. However, when the realtime communication such as the case of a video telephone and transmission of accumulated media such as the case of video-on-demand are present together in an environment in which a plurality of different encoded pictures or audio are simultaneously transmitted, identifying means is necessary because meanings of communication headers are different from each other.

For example, time-stamp information shows PTS that is a reproducing time as previously described in the case of MPEG1/2. In the case of H.261 or H.263, however, the time-stamp information shows a time interval when the information is encoded. However, to process H.263 synchronously with an audio, it is necessary to show that a time stamp is PTS information. This is because time-stamp information shows the time interval between encoded frames in the case of H.263 and it is defined by RTP that the time stamp of the first frame is random.

Therefore, it is necessary to add a flag showing whether a time stamp is PTS as (a) communication header information (it is necessary to extend a communication header) or (b) header information for payload of H.263 or H.261 (that is, AL information) (in this case, it is necessary to extend payload information).

A marker bit serving as the information showing whether it is a start position capable of processing data pieces is added as RTP header information. Moreover, as described above, there is a case in which it is necessary to provide an access flag showing that it is a start position capable of accessing data and a random access flag showing that it is possible to access data at random for AL information. Because doubly providing flags for a communication header lowers the efficiency, a method of substituting an AL flag by a flag prepared for the communication header is also considered.

(c) The problem is solved by newly providing a flag showing that an AL flag is substituted by the header added to a communication header without adding a flag to AL for the communication header or defining that the marker bit of the communication header is the same as that of AL (it is expected that interpretation can be quickly performed compared to the case of providing a flag for AL). That is, a flag is used which shows whether the marker bit has the same meaning as the flag of AL. In this case, it is considered to improve the communication header or describe it in an extension region.

However, (d) it is also possible to interpret the meaning of the marker bit of the communication header so as to mean that at least either of a random access flag and an access flag is present in AL. In this case, it is possible to know that the meaning of interpretation is changed from the conventional case by the version number of the communication header. Moreover, processing is simplified by providing an access flag or random access flag only for the communication header or the header of AL (for the former, a case of providing the flag for both the headers is considered but it is necessary to newly extend the communication header).

It is already described to add the information showing the priority of data processing as the information for AL. By adding the data-processing priority to the communication header, it is possible to decide the processing of the data-processing priority without interpreting the contents of data also on a network. Moreover, in the case of IPv6, it is possible to add the priority at a layer lower than the level of RTP.

By adding a timer or counter for showing the effective period of data processing to the communication header of RTP, it is possible to decide how the state of a transmitted packet changes. For example, when necessary decoder software is stored in a memory having a low access speed, it is possible to decide the information required by a decoder and when the information is required by a timer or counter. In this case, the information for the priority of a timer or counter or the information for the priority of data processing is unnecessary for AL information depending on the purpose.

Figure 5A:
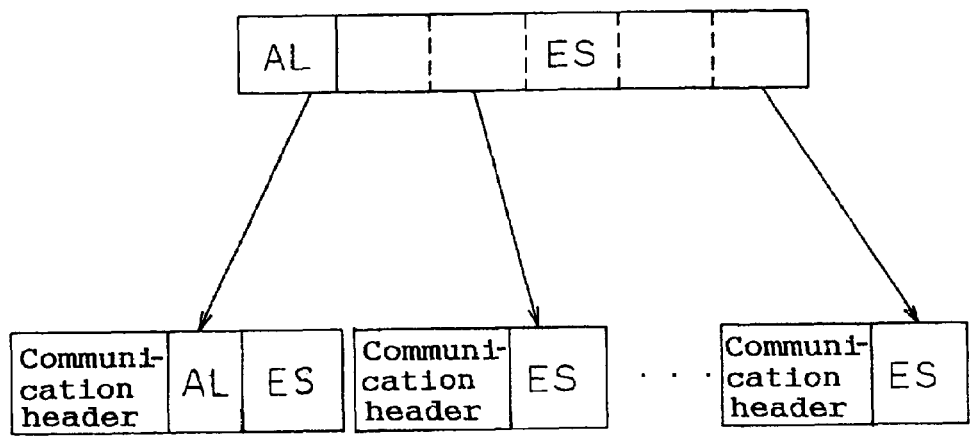
FIGS. 5(a) and 5(b) are illustrations showing a method for adding AL information.
Figure 5B:
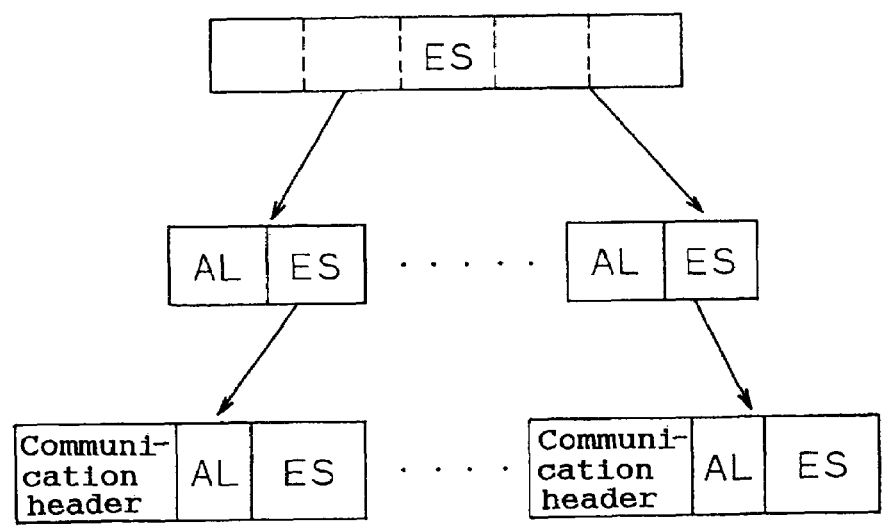

FIGS. 5(*a*) and 5(*b*) and FIGS. 6(*a*) to 6(*d*) are illustrations for explaining a method for adding AL information.

By sending the control information for communicating whether to add AL to only the head of the data to be transmitted as shown in FIG. 5(*a*) or whether to add AL to each data piece after decomposing the data to be transmitted (ES) into one data piece or more to a receiving terminal as shown in FIG. 5(*b*), it is possible to select the grading for handling transmission information. Adding AL to subdivided data is effective when access delay is a problem.

As described above, to previously communicate recombination of data control information at the receiving side or change of methods for arranging data control information to data to a receiving-side terminal, receiving-terminal correspondence can be smoothly performed by using the expression of a flag, counter, or timer and thereby, preparing the expression as AL information or as a communication header to communicate it to the receiving terminal.

In the case of the above examples, a method for avoiding duplication of the header of RTP (or communication header) with AL information and a method for extending the communication header of RTP or AL information are described. However, it is not always necessary for the present invention to use RTP. For example, it is possible to newly define an original communication header or AL information by using UDP or TCP. Though the internet profile uses RTP sometimes, a multifunctional header such as RTP is not defined in the Raw profile. The following four types of concepts are considered for AL information and communication header (see FIGS. 6(*a*) to 6(*d*)).

(1) The header information of RTP or AL information is corrected and extended so that the header information already assigned to RTP and that already assigned to AL are not overlapped (particularly, the information for a time stamp is overlapped and the priority information for a timer, counter, or data processing becomes extension information). Or, it is possible to use a method of not extending the header of RTP or not considering duplication of AL information with information of RTP. They correspond to the contents having been shown so far. Because a part of RTP is already practically used for H.323, it is effective to extend RTP having compatibility. (See FIG. 6(a).)

(2) Independently of RTP, a communication header is simplified (for example, using only a sequence number) and remainder is provided for AL information as multifunctional control information. Moreover, by making it possible to variably set items used for AL information before communication, it is possible to specify a flexible transmission format. (See FIG. 6(b).)

(3) Independently of RTP, AL information is simplified (for an extreme example, no information is added to AL) and every control information is provided for a communication header. A sequence number, time stamp, marker bit, payload type, and object ID frequently used as communication headers are kept as fixed information and data-processing priority information and timer information are respectively provided with an identifier showing whether extended information is present as extended information to refer to the extended information if the information is defined. (See FIG. 6(c).)

(4) Independently of RTP, a communication header and AL information are simplified and a format is defined as a packet separate from the communication header or AL information to transmit the format. For example, a method is also considered in which only a marker bit, time stamp, and object ID are defined for AL information, only a sequence number is defined for a communication header, and payload information, data-processing priority information, and timer information are defined as a transmission packet (second packet) separate from the above information and transmitted. (See FIG. 6(d).)

As described above, when considering a purpose and header information already added to a picture or audio, it is preferable so as to be able to freely define (customize) a packet (second packet) to be transmitted separately from a communication header, AL information, or data in accordance with the purpose.

Figure 7:
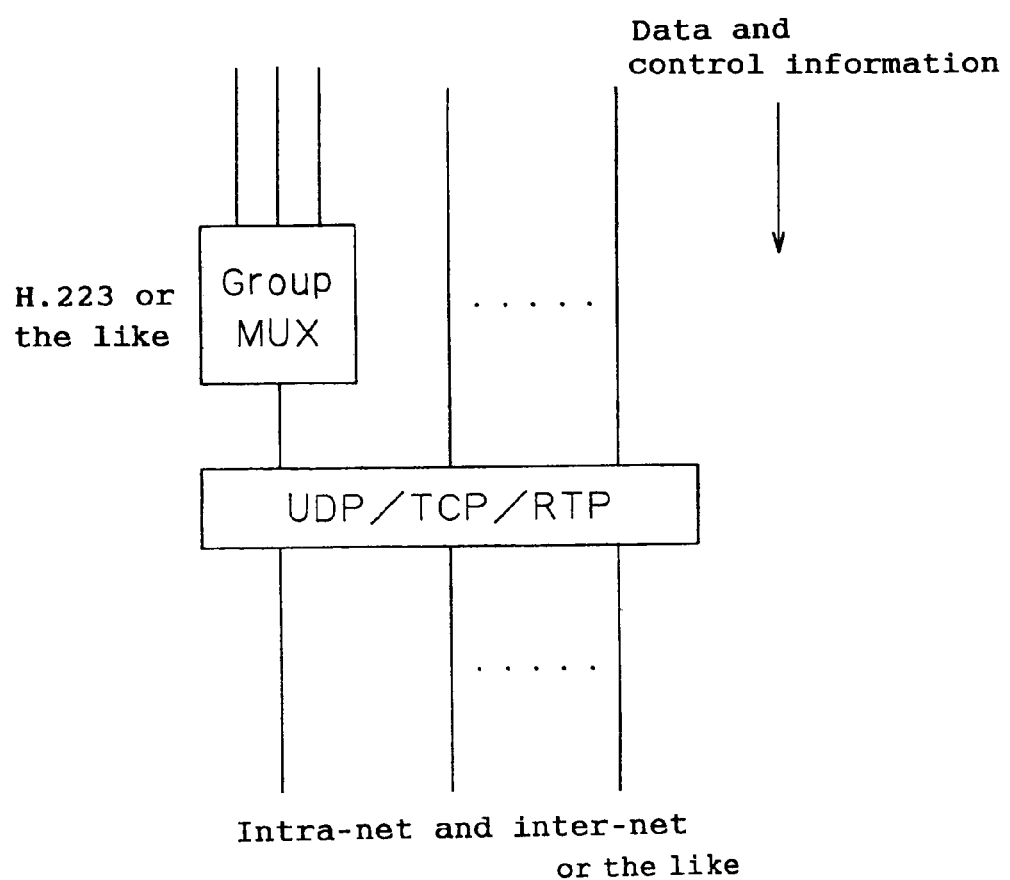
FIG. 7 is an illustration showing a method for transmitting information by dynamically multiplexing and separating a plurality of logical transmission lines.

FIG. 7 is an illustration for explaining a method for transmitting information by dynamically multiplexing and separating a plurality of logical transmission lines. The number of logical transmission lines can be decreased by providing an information multiplexing section capable of starting or ending multiplexing of the information for logical transmission lines for transmitting a plurality of pieces of data or control information in accordance with the designation by a user or the number of logical transmission lines for a transmitting section and an information separating section for separating multiplexed information for a reception control section.

In FIG. 7, the information multiplexing section is referred to as "Group MUX" and specifically, it is possible to use a multiplexing system such as H.223. It is possible. to provide the Group MUX for a transmitting/receiving terminal. By providing the Group MUX for a relay router or terminal, it is possible to correspond to a narrow-band communication channel. Moreover, by realizing Group MUX with H.223, it is possible to interconnect H.223 and H.324.

To quickly fetch the control information (multiplexing control information) for the information multiplexing section, it is possible to reduce a delay due to multiplexing by transmitting the control information in the information multiplexing section through another logical transmission line without multiplexing the control information with data by the information multiplexing section. Thereby, it is possible for a user to select whether to keep the consistency with conventional multiplexing or reduce a delay due to multiplexing by communicating and transmitting whether to multiplex the control information concerned with the information multiplexing section with data and transmit them or transmit the control information through another logical transmission line without multiplexing the information with the data. In this case, the multiplexing control information concerned with the information multiplexing section is information showing the content of multiplexing about how the information multiplexing section performs multiplexing for each piece of data.

As described above, similarly, it is possible to transmit the notification of a method for transmitting at least the information for communicating the start and end of multiplexing, information for communicating the combination of logical transmission lines to be multiplexed, and control information concerned with multiplexing (multiplexing control information) as control information in accordance with an expression method such as a flag, counter, or timer or reduce the setup time at the receiving side by transmitting data control information to a receiving-side terminal together with data. Moreover, as previously described, it is possible to provide an item for expressing a flag, counter, or timer for the transmission header of RTP.

When a plurality of information multiplexing sections or a plurality of information separating sections are present, it is possible to identify to which information multiplexing section the control information (multiplexing control information) belongs by transmitting the control information (multiplexing control information) together with an identifier for identifying an information multiplexing section or information separating section. The control information (multiplexing control information) includes a multiplexing pattern. Moreover, by using a table of random number and thereby, deciding an identifier of an information multiplexing section or information separating section between terminals, it is possible to generate an identifier of the information multiplexing section. For example, it is possible to generate random numbers in a range determined between transmitting and receiving terminals and use the largest value for the identifier (identification number) of the information multiplexing section.

Because the data multiplexed by the information multiplexing section is conventionally different from the media type defined in RTP, it is necessary to define the information showing that it is information multiplexed by the information multiplexing section (new media type H.223 is defined) for the payload type of RTP.

By arranging the information to be transmitted by or recorded in the information multiplexing section in the sequence of control information and data information so as to improve the access speed to multiplexed data, it is expected to quickly analyze multiplexed information. Moreover, it is possible to quickly analyze header information by fixing an item which is described in accordance with the data control information added to control information and adding and multiplexing an identifier (unique pattern) different from data.

FIG. 8 is an illustration for explaining the transmission procedure of a broadcasting program. By using the relation between the identifier of a logical transmission line and the identifier of a broadcasting program as the information of the broadcasting program and thereby, transmitting control information or adding the identifier of a broadcasting program to data as data control information (AL information), it is possible to identify that the data transmitted through a plurality of transmission lines is broadcasted for which program. Moreover, by transmitting the relation between the identifier of data (SSRC in the case of RTP) and the identifier of a logical transmission line (e.g. port number of LAN) to a receiving-side terminal as control information and transmitting corresponding data after it is confirmed that the control information can be received by the receiving-side terminal (Ack/Reject), it is possible to form the correspondence between data pieces even if control information and data are respectively transmitted through an independent transmission line.

By combining an identifier showing the transmission sequence of broadcasting programs or data pieces with the information for a counter or timer for showing a term of validity in which broadcasting program or data can be used as information, adding the combined identifier and information to the broadcasting program or data, and transmitting them, it is possible to realize broadcasting without return channel (when the term of validity almost expires, reproduction of the information or data for a broadcasting program is started even if information is insufficient). Moreover, a method can be considered in which control information and data are broadcasted without being separated from each other by using the address of a single communication port (multicast address).

In the case of communication with no back channel, it is necessary to transmit control information sufficiently before transmitting data so as to enable the receiving terminal to know a structural information of data. Moreover, control information should-be transmitted through a transmission channel free from packet loss and having a high reliability. However, when using a transmission channel having a low reliability, it is necessary to cyclically transmit the control information having the same transmission sequence number. This is not restricted to the case of transmitting the control information concerned with a setup time.

Moreover, it is possible to flexibly control and transmit data by selecting an item which can be added as data control information (e.g. access flag, random access flag, data reproducing time (PTS), or data-processing-priority information), deciding whether to transmit the data control information together with the identifier (SSRC) of data as control information through a logical transmission line different from that of the data or transmit the data control information as data control information (information for AL) together with the data at the transmitting side before transmitting the data, and communicating and transmitting the data to the receiving side as control information.

Thereby, it is possible to transmit data information without adding information to AL. Therefore, to transmit the data for a picture or audio by using RTP, it is unnecessary to extend the definition of the payload having been defined so far.

Figure 9A:
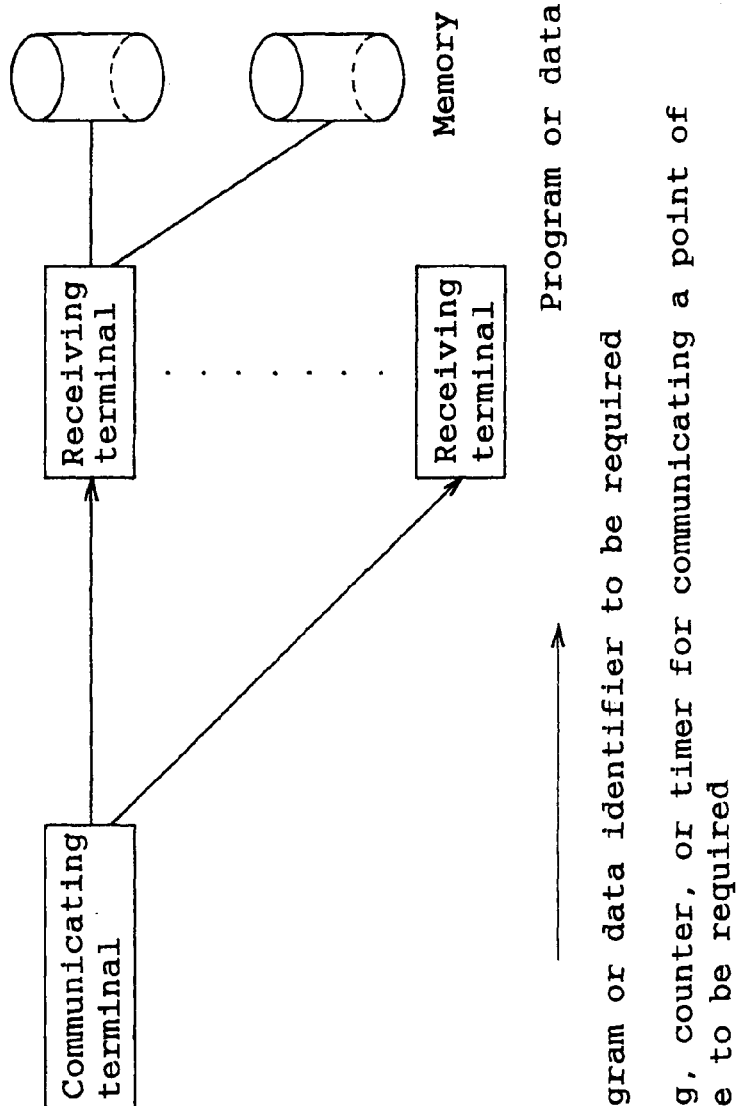
FIG. 9(a) is an illustration showing a method for transmitting a video or audio considering the read and rise time of program or data when the program or data is present at a receiving terminal.

FIGS. 9(a) and 9(b) are illustrations showing a picture or audio transmission method considering the read time and rise time of program or data. Particularly, when the resources of a terminal are limited like the case of satellite broadcasting or a portable terminal having no return channel and being unidirectional, program or data is present and used at a receiving-side terminal, a necessary program (e.g. H.263, MPEG1/2, or software of audio decoder) or data (e.g. video data or audio data) is present in a memory (e.g. DVD, hard disk, or file server on network) requiring a lot of read time, it is possible to reduce the setup time of program or data required in advance by previously receiving it as control information or receiving it together with data as data control information in accordance with the expression method such as the identifier for identifying the program or data, identifier (e.g. SSRC, or Logical Channel Number) of a stream to be transmitted, or a flag, counter (count-up/down), or timer for estimating the point of time necessary for a receiving terminal (FIG. 18).

When program or data is transmitted, by transmitting the program or data from the transmitting side together with the information showing the storage destination (e.g. hard disk or memory) of the program or data at a receiving terminal, time required for start or read, relation between the type or storage destination of a terminal and the time required for start or read (e.g. relation between CPU power, storage device, and average response time), and utilization sequence, it is possible to schedule the storage destination and read time of the program or data if the program or data necessary for the receiving terminal is actually required.

Figure 10A:
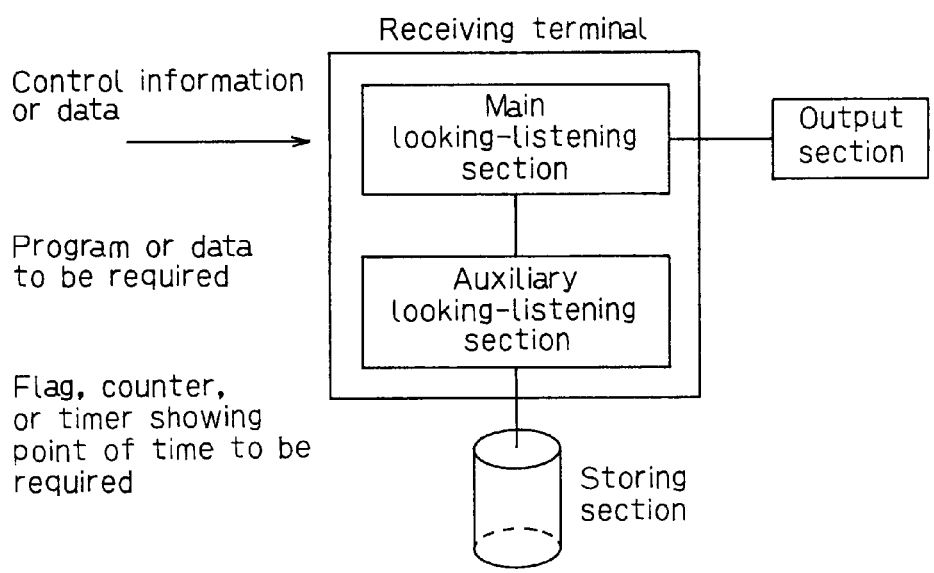
FIG. 10(a) is an illustration showing a method for corresponding to zapping.
Figure 10B:
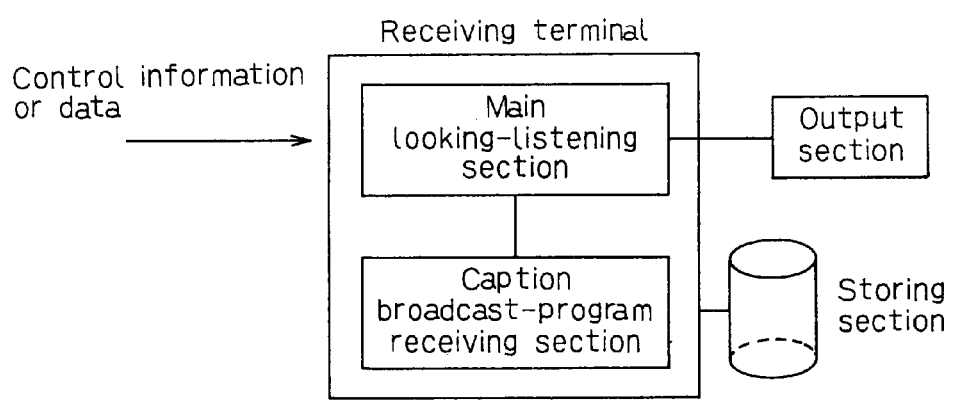
FIG. 10(b) is an illustration showing a method for corresponding to zapping.

FIGS. 10(a) and 10(b) are illustrations for explaining a method for corresponding to zapping (channel change of TV).

When it is necessary to execute a program at a receiving terminal differently from the case of conventional satellite broadcasting for receiving only pictures, the setup time until the program is read and started is a large problem. The same is true for the case in which available resources are limited like the case of a portable terminal.

It is expected that the setup time at a receiving-side terminal can be decreased by (a) using a main looking-listening section by which the user looks at and listens to, and an auxiliary looking-listening section in which a receiving terminal cyclically monitors programs other than the program looked and listened by a user and receiving the relation between identifier for identifying program or data required in advance, information for a flag, counter, or timer for estimating the point of time necessary for the receiving terminal, and program as control information (information transmitted by a packet different from that of data to control terminal processing) or as data control information (information for AL), and preparing read of the program or data together with data as one of the settlement measures when to program or data necessary for a program other than the program looked and listened by the user is present in a memory requiring a lot of time for read.

It is possible to prevent a screen from stopping under setup by setting a broadcasting channel for broadcasting only heading pictures of the pictures broadcasted through a plurality of channels and switching programs by a user, and thereby, when necessary program or data is present in a memory requiring a lot of time for read, temporarily selecting the heading picture of a program required by the user and showing it for the user or showing that program or data is currently read, and restarting the program required by the user after necessary program or data is read by the memory as the second one of the settlement measures. The above heading pictures include broadcasted pictures obtained by cyclically sampling programs broadcasted through a plurality of channels.

Moreover, a timer is a time expression and shows the point of time when a program necessary to decode a data stream sent from the transmitting side is necessary. A counter is the basic time unit determined between transmitting and receiving terminals, which can be information showing what-th time. A flag is transmitted and communicated together with the data transmitted before the time necessary for setup or control information (information transmitted through a packet different from that of data to control terminal processing). It is possible to transmit the timer and counter by embedding them in data or transmit them as control information.

Furthermore, to decide a setup time, the time in which setup is performed can be estimated by, when using a transmission line such as ISDN operating on the clock base, using a transmission serial number for identifying a transmission sequence as transmission control information in order to communicate from the transmitting terminal to the receiving terminal a time point when program or data is required and thereby communicating the serial number to a receiving terminal together with data as data control information or as control information. Furthermore, when a transmission time is fluctuated due to jitter or delay like internet, it is necessary to add the transmission time to the setup time by considering the propagation delay of transmission in accordance with jitter or delay time by the means for realizing RTCP (media transmission protocol used for internet).

FIGS. 11(a) to 19(b) are illustrations showing specific examples of protocols actually transferred between terminals.

A transmission format and a transmission procedure are described in ASN.1. Moreover, the transmission format is extended on the basis of H1.245 of ITU. As shown in FIG. 11(a), objects of a picture and audio can have a hierarchical structure. In the case of this example, each object ID has the attributes of a broadcasting-program identifier (program ID) and an object ID (S SRC) and the structural information and synthesizing method between pictures are described by a script language such as Java or VRML.

FIG. 11(a) is an illustration showing examples of the relation between objects.

In FIG. 11(a), objects are media such as an audio-video, CG, and text. In the case of the examples in FIG. 11(a), objects constitute a hierarchical structure. Each object has a program number "Program ID" corresponding to TV channel) and an object identifier "Object ID" for identifying an object. When transmitting each object in accordance with RTP (media transmission protocol for transmitting media used for internet, Realtime Transfer Protocol), it is possible to easily identify the object by making the object identifier correspond to SSRC (synchronous source identifier). Moreover, it is possible to describe the structure between objects with a description language such as JAVA or VRML.

Two types of methods for transmitting the objects are considered. One is the broadcasting type in which the objects are unilaterally transmitted from a transmitting-side terminal. The other is the type (communication type) for transferring the objects between transmitting and receiving terminals (terminals A and B).

For example, it is possible to use RTP as a transmission method in the case of internet. Control information is transmitted by using a transmission channel referred to as LCNO in the case of the standard for video telephones. In the case of the example in FIG. 11(a), a plurality of transmission channels are used for transmission. The same program channel (program ID) is assigned to these channels.

FIG. 11(b) is an illustration for explaining how to realize a protocol for realizing the functions described for the present invention. The transmission protocol (H.245) used for the video-telephone standards (H.324 and H.323) is described below. The functions described for the present invention are realized by extending H.245.

The description method shown by the example in FIG. 11(b) is the protocol description method referred to as ASN.1. "Terminal Capability Set" expresses the performance of a terminal. In the case of the example in FIG. 11(b), the function described as "mpeg4 Capability" is extended for the conventional H.245.

In FIG. 12, "mpeg4 Capability" describes the maximum number of pictures "Max Number Of pictures" and the maximum number of audio ("Max Number Of Audio") which can be simultaneously processed by a terminal and the maximum number of multiplexing functions ("Max Number Of Mux") which can be realized by a terminal.

In FIG. 12, these are expressed as the maximum number of objects ("Number Of Process Object") which can be processed. Moreover, a flag showing whether a communication header (expressed as AL in FIG. 12) can be changed is described. When the value of the flag is true, the communication header can be changed. To communicate the number of objects which can be processed between terminals to each other by using "MPEG4 Capability", the communicated side returns "MEPG4 Capability Ack" to a terminal from which "MEPG4 Capability" is transmitted if the communicated side can accept (process) the objects but returns "MEPG4 Capability Reject" to the terminal if not.

FIG. 13(a) shows how to describe a protocol for using the above Group MUX for multiplexing a plurality of logical channels to one transmission channel (transmission channel of LAN in the case of this example) in order to share the transmission channel by logical channels. In the case of the example in FIG. 13(a), multiplexing means (Group MUX) is made to correspond to the transmission channel ("LAN Port Number") of LAN (Local Area Network). "Group Mux ID" is an identifier for identifying the multiplexing means. To share the multiplexing means by terminals by using "Create Group Mux" and perform communication between the terminals, the communicated side returns "Create Group Mux Ack" to a terminal from which "Create Group Mux" is transmitted if the side can accept (use) the multiplexing means but returns "Create Group Mux Reject" to the terminal if not. Separating means serving as means for performing an operation reverse to that of the multiplexing means can be realized by the same method.

In FIG. 13(b), a case of deleting already-generated multiplexing means is described.

In FIG. 13(c), the relation between the transmission channel of LAN and a plurality of logical channels is described.

The transmission channel of LAN is described in accordance with "LAN Port Number" and the logical channels are described in accordance with "Logical Port Number".

In the case of the examples in FIG. 13(c), it is possible to make the transmission channel of one LAN correspond to up to 15 logical channels.

In FIG. 13, when the number of MUXs that can be used is only one, Group Mux ID is unnecessary. Moreover, to use a plurality of Muxes, Group Mux ID is necessary for each command of H.223. Furthermore, it is possible to use a flag for communicating the relation between ports used between the multiplexing means and separating means. Furthermore, it is possible to use a command making it possible to select whether to multiplex control information or transmit the information through another logical transmission line.

In the case of the explanation in FIGS. 13(a) to 13(c), the transmission channel uses LAN. However, it is also possible to use a system using no internet protocol like H.223 or MPEG2.

In FIG. 14, "Open Logical Channel" shows the protocol description for defining the attribute of a transmission channel. In the case of the example in FIG. 14, "MPEG4 Logical Channel Parameters" is extended and defined for the protocol of H.245.

FIG. 15 shows that a program number (corresponding to a TV channel) and a program name are made to correspond to the transmission channel of LAN ("MPEG4 Logical Channel Parameters").

Moreover, in FIG. 15, "Broadcast Channel Program" denotes a description method for transmitting the correspondence between LAN transmission channel and program number in accordance with the broadcasting type. The example in FIG. 15 makes it possible to transmit the correspondence between up to 1,023 transmission channels and program numbers. Because transmission is unilaterally performed from the transmitting side to the receiving side in the case of broadcasting, it is necessary to cyclically transmit these pieces of information by considering the loss during transmission.

In FIG. 16(a), the attribute of an object (e.g. picture or audio) to be transmitted as a program is described ("MPEG4 Object Classdefinition"). Object information ("Object Structure Element") is made to correspond to a program identifier ("Program ID"). It is possible to make up to 1,023 objects correspond to program identifiers. As the object information, a LAN transmission channel ("LAN Port Number"), a flag showing whether scramble is used ("Scramble Flag"), a field for defining an offset value for changing the processing priority when a terminal is overloaded ("CGD Offset"), and an identifier (Media Type) for identifying a type of the media (picture or audio) to be transmitted are described.

In the case of the example in FIG. 16(b), AL (in this case, defined as additional information necessary to decode pictures for one frame) is added to control decoding of ES (in this case, defined as a data string corresponding to pictures for one frame). As AL information, the following are defined.

(1) Random Access Flag (flag showing whether to be independently reproducible, true for an intra-frame encoded picture frame)

(2) Presentation Time Stamp (time displayed by frame)

(3) CGD Priority (Value of priority for deciding processing priority when terminal is overloaded)

The example shows a case of transmitting the data string for one frame by using RTP (protocol for transmitting continuous media through internet, Realtime Transfer Protocol). "AL Reconfiguration" is a transmission expression for changing the maximum value that can be expressed by the above AL.

The example in FIG. 16(b) makes it possible to express up to 2 bits as "Random Access Flag Max Bit". For example, when there is no bit, Random Access Flag is not used. When there are two bits, the maximum value is equal to 3.

Moreover, the expression with a real number part and a mantissa part is allowed (e.g. 3^6). When no data is set, an operation under the state decided by default is allowed.

In FIG. 17, "Setup Request" shows a transmission expression for transmitting a setup time. "Setup Request" is transmitted before a program is transmitted, a transmission channel number ("Logical Channel Number") to be transmitted, a program ID ("execute Program Number"). to be executed, a data ID ("data Number") to be used, and the ID of a command ("execute Command Number") to be executed are made to correspond to each other and transmitted to a receiving terminal. Moreover, an execution authorizing flag ("flag"), a counter ("counter") describing whether to start execution when receiving Setup Request how many times, and a timer value ("timer") showing whether to start execution after how many hours pass can be used as other expression methods by making them correspond to transmission channel numbers.

Rewriting of AL information and securing of rise time of Group Mux are listed as examples of requests to be demanded.

FIG. 18 is an illustration for explaining a transmission expression for communicating whether to use the AL described for FIG. 16(b) from a transmitting terminal to a receiving terminal ("Control AL definition").

In FIG. 18, if "Random Access Flag Use" is true, Random Access Flag is used. If not, it is not used. It is possible to transmit the AL change notification as control information through a transmission channel separate from that of data or transmit it through the transmission channel same as that of data together with the data.

A decoder program is listed as a program to be executed. Moreover, a setup request can be used for broadcasting and communication. Furthermore, which item serving as control information is used as Al information is designated to a receiving terminal in accordance with the above request. Furthermore, it is possible to designate which item is used as communication header, which item is used as AL information and which item is used as control information to a receiving terminal.

FIG. 19(a) shows the example of a transmission expression for changing the structure of header information (data control information, transmission control information, and control information) to be transmitted by using an information frame identifier ("header ID") between transmitting and receiving terminals in accordance with the purpose.

In FIG. 19(a), "class ES header" separates the structure of the data control information to be transmitted through a transmission channel same as that of data from that of the information with which transmission control information is transmitted between transmitting and receiving terminals in accordance with an information frame identifier.

For example, only the item of "buffer Size ES" is used when the value of "header ID" is 0 but the item of "reserved" is added when the value of "header ID" is 1.

Moreover, by using a default identifier ("use Header Extension"), it is decided whether to use a default-type information frame. When "use Header Extension" is true, an item in an if-statement is used. It is assumed that these pieces of structural information are previously decided between transmitting and receiving terminals. Furthermore, it is possible to use a structure for using either of an information frame identifier and a default identifier.

In FIG. 19(b), "AL configuration" shows an example for changing the structure of control information to be transmitted through a transmission channel different from that of data between transmitting and receiving terminals in accordance with the purpose. The usage of an information frame identifier and that of a default identifier are the same as the case of FIG. 19(a).

In the case of the present invention, methods for realizing a system for simultaneously synthesizing and displaying a plurality of pictures and a plurality of audio are specifically described from the following viewpoints.

(1) A method for transmitting (communicating and broadcasting) a picture and an audio through a plurality of logical transmission lines and controlling them. Particularly, a method for respectively transmitting control information and data through an independent logical transmission line is described.

(2) A method for dynamically changing header information (AL information) added to the data for a picture or audio to be transmitted.

(3) A method for dynamically changing communication header information added for transmission.

Specifically, for Items (2) and (3), a method for uniting and controlling the information overlapped in AL information and communication header and a method for transmitting AL information as control information are described.

(4) A method for dynamically multiplexing and separating a plurality of logical transmission lines and transmitting information.

A method for economizing the number of channels of transmission lines and a method for realizing efficient multiplexing are described.

(5) A method for reading a program or data and transmitting pictures and audio considering a rise time. Moreover, a method for reducing an apparent setup time for various functions and purposes is described.

(6) A method for transmitting a picture or audio for zapping.

The present invention is not restricted to only synthesis of two-dimensional pictures. It is also possible to use an expression method of combining a two-dimensional picture with a three-dimensional picture or include a picture synthesizing method for synthesizing a plurality of pictures so that they are adjacent to each other like a wide-visual-field picture (panoramic picture).

Moreover, the present invention does not purpose only such communication systems as bidirectional CATV and B-ISDN. For example, it is possible to use radio waves (e.g. VHF band or UHF band) or a broadcasting satellite for transmission of pictures and audio from a center-side terminal to a home-side terminal and an analog telephone line or N-ISDN for transmission of information from a home-side terminal to a center-side terminal (it is not always necessary that pictures, audio, and data are multiplexed).

Moreover, it is possible to use a communication system using radio such as IrDA, PHS (Personal Handy Phone), or radio LAN. Furthermore, a purposed terminal can be a portable terminal such as a portable information terminal or a desktop terminal such as a setup BOX or personal computer. Furthermore, a video telephone, multipoint monitoring system, multimedia database retrieval system, and game are listed as application fields. The present invention includes not only a receiving terminal but also a server and a repeater to be connected to a receiving terminal.

Furthermore, in the case of the above examples, a method for avoiding the overlap of the (communication) header of RTP with AL information and a method for extending the communication header of RTP or AL information are described. However, it is not always necessary for the present invention to use RTP. For example, it is also possible to newly define an original communication header or AL information by using UDP or TCP. Though an internet profile uses RTP sometimes, a multifunctional header such as RTP is not defined for a Raw profile. There are four types of concepts about AL information and communication header as described above.

Thus, by dynamically deciding the information frame of data control information, transmission control information, or control information used by the transmitting and receiving terminals (e.g. information frame including the sequence of information to be added and the number of bits for firstly assigning a random access flag as 1-bit flag information and secondly assigning 16 bits in the form of a sequence number), it is possible to change only an information frame corresponding to the situation in accordance with the purpose or transmission line.

The frame of each piece of information can be any one of the frames already shown in FIGS. 6(a) to 6(d) and in the case of RTP, the data control information (AL) can be the header information for each medium (e.g. in the case of H.263, the header information of the video or that of the payload intrinsic to H.263), transmission control information can be the header information bf RTP, and control information can be the information for controlling RTP such as RTCP.

Moreover, in the case of a publicly-known information frame previously set between transmitting and receiving terminals, by providing a default identifier for showing whether to process information by transmitting and receiving for data control information, transmission control information, and control information (information transmitted through a packet different from that of data to control terminal processing) respectively, it is possible to know whether information frames are changed. By setting the default identifier and communicating the changed content (such as change of time stamp information from 32 to 16 bits) only when change is performed in accordance with the method shown in FIG. 16, it is prevented to transmit unnecessary configuration information even when frame information of information is not changed.

For example, the following two methods are considered to change information frames of data control information. First, to describe a method for changing information frames of data control information in data, the default identifier (to be written in a fixed region or position) of the information present in the data described for the information frame of data control information is set and then, information frame change contents are described.

To change information frames of data control information by describing a method for changing only the information frames of data in the control information (information frame control information) as another method, a default identifier provided for control information is set, the contents of the information frames of the data control information to be changed are described, and it is communicated to a receiving terminal in accordance with ACK/Reject and confirmed that the information frames of the data control information are changed and thereafter, the data in which information frames are changed is transmitted. Information frames of transmission control information and control information can be also changed in accordance with the above two methods (FIG. 19).

More specifically, though the header information of MPEG2 is fixed, by providing a default identifier for a program map table (defined by PSI) for relating the video stream of MPEG2-Ts (transport stream) with the audio stream of it and defining a configuration stream in which a method for changing frames of the information for the video stream and audio stream is described, it is possible to first interpret the configuration stream and then, interpret the headers of the video and audio streams in accordance with the content of the configuration stream when the default identifier is set. It is possible for the configuration stream to have the contents shown in FIG. 19.

The contents (transmitted-format information) of the present invention about a transmission method and/or a structure of the data to be transmitted correspond to, for example, an information frame in the case of the above embodiment.

Figure 44:
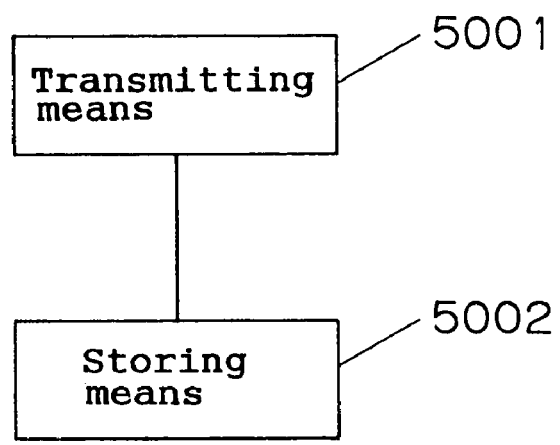
FIG. 44 is a block diagram showing an audio-video transmitter of the present invention.
Figure 45:
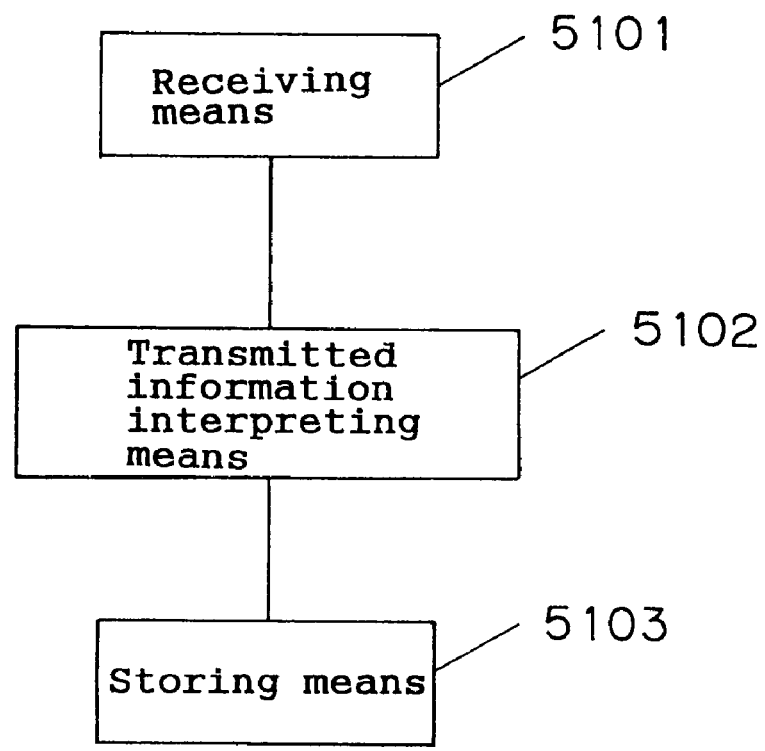
FIG. 45 is a block diagram showing an audio-video receiver of the present invention.

Moreover, for the above embodiments, a case of transmitting the contents to be changed concerned with a transmission method and/or the structure of the data to be transmitted is mainly described. However, it is also possible to use a structure for transmitting only the identifier for the contents. In this case, as shown in FIG. 44, it is also possible to use an audio-video transmitter provided with (1) transmitting means 5001 for transmitting the content concerned with a transmission method and/or the structure of the data to be transmitted or an identifier showing the content as the transmitted-format information through the transmission line same as that of the data to be transmitted or a transmission line different from the former transmission line and (2) storing means 5002 for storing a plurality of types of the contents concerned with the transmission method and/or the structure of the data to be transmitted and a plurality of types of identifiers for the contents, in which the identifiers are included in at least one of the data control information, transmission control information, and information for controlling terminal-side processing. Moreover, as shown in FIG. 45, it is possible to use an audio-video receiver provided with receiving means 5101 for receiving the transmission format information transmitted from the audio-video transmitter and transmission information interpreting means 5102 for interpreting the received transmission format information. Furthermore, the audio-video receiver can be constituted with storing means 5103 for storing a plurality of types of contents concerned with the transmission method and/or the structure of the data to be transmitted and a plurality of types of identifiers for the contents to use the contents stored in the storing means to interpret the contents of the identifiers when receiving the identifiers as the transmission format information.

More specifically, by preparing a plurality of types of information frames previously determined between transmitting and receiving terminals and transmitting identifiers for the above information frames and information frame identifiers for a plurality of types of data control information, a plurality of types of transmission control information, and a plurality of types of control information (information-frame control information) together with data or as control information, it is possible to identify a plurality of types of data control information, a plurality of types of transmission control information, and a plurality of types of control information and optionally select the information frame of each type of information in accordance with the type of a medium to be transmitted or the size of a transmission line. Identifiers of the present invention correspond to the above information frame identifiers.

It is possible to read and interpret these information identifiers and default identifiers even if information frames are changed at a receiving-side terminal by adding the identifiers to a predetermined fixed-length region or predetermined position of the information to be transmitted.

Moreover, in addition to the structures described for the above embodiments, it is possible to use a structure for temporarily selecting the caption picture of a program to be looked and listened by the user and showing it for the user when it takes a lot of time to set up a necessary program or data by using a broadcasting channel for broadcasting only the heading pictures of pictures broadcasted through a plurality of channels and switching programs to be looked and listened by the user.

As described above, the present invention makes it possible to change frames of the information corresponding to the situation in accordance with the purpose or transmission line by dynamically determining the frame of data control information, transmission control information, or control information used by transmitting and receiving terminals.

Moreover, it is possible to know whether information frames are changed by providing a default identifier for showing whether to transmit or receive and process information by a publicly-known information frame previously set between transmitting and receiving terminals for data control information, transmission control information, and control information respectively and it is possible to prevent unnecessary configuration information from being transmitted even if information frames of information are not changed by setting a default identifier and communicating changed contents only when change is performed.

Furthermore, it is possible to identify a plurality of types of data control information, a plurality of types of transmission control information, and a plurality of types of control information by preparing a plurality of information frames previously determined between transmitting and receiving terminals and transmitting information frame identifiers for identifying a plurality of types of data control information, a plurality of types of transmission control information, and a plurality of types of control information together with data or as control information and optionally select the information frame of each type of information in accordance with the type of a medium to be transmitted or the size of a transmission line.

It is possible to read and interpret these information identifiers and default identifiers even if information frames are changed at a receiving-side terminal by adding the identifiers to a predetermined fixed-length region or predetermined position of the information to be transmitted.

Embodiments of the present invention are described below by referring to the accompanying drawings.

In this case, any one of the above-described problems (B1) to (B3) is solved.

A "picture (or video)" used for the present invention includes both a static picture and a moving picture. Moreover, a purposed picture can be a two-dimensional picture such as a computer graphics (CG) or three-dimensional picture data constituted with a wire-frame model.

Figure 25:
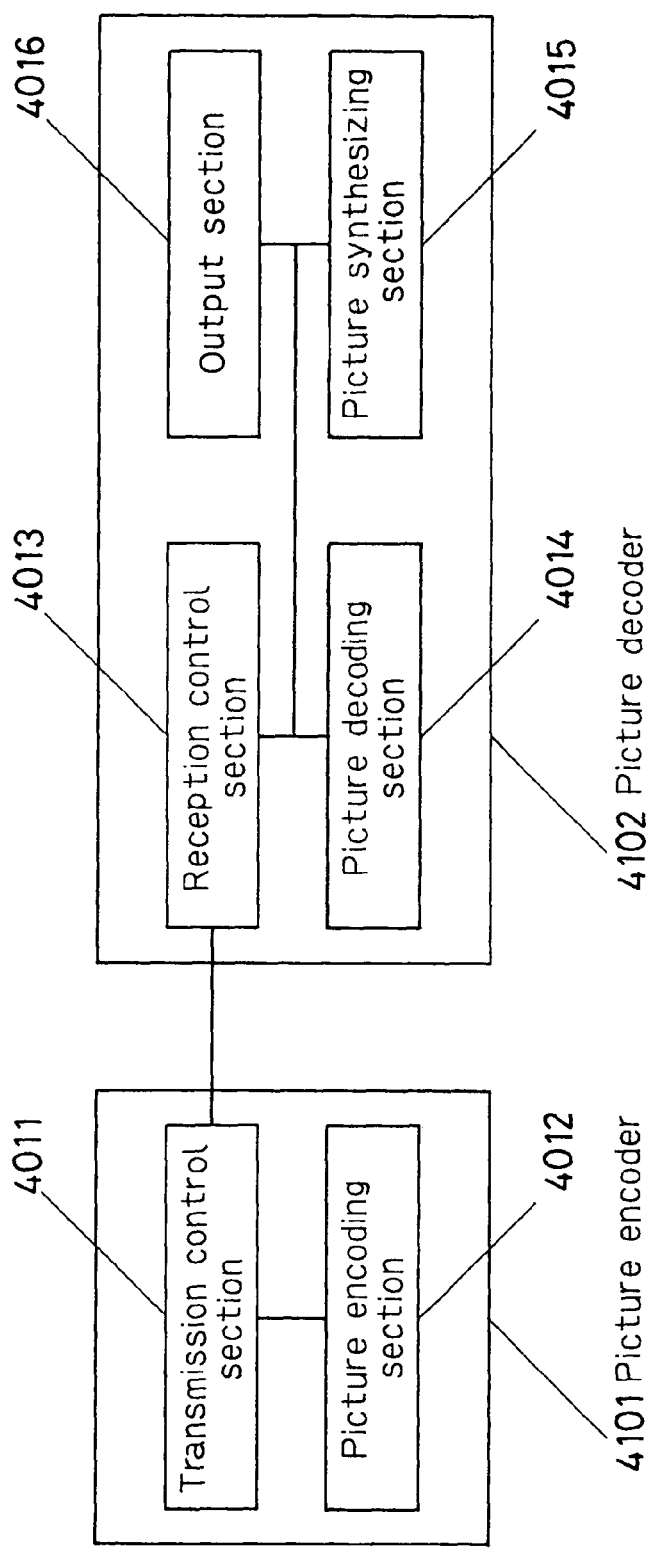
FIG. 25 is a schematic block diagram of a video encoder and a video decoder of an embodiment of the present invention.

FIG. 25 is a schematic block diagram of the picture encoder and a picture decoder of an embodiment of the present invention.

A transmission control section 4011 for transmitting or recording various pieces of encoded information is means for transmitting the information for coaxial cable, CATV, LAN, or modem. A picture encoder 4101 has a picture encoding section 4012 for encoding picture information such as H.263, MPEG1/2, JPEG, or Huffman encoding and the transmission control section 4011. Moreover, a picture decoder 4102 has an output section 4016 constituted with a reception control section 4013 for receiving various pieces of encoded information, a picture decoding section 4014 for decoding various pieces of received picture information, a picture synthesizing section 4015 for synthesizing one decoded picture or more, and an output section 4016 constituted with a display and a printer for outputting pictures.

Figure 26:
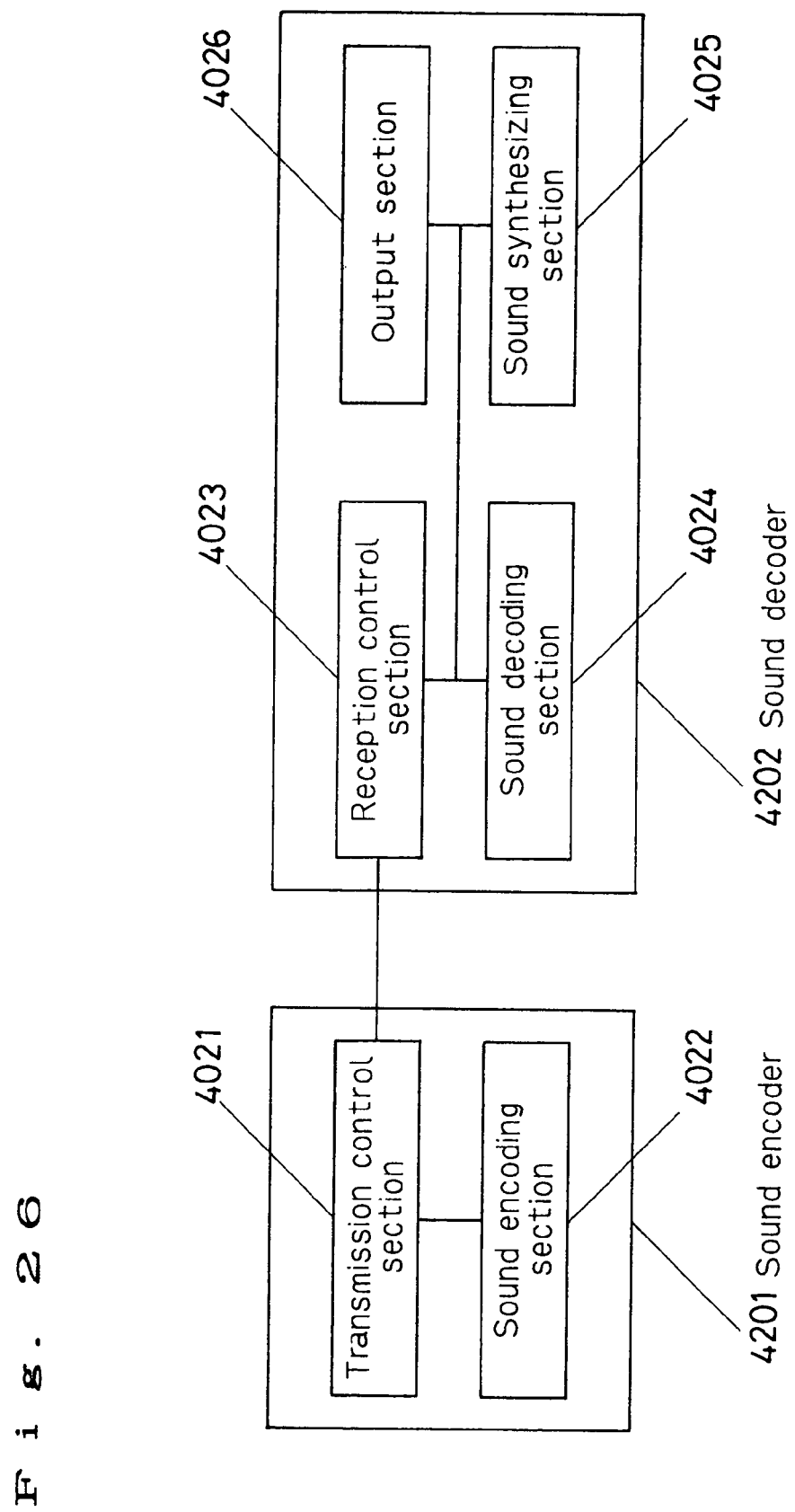
FIG. 26 is a schematic block diagram of an audio encoder and an audio decoder of an embodiment of the present invention.

FIG. 26 is a schematic block diagram of the audio encoder and an audio decoder of an embodiment of the present invention.

An audio encoder(sound encoder) 4201 is constituted with a transmission control section 4021 for transmitting or recording various pieces of encoded information and an audio encoding section 4022 for encoding such audio information such as G.721 or MPEG1 audio. Moreover, an audio decoder(a sound decoder) 4202 is constituted with a reception control section 4023 for receiving various pieces of encoded information, an audio decoding section 4024 for decoding the above pieces of audio information, an audio synthesizing section (a sound synthesizing section) 4025 for synthesizing one decoded audio or more, and output means 4026 for outputting audio.

Time-series data for audio or picture is specifically encoded or decoded by the above encoder or decoder.

The communication environments in FIGS. 25 and 26 can be a communication environment in which a plurality of logical transmission lines can be used without considering multiplexing means like the case of internet or a communication environment in which multiplexing means must be considered like the case of an analog telephone or satellite broadcasting. Moreover, a system for bilaterally transferring a picture or audio between terminals like a video telephone or video conference or a system for broadcasting a broadcasting-type picture or audio on satellite broadcasting, CATV, or internet is listed as a terminal connection system.

Moreover, a method for synthesizing a picture and audio can be defined by describing a picture and an audio, structural information for a picture and an audio (display position and display time), an audio-video grouping method, a picture display layer (depth), and an object ID (ID for identifying each object such as a picture or audio) and the relation between the attributes of them with a script language such as JAVA, VRML, or MHEG. A script describing a synthesizing method is obtained from a network or local memory.

Moreover, it is possible to constitute a transmitting or receiving terminal by optionally combining an optional number of picture encoders, picture decoders, audio encoders, and audio decoders.

Figure 27A:
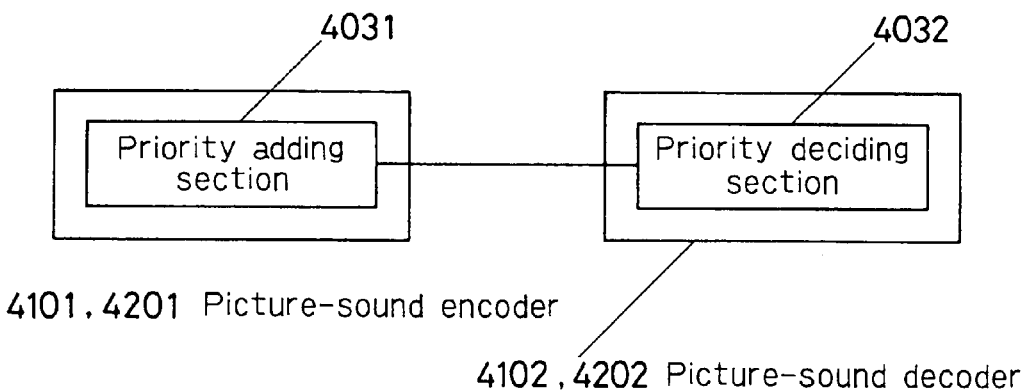
FIGS. 27(a) and 27(b) are illustrations showing a priority adding section and a priority deciding section for controlling the priority of processing under overload.

FIG. 27(a) is an illustration for explaining a priority adding section and a priority deciding section for controlling the priority for processing under overload. A priority adding section 31 for deciding the priority for processing encoded information under overload in accordance with a predetermined criteria by an encoding method such as H.263 or G.723 and relating the encoded information to the decided priority is provided for the picture encoder 4101 and audio encoder 4201.

The criteria for adding a priority are scene change in the case of a picture and audio and audioless blocks in the case of a picture frame, stream, or audio designated by an editor or user.

A method for adding a priority to a communication header and a method for embedding a priority in the header of a bit stream to be encoded of a video or audio under encoding are considered as priority adding methods for defining a priority under overload. The former method makes it possible to obtain the information concerned with a priority without decoding the information and the latter method makes it possible to independently handle a single bit stream without depending on a system.

Figure 27B:
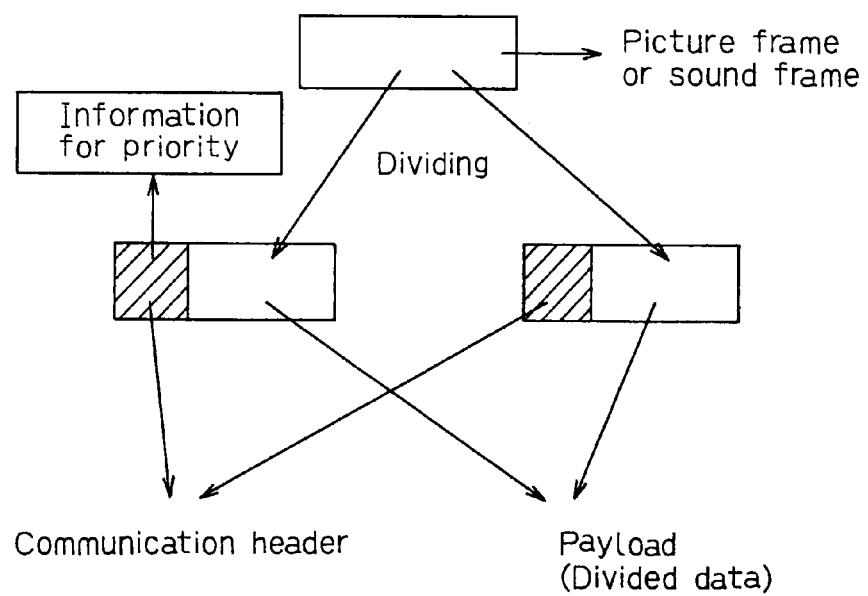

As shown in FIG. 27(b), when priority information is added to a communication header and one picture frame (e.g. intra-frame encoded I-frame or inter-frame encoded P- or B-frame) is divided into a plurality of transmission packets, a priority is added only to a communication header for transmitting the head of a picture frame accessible as single information in the case of a picture (when priorities are equal in the same picture frame, it is possible to assume that the priorities are not changed until the head of the next accessible picture frame appears).

Moreover, in the case of a decoder, a priority deciding section 32 for deciding a processing method is provided for the picture decoder 4102 and audio decoder 4202 in accordance with the priorities of various pieces of encoded information received under overload.

Figure 28A:
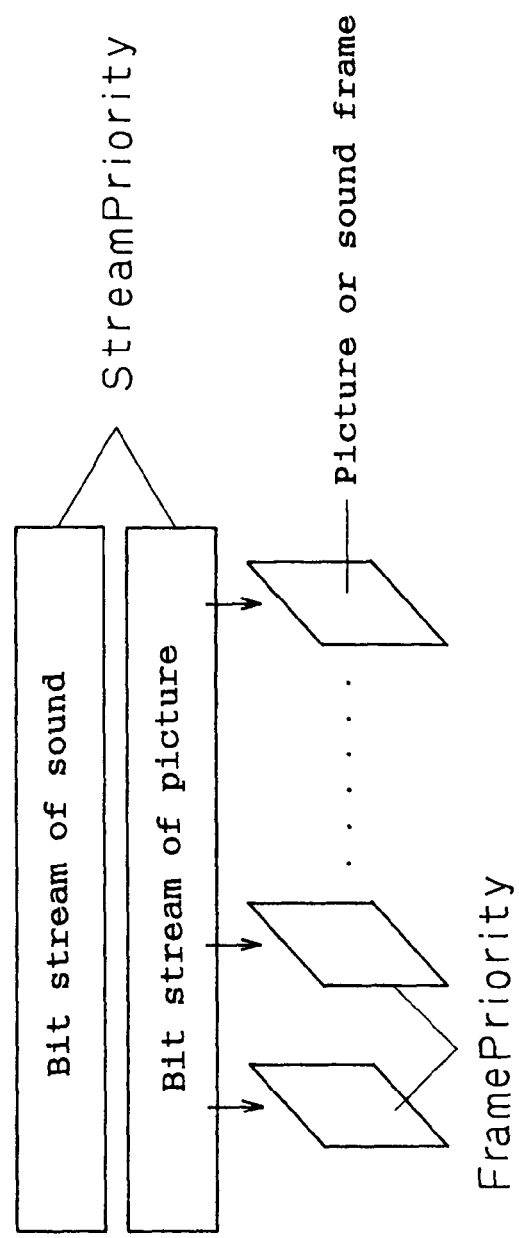
Figure 28B:
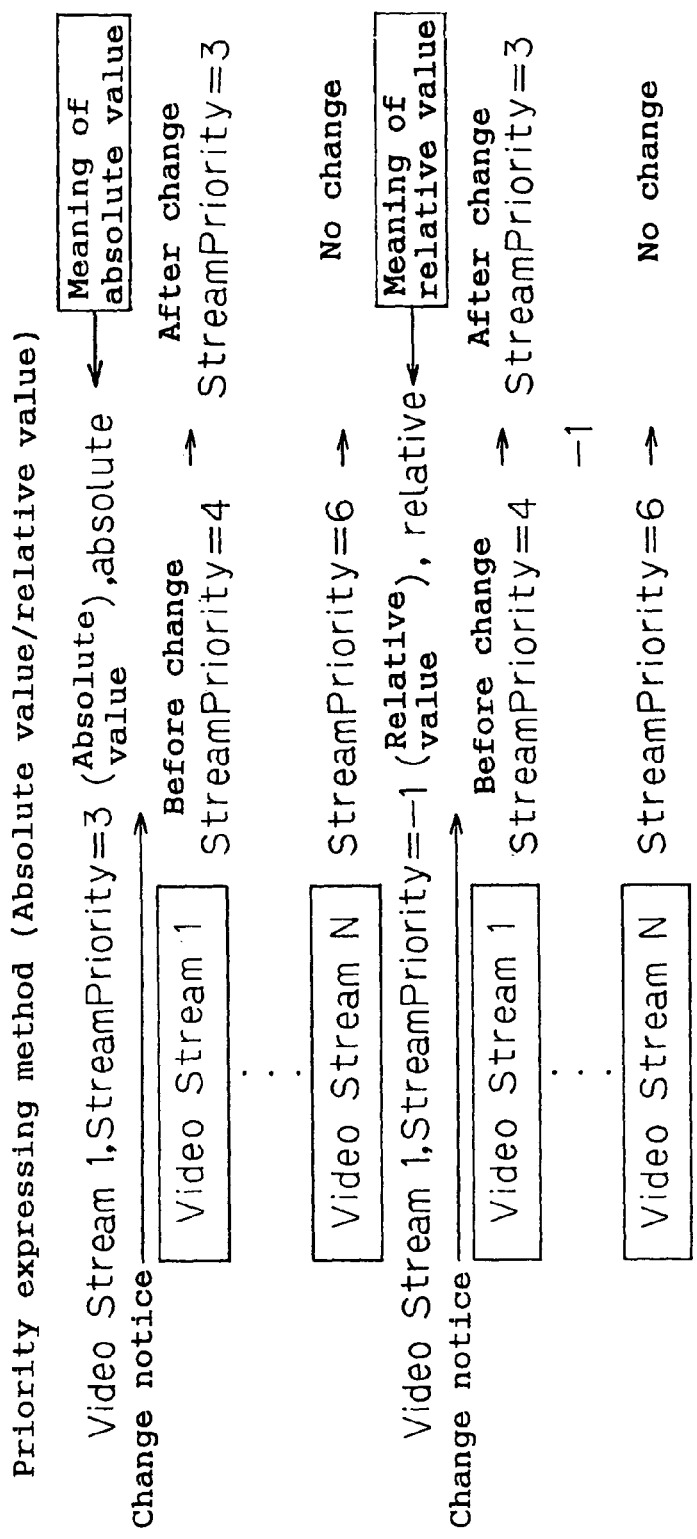

FIGS. 28(a) to 28(c) are illustrations for explaining the grading for adding a priority. Decoding is performed by using two types of priorities for deciding the priority for processing under overload at a terminal.

That is, a stream priority (Stream Priority; inter-time-series-data priority) for defining the priority for processing under overload in bit streams such as picture and audio and a frame priority (Frame Priority; intra-time-series-data priority) for defining the priority for processing under overload in frames such as picture frames in the same stream are defined (see FIG. 28(a)).

The former stream priority makes it possible to handle a plurality of videos or audios. The latter frame priority makes it possible to add a different priority to a picture scene change or the same intra-frame encoded picture frame (I-frame) in accordance with the intention of an editor.

A value expressed by the stream priority represents a case of handling it as a relative value and a case of handling it as an absolute value (see FIGS. 28(b) and 28(c)).

The stream and frame priorities are handled by a repeating terminal such as a router or gateway on a network and by transmitting and receiving terminals in the case of a terminal.

Two types of methods for expressing an absolute value or relative value are considered. One of them is the method shown in FIG. 28(b) and the other of them is the method shown in FIG. 28(c).

In FIG. 28(b), the priority of an absolute value is a value showing the sequence in which picture streams (video streams) or audio streams added by an editor or mechanically added are processed (or to be processed) under overload (but not a value considering the load fluctuation of an actual network or terminal). The priority of a relative value is a value for changing the value of an absolute priority in accordance with the load of a terminal or network.

By dividing a priority into a relative value and an absolute value to control the values and thereby changing only relative values at the transmitting side or by a repeater in accordance with the load fluctuation of a network or the like, it is possible to record the value of an absolute value into a hard disk or VTR while leaving the absolute priority added to a video or audio stream. Thus, when the value of the absolute priority is recorded, it is possible to reproduce a picture or audio that is not influenced by the load fluctuation of a network or the like. Moreover, it is possible to transmit a relative or absolute priority through a control channel independently of data.

Moreover, in FIG. 28(b), it is possible to fine the grading compared to a stream priority and handle a frame priority for defining the priority for frame processing under overload as the value of a relative priority or handle it as the value of an absolute priority. For example, by describing an absolute frame priority in encoded picture information and describing a relative frame priority corresponding to the absolute priority added to the picture frame in the communication header of a communication packet for transmitting encoded information in order to reflect the load fluctuation of a network or terminal, it is possible to add a priority corresponding to the load of a network or terminal even at a frame level while leaving an original priority.

Moreover, it is possible to transmit a relative priority by describing the relation with a frame not in a communication header but in a control channel independently of data. Thereby, it is possible to record data into a hard disk or VTR while leaving an absolute priority originally added to a picture or audio stream.

Furthermore, in FIG. 28(b), when reproducing data at a receiving terminal while transmitting the data through a network without recording the data at the receiving terminal, it is possible to compute the value of an absolute priority and that of a relative priority at frame and stream levels at the transmitting side and thereafter transmit only absolute values because it is unnecessary to control absolute and relative values by separating them from each other at a receiving terminal.

In FIG. 28(c), the priority of an absolute value is a value uniquely determined between frames obtained from the relation between Stream Priority and Frame Priority. The priority of a relative value is a value showing the sequence in which picture streams or audio streams added by an editor or mechanically added are processed (or to be processed) under overload. In the case of the example in FIG. 28(c), the frame priority of a picture or audio stream (relative; relative value) and the stream priority for each stream are added.

An absolute frame priority (absolute; absolute value) is obtained from the sum of a relative frame priority and a stream priority (That is, absolute frame priority=relative frame priority+stream priority). To obtain an absolute frame priority, it is also possible to use a subtracting method or a constant-multiplying method.

An absolute frame-priority mainly uses a network. This is because the expression using an absolute value does not require the necessity for deciding a priority for each frame through a repeater such as a router or gateway by considering Stream Priority and Frame Priority. By using the absolute frame priority, such processing as disuse of a frame by a repeater is simplified.

Moreover, it can be expected to apply a relative frame priority mainly to an accumulation system for performing recording or editing. In the case of an editing operation, a plurality of picture and audio streams may be handled at the same time. In this case, the number of picture streams or the number of frames that can be reproduced may be limited depending on the load of a terminal or network.

In the above case, it is unnecessary to recalculate every Frame Priority differently from the case in which an absolute value is expressed only by separating Stream Priority from Frame Priority, that is, only by changing Stream Priority of a stream which an editor wants to preferentially display or a user wants to see. Thus, it is necessary to use an absolute expression or a relative expression in accordance with the purpose.

By describing whether to use a stream priority as a relative value or absolute value, it is possible to effectively express a priority for transmission and accumulation.

In the case of the example in FIG. 28(b), it is differentiated by following a stream priority that the value expressed by the stream priority is a relative value or absolute value by using a flag or identifier for expressing whether the value expressed by the stream priority is an absolute value or relative value. In the case of a frame priority, a flag or identifier is unnecessary because a relative value is described in a communication header and an absolute value is described in an encoded frame.

In the case of the example in FIG. 28(c), a flag or identifier for identifying whether a frame priority is an absolute value or relative value is used. In the case of an absolute value, the frame priority is a priority calculated in accordance with a stream priority and a relative frame priority and therefore, the calculation is not performed by a repeater or terminal. Moreover, when the calculation formula is already known at a terminal, it is possible to inversely calculate a relative frame priority from an absolute frame priority and a stream priority. For example, it is also possible to obtain the absolute priority (Access Unit Priority) of a packet to be transmitted from the relational expression "Access Unit Priority=stream priority−frame priority".

In this case, it is also possible to express the frame priority as a degradation priority because it is obtained after being subtracted from the stream priority.

Moreover, it is also possible to control data processing by relating one stream priority or more to the priority for processing of the data passing through the logical channel of TCP/IP (port No. of LAN).

Furthermore, it is expected that the necessity for retransmission can be reduced by assigning a stream priority or frame priority lower than that of a character or control information to a picture or audio. This is because no problem occurs in most cases even if a part of a picture or audio is lost.

Figure 29:
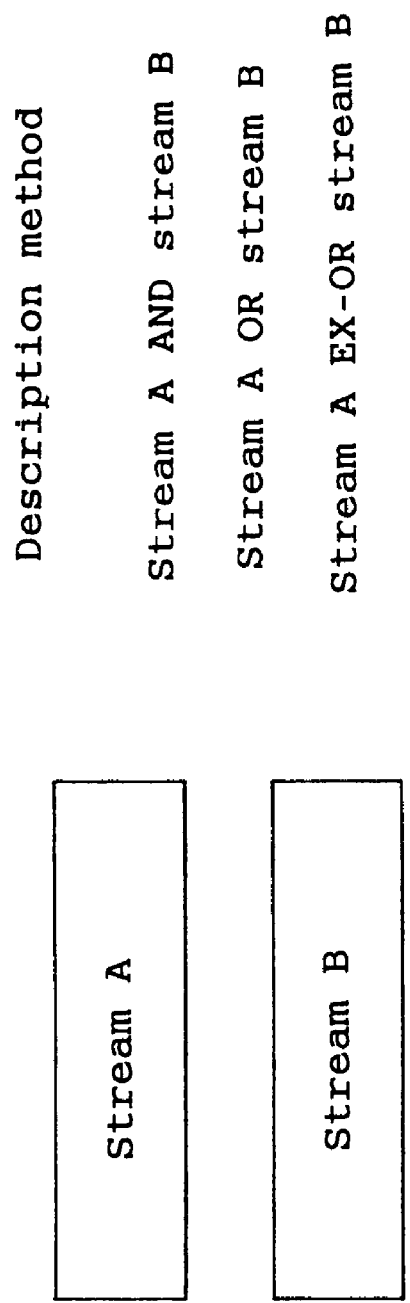
FIG. 29 is an illustration showing a method for assigning a priority to multi-resolution video data.

FIG. 29 is an illustration for explaining a method for assigning a priority to multi-resolution video data.

When one stream is constituted with a plurality of substreams, it is possible to define a substream processing method by adding a stream priority to the substreams and describing a logical sum or logical product under accumulation or transmission.

In the case of a wavelet, it is possible to decompose one picture frame into a plurality of different-resolution picture frames. Moreover, even in the case of a DCT-base encoding method, it is possible to decompose one picture frame into a plurality of different-resolution picture frames by dividing the picture frame into a high-frequency component and a low-frequency component and encoding them.

In addition to stream priorities added to a plurality of picture streams constituted with a series of decomposed picture frames, the relation between picture streams is defined with AND (logical product) and OR (logical sum) in order to describe the relation. Specifically, when the stream priority of a stream A is 5 and that of a stream B is 10 (the smaller a numerical value gets, the higher a priority becomes), the relation between picture streams is defined that the stream B is disused in the case of disuse of stream data depending on the priority but the stream B is transmitted and processed without being disused even if the priority of the stream B is lower than the priority of a threshold in the case of AND by describing the relation between streams.

Thereby, relevant streams can be processed without being disused. In the case of OR, it is defined that relevant streams can be disused. It is possible to perform disuse processing at a transmitting or receiving terminal or a repeating terminal as ever.

Moreover, when the same video clip is encoded to 24 Kbps and 48 Kbps respectively as an operator for relational description, there is a case in which either 24 or 48 Kbps may be reproduced (exclusive logical sum EX-OR as relational description).

When the priority of the former is set to 10 and that of the latter is set to 5, a user can reproduce the latter in accordance with a priority or select the latter without following the priority.

Figure 30:
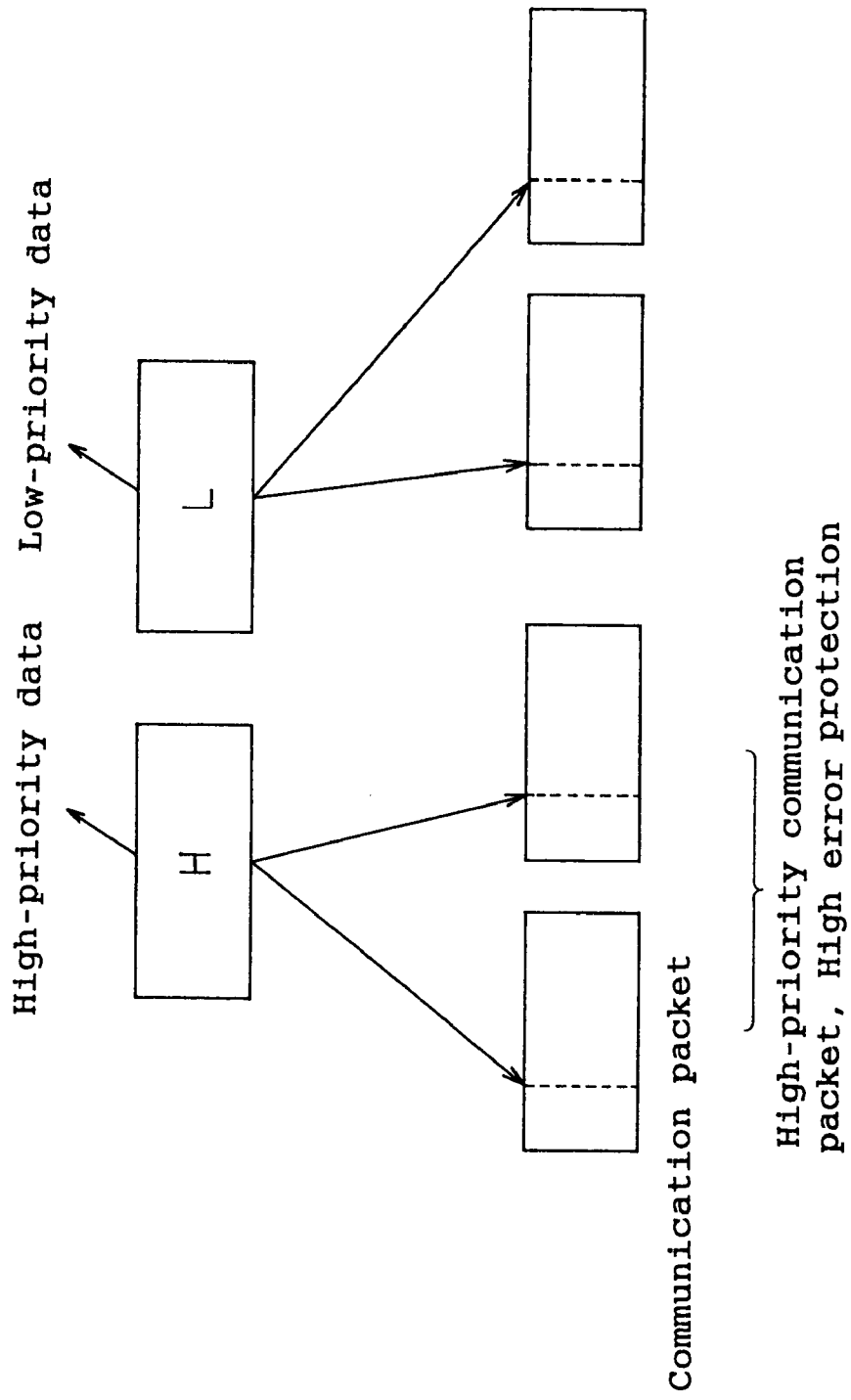
FIG. 30 is an illustration showing a method for constituting a communication payload.

FIG. 30 is an illustration for explaining a communication payload constituting method.

When constituted with a plurality of substreams, disuse at a transmission packet level becomes easy by, for example, constituting transmission packets starting with, for example, one having the highest priority in accordance with a stream priority added to a substream. Moreover, disuse at a communication packet level becomes easy by fining grading and uniting the information for objects respectively having a high frame priority and thereby constituting a communication packet.

By relating the sliced structure of a picture to a communication packet, return of a missing packet becomes easy. That is, by relating the sliced structure of a video to a packet structure, a re-sync marker for resynchronization is unnecessary. Unless a sliced structure coincides with the structure of a communication packet, it is necessary to add a re-sync marker (marker for making a returning position known) so that resynchronization can be performed if information is damaged due to a missing packet).

In accordance with the above-mentioned, it is considered to apply a high error protection to a communication packet having a high priority. Moreover, the sliced structure of a picture represents the unit of collected picture information such as GOB or MB.

FIG. 31 is an illustration for explaining a method for relating data to communication payload. By transmitting a method for relating a stream or object to a communication packet together with control information or data, it is possible to generate an optional data format in accordance with the communication state or purpose. For example, in the case of RTP (Real time Transfer Protocol), the payload of RTP is defined for each encoding to be handled. The format of the existing RTP is fixed. In the case of H.263, as shown in FIG. 31, three data formats from Mode A to Mode C are defined. In the case of H.263, a communication payload purposing a multi-resolution picture format is not defined.

In the case of the example in FIG. 31, Layer No. and the above relational description (AND, OR) are added to the data format of Mode A and defined.

Figure 32:
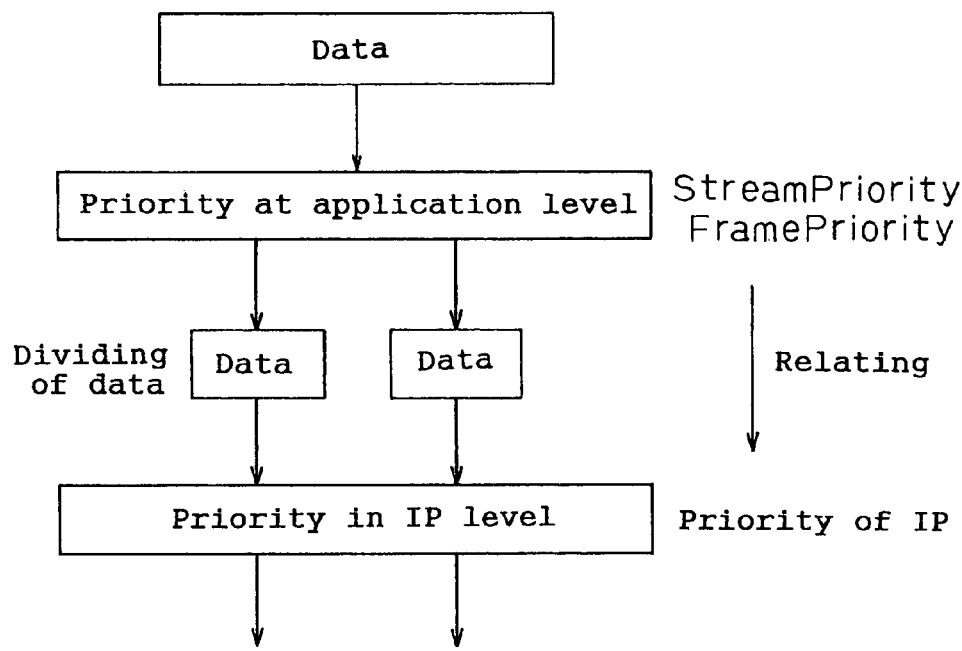
FIG. 32 is an illustration showing the relation between object priority, stream priority, and communication packet priority.

FIG. 32 is an illustration for explaining the relation between frame priority, stream priority, and communication packet priority.

Moreover, FIG. 32 shows an example of using a priority added to a communication packet on a transmission line as a communication packet priority and relating a stream priority and a frame priority to the communication packet priority.

Generally, in the case of communication using IP, it is necessary to transmit data by relating a frame priority or stream priority added to picture or audio data to the priority of a low-order IP packet. Because the picture or audio data is divided into IP packets and transmitted, it is necessary to relate priorities to each other. In the case of the example in FIG. 32, because the stream priority takes values from 0 to 3 and the frame priority takes values from 0 to 5, high-order data can take priorities from 0 to 15.

In the case of IPv6, priorities (4 bits) from 0 to 7 are reserved for congestion-controlled traffic. Priorities from 8 to 15 are reserved for real-time communication traffic or not-congestion-controlled traffic. Priority 15 is the highest priority and priority 8 is the lowest priority. This represents the priority at the packet level of IP.

In the case of data transmission using IP, it is necessary to relate high-order priorities from 0 to 15 to low-order IP priorities from 8 to 15. To relate priorities to each other, it is possible to use a method of clipping some of high-order priorities or relate priorities to each other by using a performance function. Relating of high-order data with a low-order IP priority is performed at a repeating node (router or gateway) or transmitting and receiving terminals.

Transmitting means is not restricted to only IP. It is possible to use a transmission packet having a flag showing whether it can be disused like TS (transport stream) of ATM or MPEG2.

The frame priority and stream priority having been described so far can be applied to a transmitting medium or data-recording medium. It is possible to use a floppy disk or optical disk as a data-recording medium.

Moreover, it is possible to use not only the floppy disk or optical disk but also a medium such as an IC card or ROM cassette as long as a program can be recorded in the medium. Furthermore, it is possible to use an audio-video repeater such as a router or gateway for relaying data.

Furthermore, preferential retransmission is realized by deciding time-series data to be retransmitted in accordance with the information of Stream Priority (inter-time-series-data priority) or Frame Priority (intra-time-series-data priority). For example, when decoding is performed at a receiving terminal in accordance with priority information, it is possible to prevent a stream or frame that is not an object for processing from being retransmitted.

Furthermore, separately from a present priority to be processed, it is possible to decide a stream or frame having a priority to be retransmitted in accordance with the relation between retransmission frequency and successful transmission frequency.

Furthermore, in the case of a transmitting-side terminal, preferential transmission is realized by deciding time-series data to be transmitted in accordance with the information of Stream Priority (inter-time-series-data priority) or Frame Priority (intra-time-series-data priority). For example, by deciding the priority of a stream or frame to be transmitted in accordance with an average transfer rate or retransmission frequency, it is possible to transmit an adaptive picture or audio even when a network is overloaded.

The above embodiment is not restricted to two-dimensional-picture synthesis. It is also possible to use an expression method obtained by combining a two-dimensional picture with a three-dimensional picture or include a picture-synthesizing method for synthesizing a plurality of pictures so as to be adjacent to each other like a wide-visual-field picture (panorama picture). Moreover, communication systems purposed by the present invention are not restricted to bidirectional CATV or B-ISDN. For example, transmission of pictures and audio from a center-side terminal to a house-side terminal can use radio waves (e.g. VHF band or UHF band) or satellite broadcasting and information origination from the house-side terminal to the center-side terminal can use an analog telephone line or N-ISDN (it is not always necessary that pictures, audio, or data are multiplexed). Moreover, it is possible to use a communication system using radio such as an IrDA, PHS (Personal Handy Phone) or radio LAN.

Furthermore, a purpose terminal can be a portable terminal such as a portable information terminal or a desktop terminal such as a set-top BOX or personal computer.

As described above, the present invention makes it easy to handle a plurality of video streams and a plurality of audio streams and mainly synchronize and reproduce important sc ne cut together with audio by reflecting the intention of an editor.

An embodiment of the present invention is described below by referring to the accompanying drawings.

The embodiment described below solves any one of the above problems (C1) to (C3).

Figure 33:
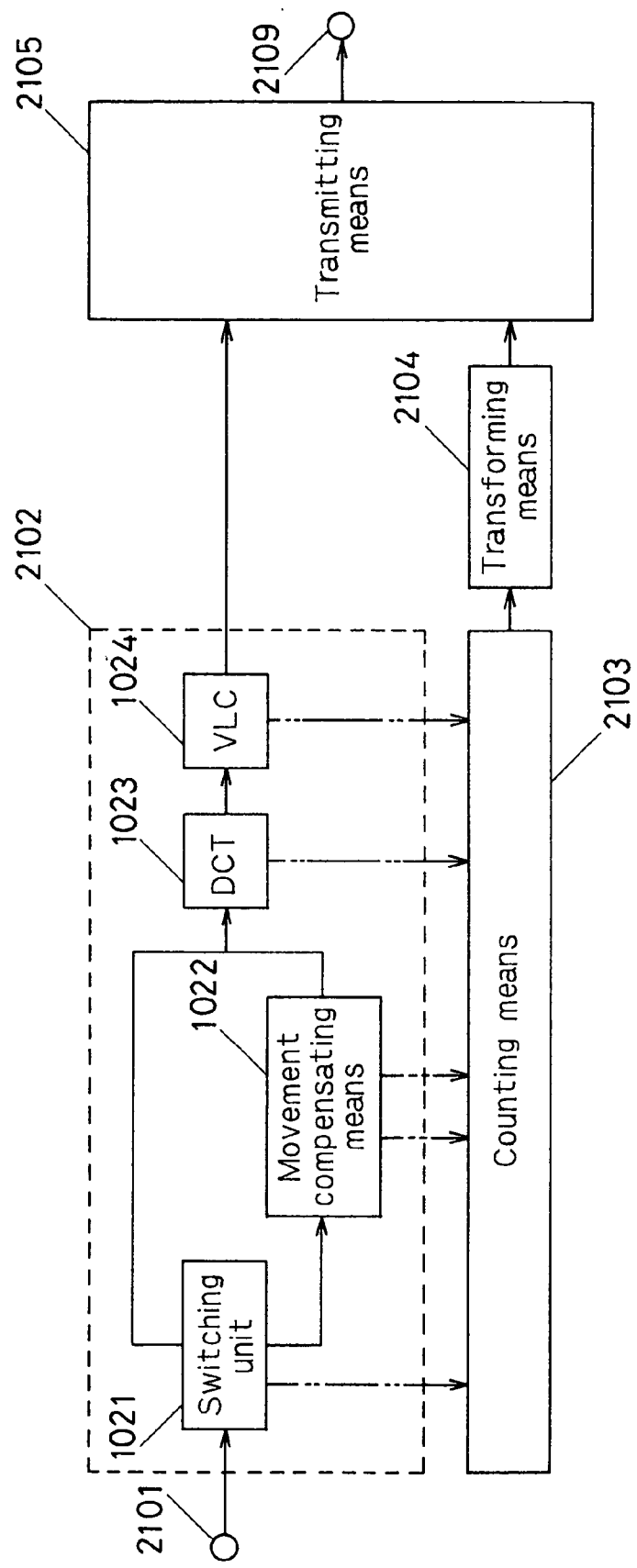
FIG. 33 is a block diagram of a transmitter of the first embodiment of the present invention.

FIG. 33 shows the structure of the transmitter of the first embodiment. Symbol 2101 denotes a picture-input terminal and the size of a sheet of picture has 144 pixels by 176 pixels. Symbol 2102 denotes a video encoder that is constituted with four components 1021, 1022, 1023, and 1024 (see Recommendation H.261).

Symbol 1021 denotes a switching unit for dividing an input picture into macroblocks (a square region of 16 pixels by 16 pixels) and deciding whether to intra-encode or inter-encode the blocks and 1022 denotes movement compensating means for generating a movement compensating picture in accordance with the local decoded picture which can be calculated in accordance with the last-time encoding result, calculating the difference between the movement compensating picture and an input picture, and outputting the result in macroblocks. Movement compensation includes halfpixel prediction having a long processing time and fullpixel prediction having a short processing time. Symbol 1023 denotes orthogonal transforming means for applying DCT transformation to each macroblock and 1024 denotes variable-length-encoding means for applying entropy encoding to the DCT transformation result and other encoded information.

Symbol 2103 denotes counting means for counting execution frequencies of four components of the video encoder 2102 and outputting the counting result to transforming means every input picture. In this case, the execution frequency of the halfpixel prediction and that of the fullpixel prediction are counted from the movement compensating means 1022.

Figure 34:
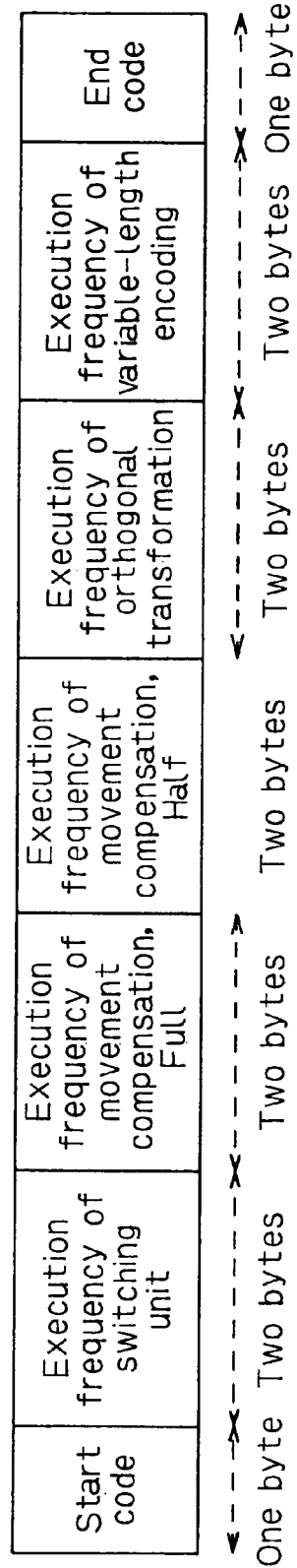
FIG. 34 is an illustration of the first embodiment.

Symbol 2104 denotes transforming means for outputting the data string shown in FIG. 34. Symbol 2105 denotes transmitting means for multiplexing a variable-length code sent from the video encoder 2102 and a data string sent from the transforming means 2104 into a data string and outputting the data string to a data output terminal 2109.

According to the above structure, it is possible to transmit the execution frequencies of indispensable processing (switching unit 1021, orthogonal transforming means 1023, and variable-length encoding means 1024) and dispensable processing (movement compensating means 1022) to a receiver.

Figure 40:
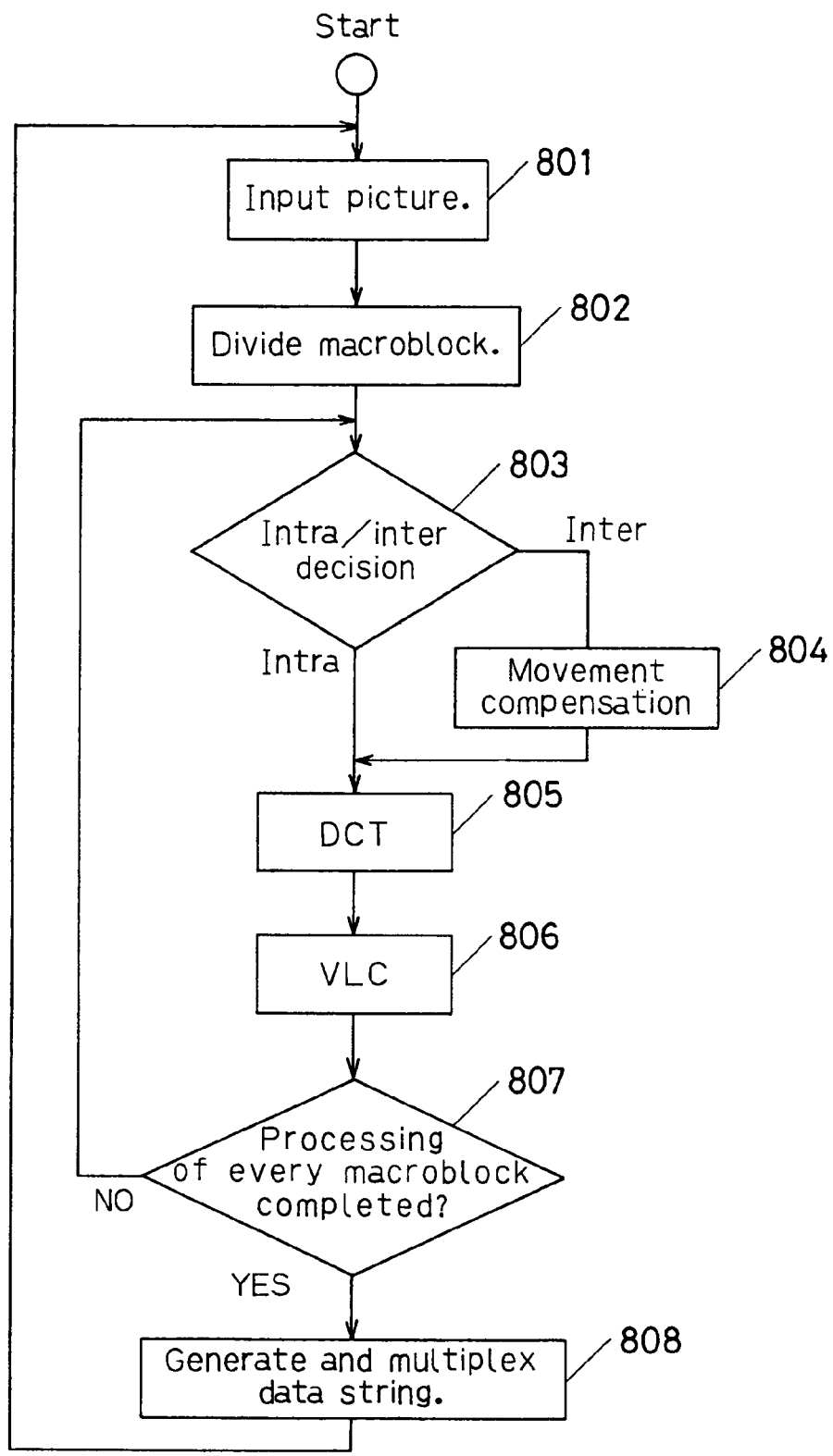
FIG. 40 is a flowchart of the transmission method of the second embodiment of the present invention.

FIG. 40 is a flowchart of the transmitting method of the second embodiment.

Because operations of this embodiment are similar to those of the first embodiment, corresponding elements are added. A picture is input in step 801 (picture input terminal 2101) and the picture is divided into macroblocks in step 802. Hereafter, processings from step 803 to step 806 are repeated until the processing corresponding to every macroblock is completed in accordance with the conditional branch in step 807. Moreover, when each processing is executed so that frequencies of the processings from step 803 to step 806 can be recorded in specific variables, a corresponding variable is incremented by 1.

First, it is decided whether to intra-encode or inter-encode a macroblock to be processed in step 803 (switching unit 1021). When inter-encoding the macroblock, movement compensation is performed in step 804 (movement compensating means 1022). Thereafter, DCT transformation and variable-length encoding are performed in steps 805 and 806 (orthogonal transforming means 1023 and variable-length encoding means 1024). When processing for every macroblock is completed (in the case of Yes in step 807), the variable showing the execution frequency corresponding to each processing is read in step 808, the data string shown in FIG. 2 is generated, and the data string and a code are multiplexed and output. The processings from step 801 to step 808 are repeatedly executed as long as input pictures are continued.

The above structure makes it possible to transmit the execution frequency of each processing.

Figure 35:
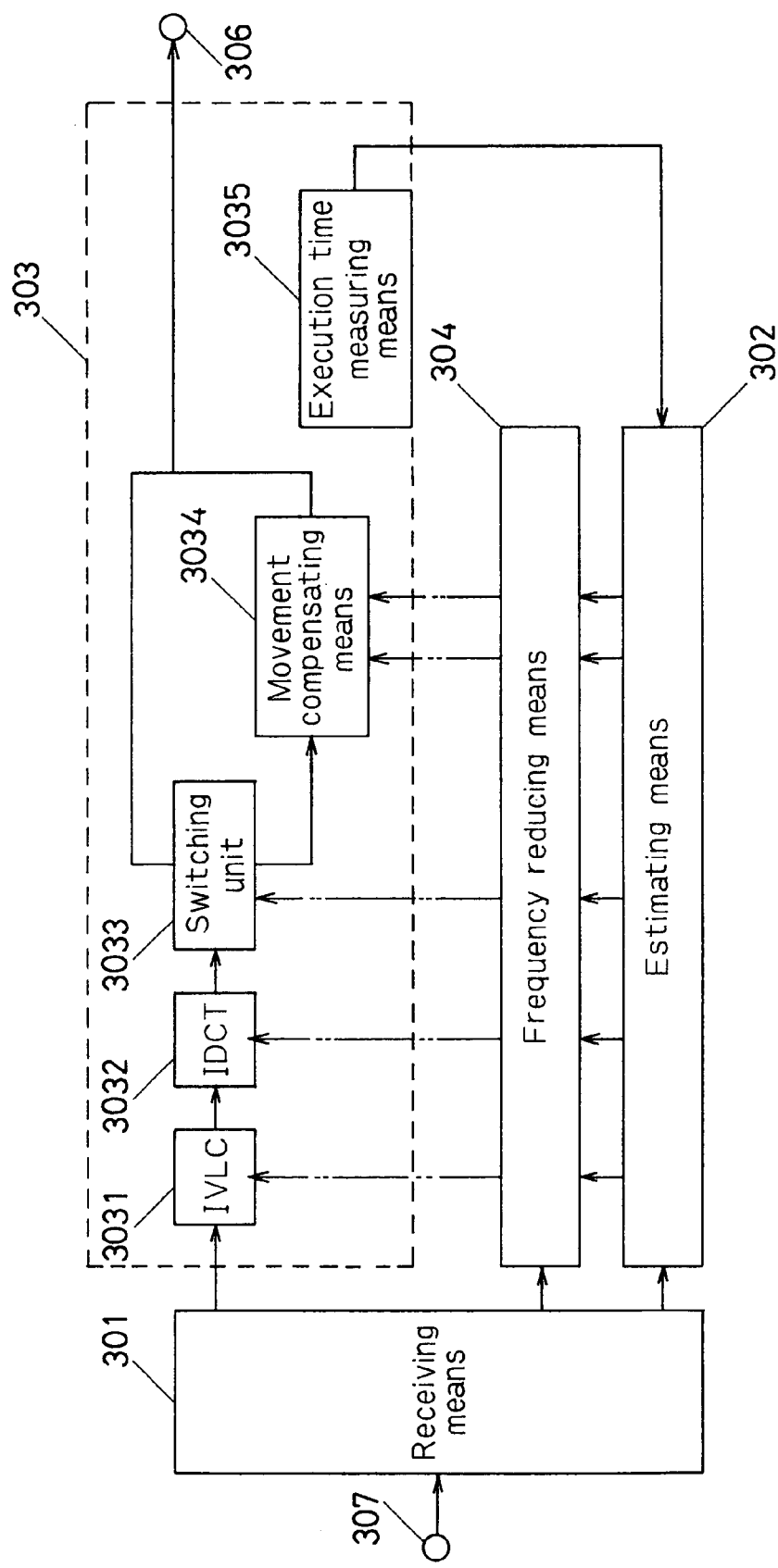
FIG. 35 is a block diagram of the receiver of the third embodiment of the present invention.

FIG. 35 shows the structure of the receiver of the third embodiment.

In FIG. 35, symbol 307 denotes an input terminal for inputting the output of the transmitter of the first embodiment and 301 denotes receiving means for fetching a variable-length code and a data string through inverse multiplexing in accordance with the output of the transmitter of the first embodiment and outputting them. In this case, it is assumed that the time required to receive the data for one sheet is measured and also output.

Symbol 303 denotes a decoder for a video using a variable-length code as an input, which is constituted with five components. Symbol 3031 denotes variable-length decoding means for fetching a DCT coefficient and other encoded information from a variable-length code, 3032 denotes inverse orthogonal transforming means for applying inverse DCT transformation to a DCT coefficient, and 3033 denotes a switching unit for switching an output to upside or downside every macroblock in accordance with the encoded information showing whether the macroblock is intra-encoded or inter-encoded. Symbol 3034 denotes movement compensating means for generating a movement compensating picture by using the last-time decoded picture and movement encoded information, and adding and outputting the outputs of the inverse orthogonal transforming means 3032. Symbol 3035 denotes execution-time measuring means for measuring and outputting the execution time until decoding and outputting of a picture is completed after a variable-length code is input to the decoder 303.

Symbol 302 denotes estimating means for receiving the execution frequency of each element (variable-length decoding means 3031, inverse orthogonal transforming means 3032, switching unit 3033, or movement compensating means 3034) from a data string sent from the receiving means 301 and execution time from the execution-time measuring means 3035 to estimate the execution time of each element.

To estimate the execution time of each element, it is possible to use the linear regression and assume an estimated execution time as a purposed variable y and the execution frequency of each component as an explanatory variable $xυi$. In this case, it may be possible to regard a regression parameter $xυi$ as the execution time of each element. Moreover, in the case of linear regression, it is necessary to accumulate much-enough past data and resultantly, many memories are wasted. However, to avoid many memories from being wasted, it is also possible to use the estimation of an internal-state variable by a Kalman filter. It is possible to consider the above case as a case in which an observed value is assumed as an execution time, the execution time of each element is assumed as an internal-state variable, and an observation matrix C changes every step due to the execution frequency of each element. Symbol 304 denotes frequency reducing means for changing the execution frequency of each element so as to reduce the execution frequency of fullpixel prediction and increase the execution frequency of halfpixel prediction by a corresponding value. The method for calculating the corresponding value is shown below.

First, the execution frequency and estimated execution time of each element are received from the estimating means 302 to estimate an execution time. When the execution time exceeds the time required to receive the data from the receiving means 301, the execution frequency of fullpixel prediction is increased and the execution frequency of halfpixel prediction is decreased until the former time does not exceed the latter time. Symbol 306 denotes an output terminal for a decoded picture.

Moreover, there is a case in which the movement compensating means 3034 is designated so as to perform halfpixel prediction in accordance with encoded information. In this case, when the predetermined execution frequency of halfpixel prediction is exceeded, a halfpixel movement is rounded to a fullpixel movement to execute fullpixel prediction.

According to the above-described first and third embodiments, the execution time of decoding is estimated in accordance with the estimated execution time of each element and, when the decoding execution time may exceed the time (designated time) required to receive the data for one sheet, halfpixel prediction having a long execution time is replaced with fullpixel prediction. Thereby, it is possible to prevent an execution time from exceeding a designated time and solve the problem (C1).

Moreover, a case of regarding the parts of indispensable and dispensable processings as two groups and a case of regarding the part of a video as waveform data.

Furthermore, by using no high-frequency components in the IDCT calculation by a receiver, it is possible to reduce the processing time for the IDCT calculation. That is, by regarding the calculation of low-frequency components as indispensable processing and the calculation of high-frequency components as dispensable processing in the IDCT calculation, it is also possible to reduce the calculation frequency of high-frequency components in the IDCT calculation.

Figure 41:
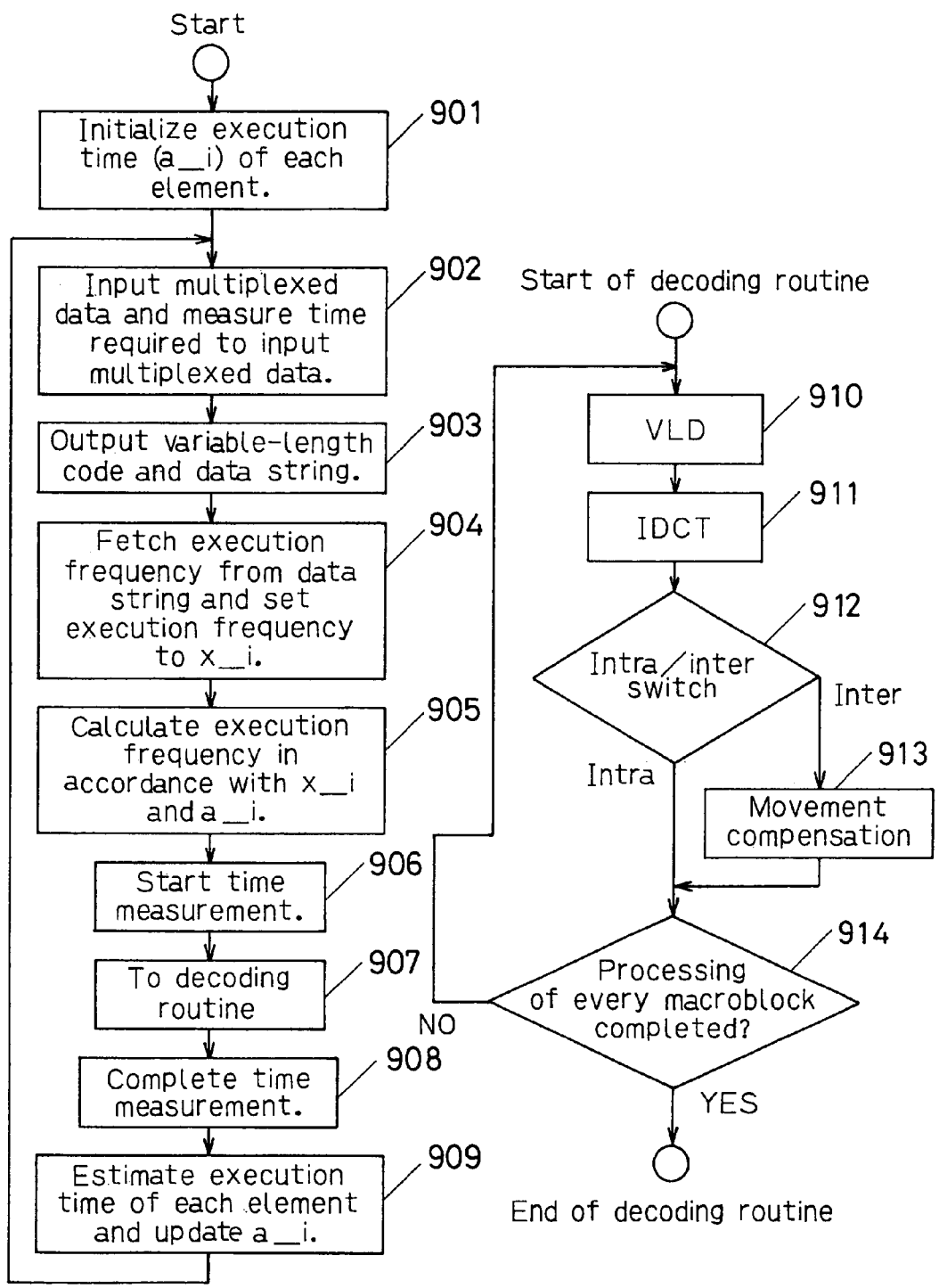
FIG. 41 is a flowchart of the reception method of the fourth embodiment of the present invention.

FIG. 41 is a flowchart of the receiving method of the fourth embodiment.

Because operations of this embodiment are similar to those of the third embodiment, corresponding elements are added. In step 901, the variable a_i for expressing the execution time of each element is initialized (estimating means 302). In step 902, multiplexed data is input and the time required for multiplexing the data is measured (receiving means 301). In step 903, the multiplexed data is divided into a variable-length code and a data string and output (receiving means 301). In step 904, each execution frequency is fetched from a data string (FIG. 2) and it is set to x_i. In step 905, an actual execution frequency is calculated in accordance with the execution time a_i of each element and each execution frequency x_i (frequency reducing means 304). In step 906, measurement of the execution time for decoding is started. In step 907, a decoding routine to be described later is started. Thereafter, in step 908, measurement of the decoding execution time is ended (video decoder 303 and execution-time measuring means 3035). In step 908, the execution time of each element is estimated in accordance with the decoding execution time in step 908 and the actual execution frequency of each element in step 905 to update a_i (estimating means 302). The above processing is executed every input multiplexed data.

Moreover, in step 907 for decoding routine, variable-length decoding is performed in step 910 (variable-length decoding means 3031), inverse orthogonal transformation is performed in step 911 (inverse orthogonal transforming means 3032), and processing is branched in step 912 in accordance with the information of the intra-/inter-processing fetched through the processing in step 910 (switching unit 3033). In the case of inter-processing, movement compensation is performed in step 913 (movement compensating means 3034). In step 913, the execution frequency of halfpixel prediction is counted in step 913. When the counted execution frequency exceeds the actual execution frequency obtained in step 905, halfpixel prediction is replaced with fullpixel prediction for execution. After the above processing is applied to very macroblock (step 914), the routine is ended.

According to the above-described second and fourth embodiments, the execution time of decoding is estimated in accordance with the estimated execution time of each element and, when the execution time may exceed the time required to receive the data for one sheet (designated time), halfpixel prediction having a long execution time is replaced with fullpixel prediction. Thereby, it is possible to prevent an execution time from exceeding a designated time and solve the problem (C1).

Furthermore, a case of regarding the parts of dispensable and indispensable processings as two groups corresponds to claims 65 and 71 and a case of regarding the part of a video as waveform data.

Figure 36:
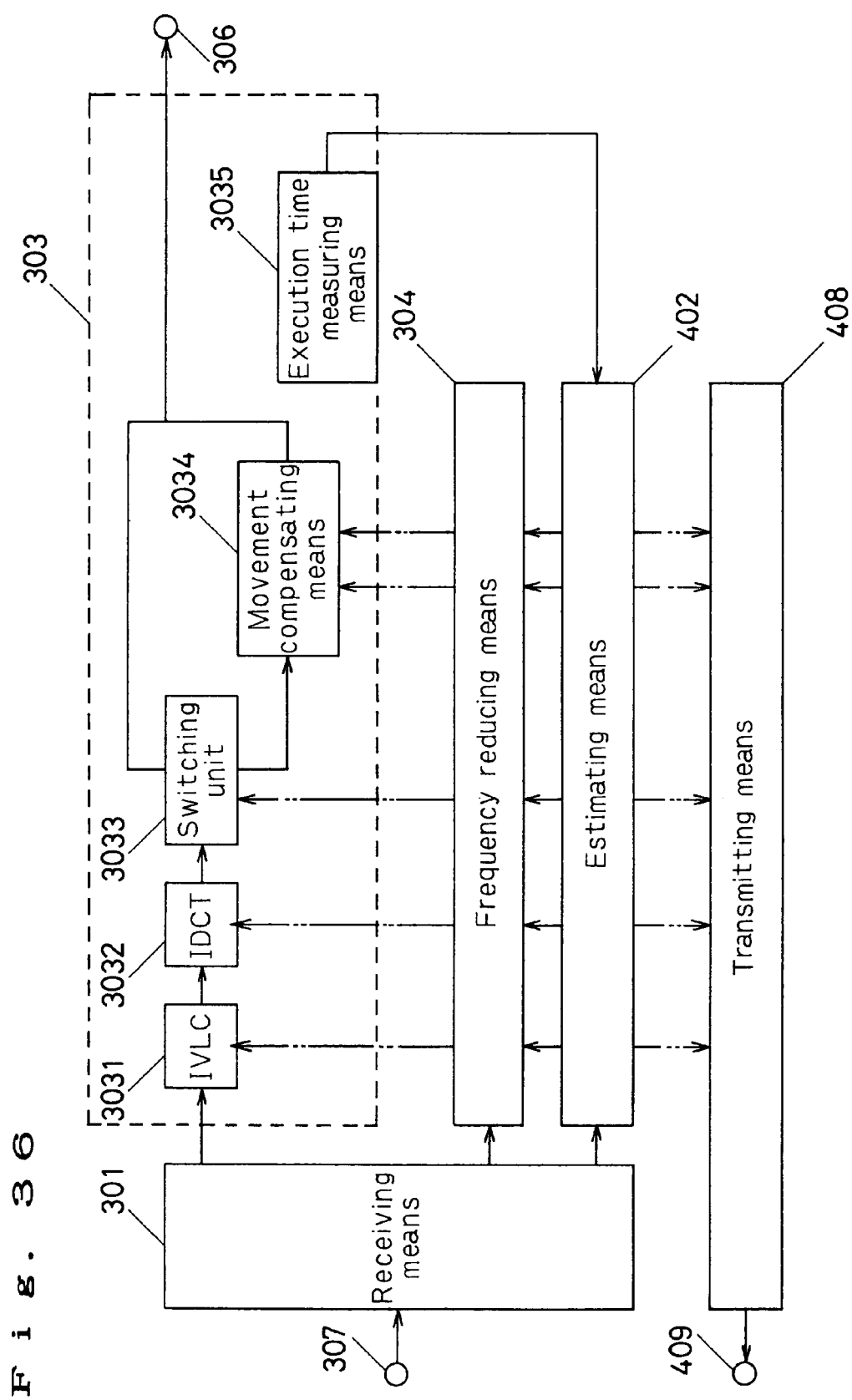
FIG. 36 is a block diagram of the receiver of the fifth embodiment of the present invention.

FIG. 36 shows the structure of the receiver of the fifth embodiment.

Most components of this embodiment are the same as those described for the second embodiment. However, two added components and one corrected component are described below.

Symbol 402 denotes estimating means obtained by correcting the estimating means 302 described for the second embodiment so as to output the execution time of each element obtained as the result of estimation separately from an output to frequency limiting means 304. Symbol 408 denotes transmitting means for generating the data string shown in FIG. 37 in accordance with the execution time of each element and outputting it. When expressing an execution time with 16 bits by using microsecond as the unit, up to approx. 65 msec can be expressed. Therefore, approx. 65 msec will be enough. Symbol 409 denotes an output terminal for transmitting the data string to transmitting means.

Figure 37:
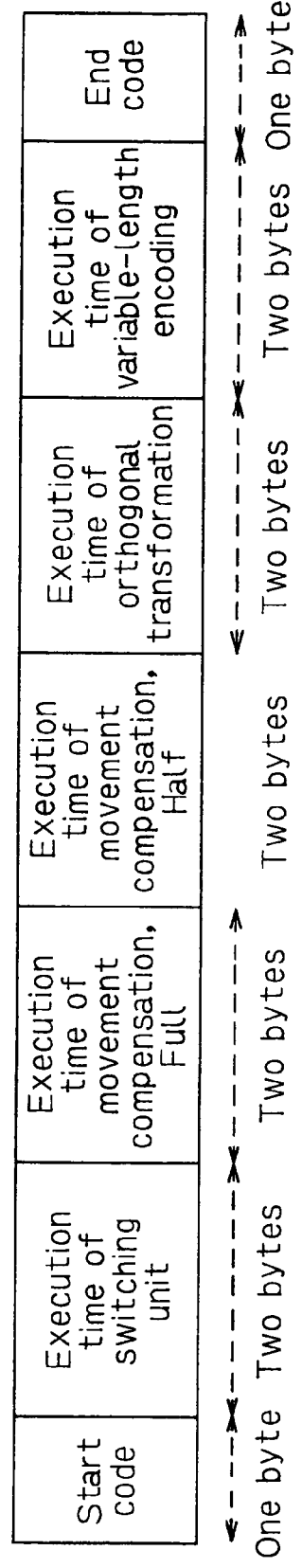
FIG. 37 is an illustration of the fifth embodiment.

Moreover, a receiving method corresponding to the fifth embodiment can be obtained only by adding a step for generating the data string shown in FIG. 37 immediately after symbol 808 in FIG. 40.

Figure 38:
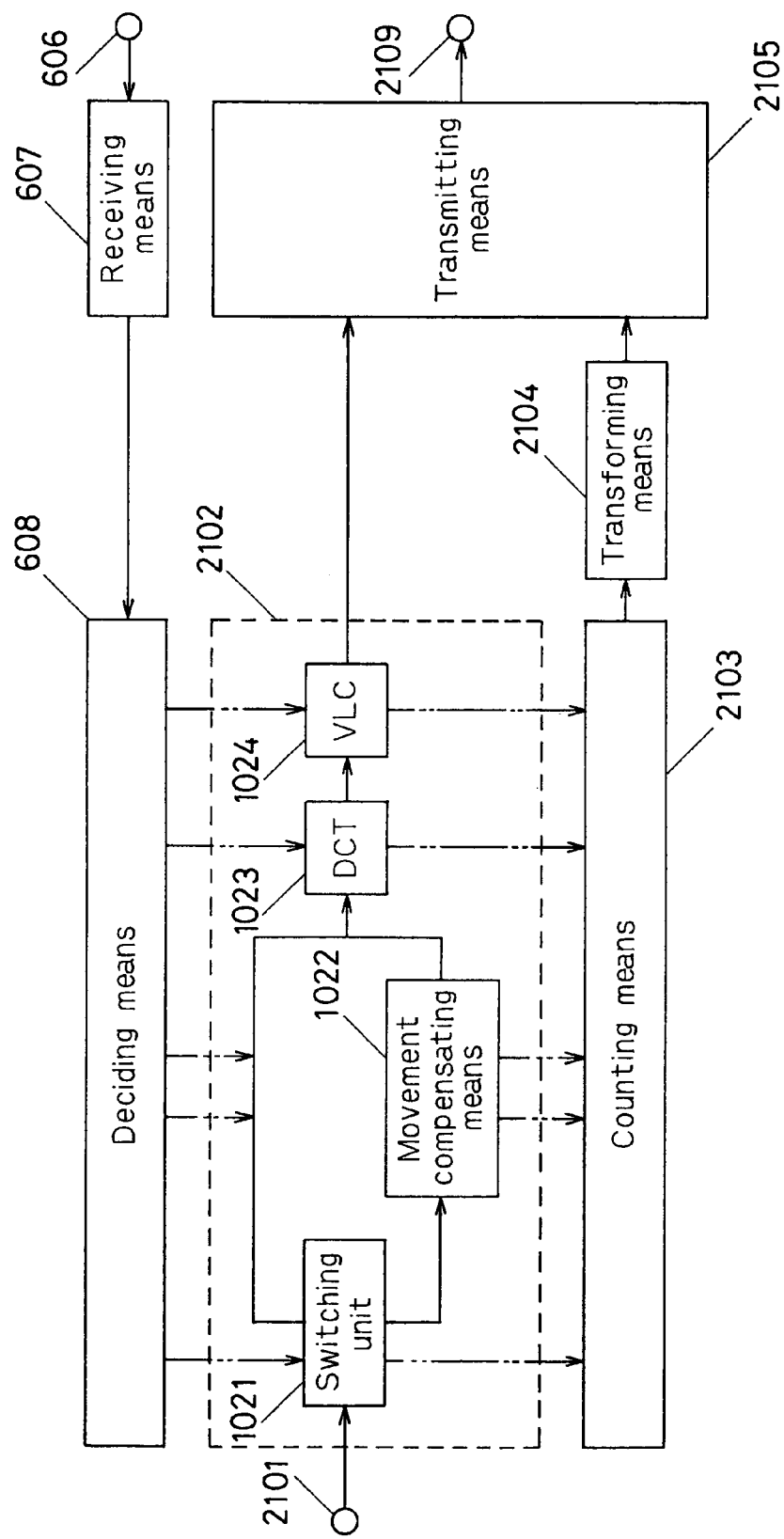
FIG. 38 is a block diagram of the transmitter of the sixth embodiment of the present invention.

FIG. 38 shows the structure of the transmitter of the sixth embodiment.

Most components of this embodiment are the same as those described for the first embodiment. However, two added components are described below. Symbol 606 denotes an input terminal for receiving a data string output by the receiver of the third embodiment and 607 denotes receiving means for receiving the data string and outputting the execution time of each element. Symbol 608 denotes deciding means for obtaining the execution frequency of each element and its obtaining procedure is described below. First, every macroblock in a picture is processed by the switching unit 1021 to obtain the execution frequency of the switching unit 1021 at this point of time. Moreover, it is possible to uniquely decide execution frequencies by the movement compensating means 1022, orthogonal transforming means 1023, and variable-length encoding means 1024 in accordance with the processing result up to this point of time. Therefore, the execution time required for decoding at the receiver side is estimated by using these execution frequencies and the execution time sent from the receiving means 607. The estimated decoding time is obtained as the total sum of the product between the execution time and execution frequency of each element every element. Moreover, when the estimated decoding time is equal to or more than the time required to transmit the number of codes (e.g. 16 Kbits) to be generated through this picture designated by a rate controller or the like (e.g. 250 msec when a transmission rate is 64 Kbits/sec), the execution frequency of fullpixel prediction is increased and the execution frequency of halfpixel prediction is decreased so that the estimated decoding execution time does not exceed the time required for transmission. (Because fullpixel prediction has a shorter execution time, it is possible to reduce the execution time of fullpixel prediction by reducing the frequency of fullpixel prediction.)

Moreover, the video encoder 2102 performs various processings in accordance with the execution frequency designated by the deciding means 608. For example, after the movement compensating means 1022 executes halfpixel prediction by the predetermined execution frequency of halfpixel prediction, it executes only fullpixel prediction.

Furthermore, it is possible to improve the selecting method so that halfpixel prediction is uniformly dispersed in a picture. For example, it is possible to use a method of first obtaining every macroblock requiring halfpixel prediction, calculating the product (3) obtained by dividing the number of the above macroblocks (e.g. 12) by the execution frequency of halfpixel prediction (e.g. 4), and applying halfpixel prediction only to a macroblock whose sequence from the beginning of the macroblocks requiring halfpixel prediction is divided by the above product without a remainder (0, 3, 6, or 9).

According to the above-described fifth and sixth embodiments, the execution time of each estimated element is transmitted to the transmitting side, the execution time of decoding is estimated at the transmitting side, and halfpixel prediction having a long execution time is replaced with fullpixel prediction so that the estimated decoding execution time does not exceed the time (designated time) probably required to receive the data for one sheet. Thereby, the information for halfpixel prediction among the sent encoded information is not disused and thereby, it is possible to prevent an execution time from exceeding a designated time and solve the problem (C2).

Moreover, in the case of dispensable processing, it is possible to divide inter-macroblock encoding into such three movement compensations as normal movement compensation, 8×8 movement compensation, and overlap movement compensation.

Figure 42:
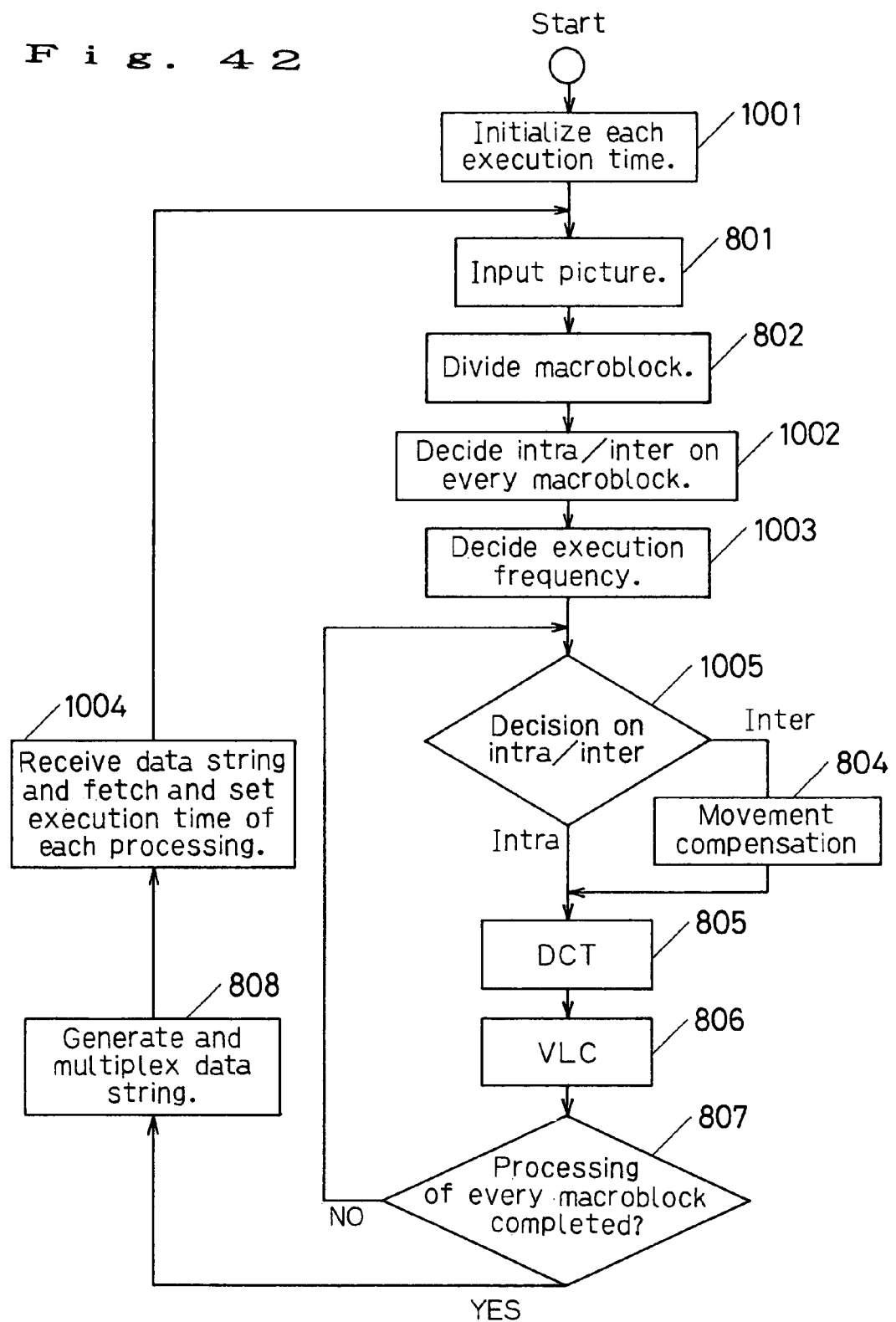
FIG. 42 is a flowchart of the transmission method of the seventh embodiment of the present invention.

FIG. 42 is a flowchart of the transmitting method of the seventh embodiment.

Because operations of this embodiment are similar to those of the sixth embodiment, corresponding elements are added. In step 1001, the initial value of the execution time of each processing is set. A picture is input (input terminal 2101) in step 801 and it is divided into macroblocks in step 802. In step 1002, it is decided whether to intra-encode or inter-encode every macroblock (switching unit 1021). Resultantly, the execution frequency of each processing from step 1005 to step 806 is known. Therefore, in step 1003, an actual execution frequency is calculated in accordance with the above execution frequency and the execution time of each processing (deciding means 608).

Hereafter, the processings from step 1005 to step 806 are repeated until the processing for every macroblock is completed in accordance with the conditional branch in step 807.

Moreover, when each processing is executed, a corresponding variable is incremented by 1 so that the processing frequencies from step 1005 to step 806 can be recorded in a specific variable. First, in step 1005, branching is performed in accordance with the decision result in step 1002 (switching unit 1021). In the case of inter-encoding, movement compensation is performed in step 804 (movement compensating means 1022). In this case, the frequency of halfpixel prediction is counted. When the counted frequency exceeds the actual frequency obtained in step 1003, fullpixel prediction is executed instead without executing halfpixel prediction. Thereafter, in steps 805 and 806, DCT transformation and variable-length encoding are performed (orthogonal transforming means 1023 and variable-length encoding means 1024). When the processing for every macroblock is completed, (in the case of Yes in step 807), the variable showing the execution frequency corresponding to each processing is read in step 808, the data string shown in FIG. 2 is generated, and the data string and a code are multiplexed and output. In step 1004, the data string is received and the execution time of each processing is fetched from the data string and set.

Processings from step 801 to step 1004 are repeatedly executed as long as pictures are input.

According to the paragraph beginning with the final "Moreover" of the descriptive portion of the fifth embodiment and the seventh embodiment, the estimated execution time of each element is transmitted to the transmitting side, the execution time of decoding is estimated at the transmitting side, and halfpixel prediction having a long execution time is replaced with fullpixel prediction so that the estimated decoding execution time does not exceed the time (designated time) probably required to receive the data for one sheet. Thereby, the information for halfpixel prediction among the sent encoded information is not disused and it is possible to prevent the execution time from exceeding the designated time and solve the problem (C2).

Figure 39:
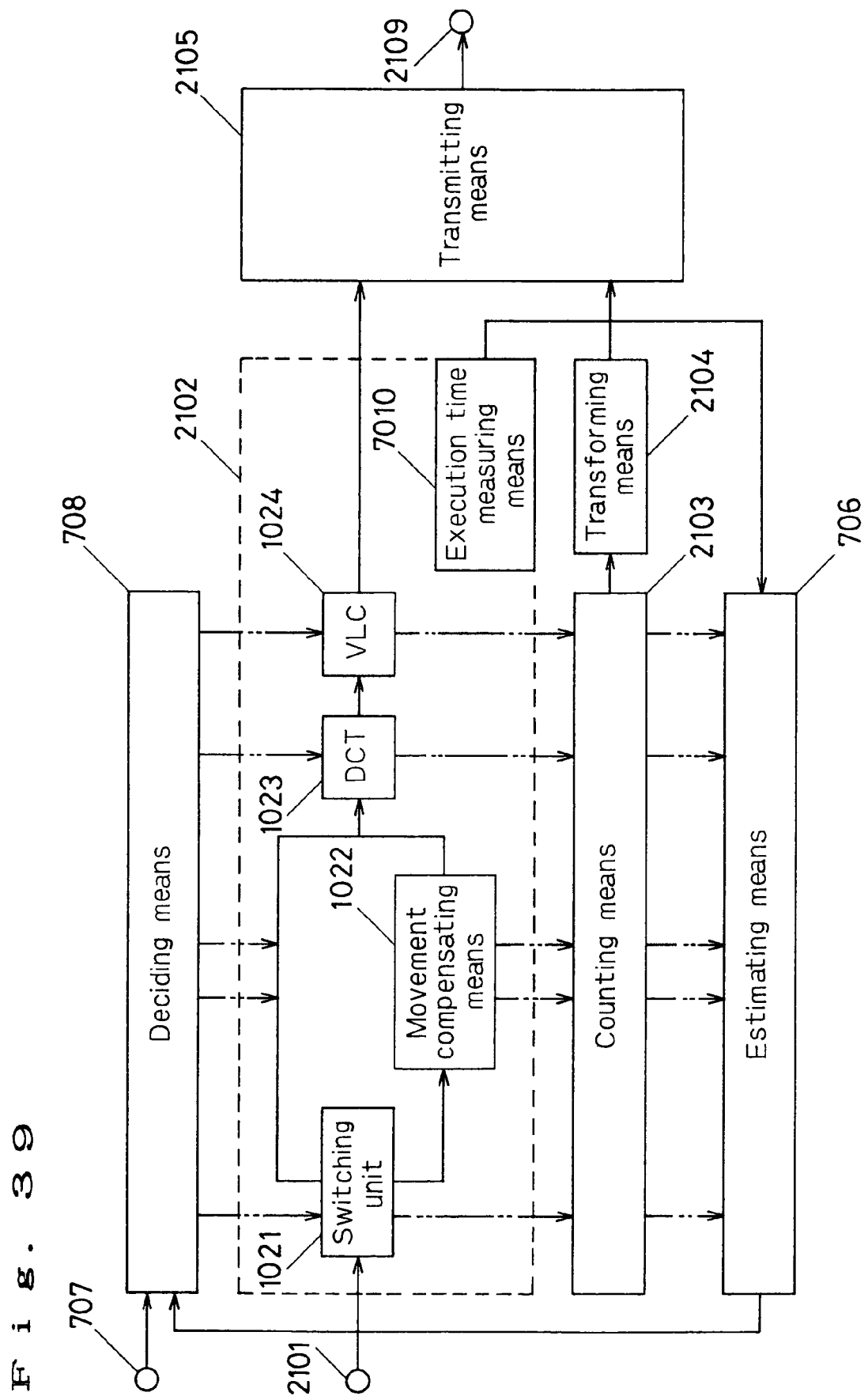
FIG. 39 is a block diagram of the transmitter of the eighth embodiment of the present invention.

FIG. 39 shows the structure of the transmitting apparatus of the eighth embodiment of the present invention.

Most components of this embodiment are the same as those described for the first embodiment. Therefore, four added components are described below.

Symbol 7010 denotes execution-time measuring means for measuring the execution time until encoding and outputting of a picture are completed after the picture is input to an encoder 2102 and outputting the measured execution time. Symbol 706 denotes estimating means for receiving execution frequencies of elements (switching unit 1021, movement compensating means 1022, orthogonal transforming means 1023, and variable-length decoding means 1024) of a data string from counting means 2103 and the execution time from the execution-time measuring means 7010 and estimating the execution time of each element. It is possible to use an estimating method same as that described for the estimating means 302 of the second embodiment. Symbol 707 denotes an input terminal for inputting a frame rate value sent from a user and 708 denotes deciding means for obtaining the execution frequency of each element. The obtaining procedure is described below.

First, every macroblock in a picture is processed by the switching unit 1021 to obtain the execution frequency of the switching unit 1021 at this point of time. Thereafter, it is possible to uniquely decide execution frequencies by the movement compensating means 1022, orthogonal transforming means 1023, and variable-length encoding means 1024 in accordance with the processing result up to this point of time. Then, the total sum of products between the execution frequency and the estimated execution time of each element sent from the estimating means 706 is obtained every element to calculate an estimated encoding time. Then, when the estimated encoding time is equal to or longer than the time usable for encoding of a sheet of picture obtained from the inverse number of the frame rate sent from symbol 707, the execution frequency of fullpixel prediction is increased and that of halfpixel prediction is decreased.

By repeating the above change of execution frequencies and calculation of the estimated encoding time until the estimated encoding time becomes equal to or shorter than the usable time, each execution frequency is decided.

Moreover, the video encoder 2102 performs various processings in accordance with the execution frequency designated by the deciding means 608. For example, after the movement compensating means 1022 executes halfpixel prediction by the predetermined execution frequency of halfpixel prediction, it executes only fullpixel prediction.

Furthermore, it is also possible to improve a selecting method so that halfpixel prediction is uniformly dispersed in a picture. For example, it is possible to use a method of obtaining every macroblock requiring halfpixel prediction, calculating the product (3) obtained by dividing the number of macroblocks requiring halfpixel prediction (e.g. 12) by the execution frequency of halfpixel prediction (e.g. 4), and applying halfpixel prediction only to a macroblock whose sequence from the beginning of the macroblocks requiring halfpixel prediction is divided by the product without remainder (0, 3, 6, or 9).

The above eighth embodiment makes it possible to solve the problem (C3) by estimating the execution time of each processing, estimating an execution time required for encoding in accordance with the estimated execution time, and deciding an execution frequency so that the estimated encoding time becomes equal to or shorter than the time usable for encoding of a picture determined in accordance with a frame rate.

Moreover, because the movement compensating means 1022 detects a movement vector, there is a full-search movement-vector detecting method for detecting a vector for minimizing SAD (sum of absolute values of differences every pixel) among vectors in a range of 15 horizontal and vertical pixels. Furthermore, there is a three-step movement-vector detecting method (described in annex of H.261). The three-step movement-vector detecting method executes the processing of selecting nine points uniformly arranged in the above retrieval range to select a point having a minimum SAD and then, selecting nine points again in a narrow range close to the above point to select a point having a minimum SAD one more time.

It is also possible to properly decrease the execution frequency of the full-search movement-vector detecting method and properly increase the execution frequency of the three-step movement-vector detecting method by regarding these two methods as a dispensable processing method and estimating the execution time of each of the two methods, estimating an execution time required for encoding in accordance with the estimated execution time so that the estimated execution time becomes equal to or shorter than the time designated by a user.

Moreover, it is possible to use a movement-vector detecting method using a fixed retrieval frequency and further simplifying the processing or a movement-vector detecting method of returning only the movement vector (0, 0) as a result together with the three-step movement-vector detecting method.

Figure 43:
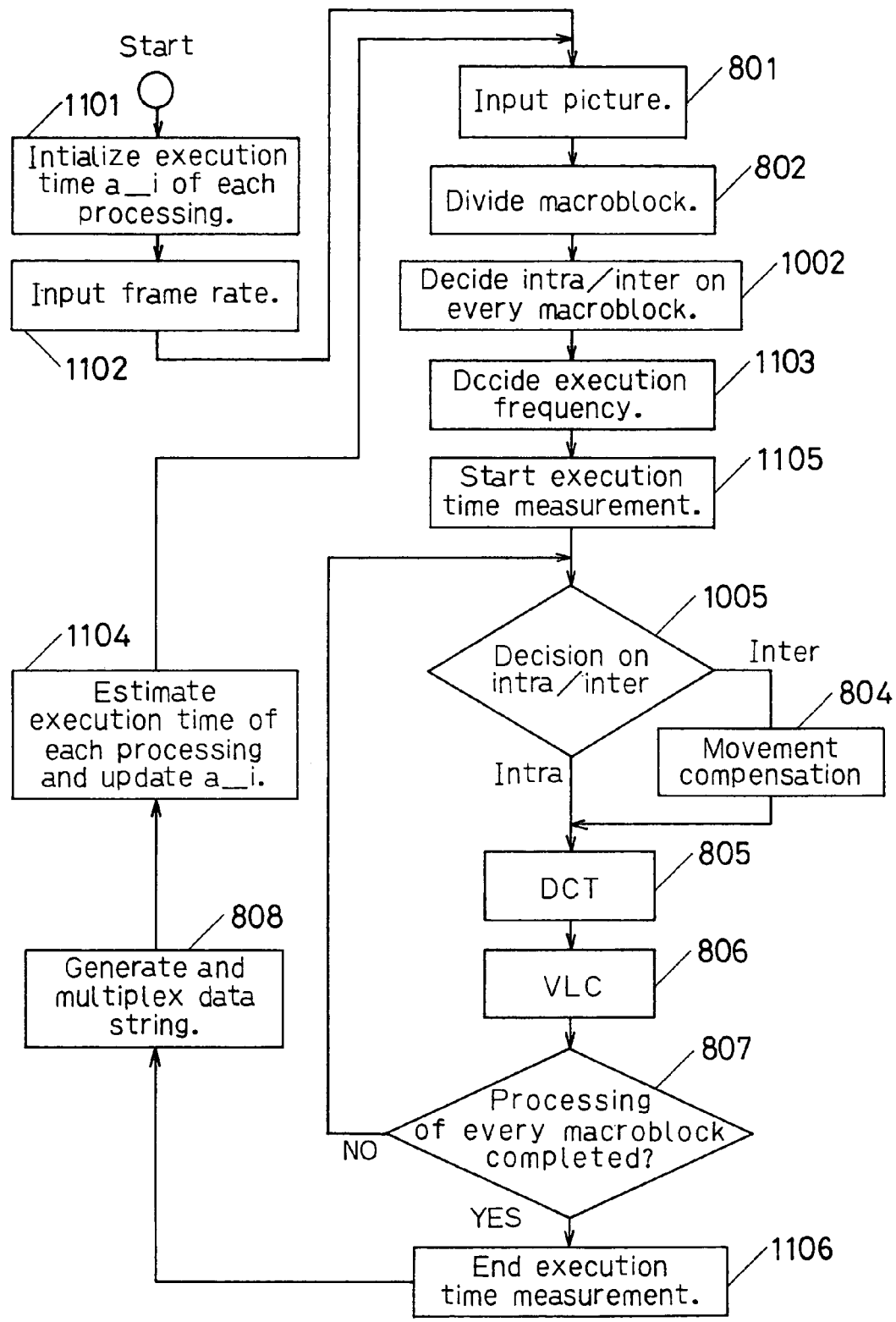
FIG. 43 is a flowchart of the transmission method of the ninth embodiment of the present invention.

FIG. 43 is a flowchart of the transmitting method of the ninth embodiment.

Because operations of this embodiment are similar to those of the eighth embodiment, corresponding elements are added. For the detailed operation in each flow, refer to the description of corresponding elements.

Moreover, because this embodiment is almost the same as the second embodiment, only different points are explained below.

In step 1101, the initial value of the execution time of each processing is set to a variable a_i. Moreover, in step 1102, a frame rate is input (input terminal 707). In step 1103, an actual execution frequency is decided in accordance with the frame rate and the execution time a_i of each processing in step 1102 and the execution frequency of each processing obtained from the intra-/inter-processing decision result in step 1002 (deciding means 708). In steps 1105 and 1106, the execution time of encoding is measured. In step 1104, the execution time of each processing is estimated in accordance with the execution time obtained in step 1106 and the actual execution frequency of each processing to update the variable a_i (estimating means 706).

According to the above-described ninth embodiment, the execution time of each processing is estimated and an execution time required for encoding is previously measured in accordance with the estimated execution time. Thus, it is possible to solve the problem (C3) by deciding an actual execution frequency so that the estimated encoding time becomes the time usable for the encoding of a picture determined in accordance with a frame rate or shorter.

In the case of the second embodiment, it is also possible to add a two-byte region immediately after the start code shown in FIG. 2 when the data string is generated in step 808 and add the binary notation of a code length to the region.

Moreover, in the case of the fourth embodiment, it is also possible to extract a code length from the two-byte region when multiplexed data is input in step 902 and use the code transmission time obtained from the code length and the code transmission rate for the execution frequency calculation in step 905 (the execution frequency of halfpixel prediction is decreased so as not to exceed the code transmission time).

Furthermore, in the case of the first embodiment, it is also possible to add a two-byte region immediately after the start code shown in FIG. 2 when a data string is generated in step 2104 and add the binary notation of a code length to the region.

Furthermore, in the case of the third embodiment, it is also possible to extract a code length from the two-byte region when multiplexed data is input in step 301 and use a code transmission time obtained from the code length and the code transmission rate for the execution frequency calculation in step 304 (the execution frequency of halfpixel prediction is decreased so as not to exceed the code transmission time).

Furthermore, in the case of the fourth embodiment, an actual execution frequency of halfpixel prediction is recorded immediately after step 909 to calculate a maximum value. When the maximum value is equal to or less than a small-enough value (e.g. 2 or 3), it is also possible to generate a data string (data string comprising a specific bit pattern) showing that halfpixel prediction is not used and transmit the generated data string. Furthermore, in the case of the second embodiment, it is confirmed whether the data string is received immediately after step 808 and when the data string showing that halfpixel prediction is not used is received, it is also possible to make movement compensation processing always serve as fullpixel prediction in step 808.

Furthermore, the above concept can be applied to cases other than movement compensation. For example, it is possible to reduce the DCT calculation time by using no high-frequency component for DCT calculation. That is, in the case of a receiving method, when the rate of the IDCT-calculation execution time to the entire execution time exceeds a certain value, a data string showing that the rate exceeds a certain value is transmitted to the transmitting side. When the transmitting side receives the data string, it is also possible to calculate only low-frequency components through the DCT calculation and decrease all high-frequency components to zero.

Furthermore, though the embodiment is described above by using a picture, it is possible to apply each of the above methods to audio instead of video.

Furthermore, in the case of the third embodiment, an actual execution frequency of halfpixel prediction is recorded in step 3034 to calculate a maximum execution frequency. Then, when the maximum value is a small-enough value or less (e.g. 2 or 3), it is possible to generate and transmit a data string showing that halfpixel prediction is not used (data string comprising a specific bit pattern). Furthermore, in the case of the first embodiment, when receiving a data string showing that halfpixel prediction is not used, it is possible to make the movement compensation processing in step 1022 always serve as fullpixel prediction.

Furthermore, the above concept can be applied to cases other than movement compensation. For example, by using no high-frequency component for DCT calculation, it is possible to reduce the DCT calculation processing time. That is, in the case of a receiving method, when the rate of IDCT-calculation execution time to the entire execution time exceeds a certain value, a data string showing that the rate exceeds a certain value is transmitted to the transmitting side.

When the transmitting side receives the data string, it is possible to calculate only low-frequency components through the DOT calculation and reduce all high-frequency components to zero.

Furthermore, though the embodiment is described above by using a picture, it is also possible to apply the above method to audio instead of picture.

As described above, according to the first and third embodiments, the execution time of decoding is estimated in accordance with the estimated execution time of each element and, when the estimated decoding execution time may exceed the time (designated time) required to receive the data for one sheet, halfpixel prediction having a long execution time is replaced with fullpixel prediction. Thereby, it is possible to prevent the execution time from exceeding the designated time and solve the problem (C1).

Furthermore, according to the fifth and seventh embodiments, the estimated execution time of each element is transmitted to the transmitting side, the execution time of decoding is estimated at the transmitting side, and halfpixel prediction having a long execution time is replaced with fullpixel prediction so that the estimated decoding time does not exceed the time (designated time) probably required to receive the data for one sheet. Thereby, the information for halfpixel prediction in the sent encoded information is not disused and it is possible to prevent the execution time from exceeding the designated time and solve the problem (C2).

Furthermore, according to the ninth embodiment, it is possible to solve the, problem (C3) by estimating the execution time of each processing, moreover estimating the execution time required for encoding in accordance with the estimated execution time, and deciding an executing frequency so that the estimated encoding time becomes equal to or less than the time usable for encoding of a picture decided in accordance with a frame rate.

Thus, the present invention makes it possible to realize a function (CGD: Computational Graceful Degradation) for slowly degrading quality even if a calculated load increases and thereby, a very large advantage can be obtained.

Moreover, it is possible to perform operations same as described above by a computer by using a recording medium such as a magnetic recording medium or optical recording medium in which a program for making the computer execute all or part (or operations of each means) of the each steps (or each means) described in any one of the above-described embodiments.

INDUSTRIAL APPLICABILITY

As described above, the present invention makes it possible to change information frames correspondingly to the situation, purpose, or transmission line by dynamically deciding the frames of data control information, transmission control information, and control information used for transmitting and receiving terminals. Moreover, it is easy to handle a plurality of video streams or a plurality of audio streams and mainly reproducing an important scene cut synchronously with audio by reflecting the intention of an editor. Furthermore, it is possible to prevent an execution time from exceeding a designated time by estimating the execution time of decoding in accordance with the execution time of each estimated element and replacing halfpixel prediction having a long execution time with fullpixel prediction when the estimated decoding execution time may exceed the time (designated time) required to receive the data for one sheet.

The invention claimed is:

1. A transmitting apparatus comprising:
a transmitting unit operable to transmit transmission format information to a receiving apparatus;
wherein said transmission format information includes an identifier, set-up information and starting time information related to said identifier, said identifier identifying content to be activated by said receiving apparatus, said starting time information indicating a starting time for activating said content at a future point of time and said set-up information including an estimated time required for the receiving apparatus to set-up prior to activating said content at the future point of time;
wherein said transmitting unit is operable to repeatedly transmit the transmission format information that includes the starting time information indicating a same starting time for activating said content at the future point of time; and
wherein said content is transmitted to the receiving apparatus before the starting time for activating said content.

2. The transmitting apparatus according to claim 1, wherein said starting time information includes at least one of a flag, a counter, or a timer.

3. The transmitting apparatus according to claim 1, wherein said content includes at least one of program data, audio data, or video data.

4. A transmitting apparatus comprising:
a transmitting unit operable to transmit transmission format information to a receiving apparatus;
wherein said transmission format information includes an identifier, set-up information and processing term information related to said identifier, said identifier identifying content to be activated by the receiving apparatus, said processing term information indicating a term for processing said content in the receiving apparatus at a future point of time and said set-up information including an estimated time required for the receiving apparatus to set-up prior to processing said content at the future point of time;
wherein said transmitting unit is operable to repeatedly transmit the transmission format information that includes the processing term information indicating a same term for processing said content at the future point of time; and
wherein said content is transmitted to the receiving apparatus before the term for processing said content.

5. The transmitting apparatus according to claim 4, wherein said processing term information includes at least one of a flag, a counter, or a timer.

6. A receiving apparatus comprising:
a receiving unit operable to receive transmission format information,
said transmission format information including an identifier, set-up information and starting time information related to said identifier, said identifier identifying content to be activated by said receiving apparatus, said starting time information indicating a starting time for activating said content at a future point of time and said set-up information including an estimated time required for said receiving apparatus to set-up prior to activating said content at the future point of time;
a storing unit operable to store said content; and
a control unit operable to activate said content based on said identifier and based on a comparative result of a current time and said starting time,
wherein said content is stored in the storing unit before the starting time for activating said content.

7. The receiving apparatus according to claim 6, wherein said starting time information includes at least one of a flag, a counter, or a timer.

8. The receiving apparatus according to claim 6, wherein said control unit is operable to activate said content free of manually entered information.

9. The receiving apparatus according to claim 6, wherein said receiving apparatus is operable to estimate a setup time required for activating said content.

10. A receiving apparatus comprising:
a receiving unit operable to receive transmission format information,
said transmission format information including an identifier, set-up information and processing term information related to said identifier, said identifier identifying content to be activated by said receiving apparatus, said processing term information indicating a term for processing said content in said receiving apparatus at a future point of time and said set-up information including an estimated time required for said receiving apparatus to set-up prior to processing said content at the future point of time, and
a control unit operable to activate said content based on said identifier and based on a comparative result of a current time and said term for processing,
wherein the receiving unit receives said content before the term for processing said content.

11. The receiving apparatus according to claim 10, wherein said processing term information includes at least one of a flag, a counter, or a timer.

12. The receiving apparatus according to claim 10, wherein said control unit is operable to activate said content free of manually entered information.

13. The receiving apparatus according to claim 10, wherein said receiving apparatus is operable to estimate a setup time required for processing said content.

14. A communication system comprising a transmitting apparatus and a receiving apparatus, said transmitting apparatus including:
a transmitting unit operable to transmit transmission format information to said receiving apparatus, said transmission format information includes an identifier, set-up information and starting time information related to said identifier, said identifier identifying content to be activated by said receiving apparatus, said starting time information indicating a starting time for activating said content in said receiving apparatus at a future point of time and said set-up information including an estimated time required for said receiving apparatus to set-up prior to activating said content at the future point of time, and
said transmitting unit is operable to repeatedly transmit the transmission format information that includes the starting time information indicating a same starting time for activating said content at the future point of time; and
said receiving apparatus including:
a receiving unit operable to receive transmission format information from said transmitting apparatus, and
a control unit operable to activate said content based on said identifier and based on a comparative result of a current time and said starting time,
wherein said content is transmitted to said receiving apparatus before the starting time for activating said content.

15. A communication system comprising a transmitting apparatus and a receiving apparatus, said transmitting apparatus including:
a transmitting unit operable to transmit transmission format information to said receiving apparatus, said transmission format information includes an identifier, set-up information and processing term information related to said identifier, said identifier identifying content to be content to be used by said receiving apparatus, said processing term information indicating a term for processing said content in said receiving apparatus at a future point of time and said set-up information including an estimated time required for said receiving apparatus to set-up prior to processing said content at the future point of time, and
said transmitting unit is operable to repeatedly transmit the transmission format information that includes the processing term information indicating a same term for processing said content at the future point of time;
said receiving apparatus including:
a receiving unit operable to receive transmission format information from said transmitting apparatus, and
a control unit operable to activate said content based on said identifier and based on a comparative result of a current time and said term for processing said content,
wherein said content is transmitted to the receiving apparatus before the term for processing said content.

16. A method of transmitting comprising:
transmitting transmission format information to a receiving apparatus;
wherein said transmission format information includes an identifier, set-up information and starting time information related to said identifier, said identifier identifying content to be activated by the receiving apparatus, said starting time information indicating a starting time for activating said content in the receiving apparatus at a future point of time and said set-up information including an estimated time required for the receiving apparatus to set-up prior to activating said content at the future point of time,
wherein the transmission format information including the starting time information indicating a same starting time for activating said content at the future point of time is repeatedly transmitted to the receiving apparatus; and
wherein said content is transmitted to the receiving apparatus before the starting time for activating said content.

17. A method of transmitting comprising:
transmitting transmission format information to a receiving apparatus;
wherein said transmission format information includes an identifier, set-up information and processing term information related to said identifier, said identifier identifying content to be activated by the receiving apparatus, said processing term information indicating a term for processing said content in the receiving apparatus at a future point of time and said set-up information including an estimated time required for the receiving apparatus to set-up prior to processing said content at the future point of time,
wherein the transmission format information including the processing term information indicating a same term for processing said content at the future point of time is repeatedly transmitted to the receiving apparatus; and
wherein said content is transmitted to the receiving apparatus before the term for processing said content.

18. A method of receiving comprising:
receiving transmission format information, said transmission format information including an identifier, set-up information and starting time information related to said identifier, said identifier identifying content to be activated by a receiving apparatus, said starting time information indicating a starting time for activating said content in the receiving apparatus at a future point of time and said set-up information including an estimated time required for the receiving apparatus to set-up prior to activating said content at the future point of time, and activating said content based on said identifier and based on a comparative result of a current time and said starting time, wherein said content is transmitted to the receiving apparatus before the starting time for activating said content.

19. A method of receiving comprising:

receiving transmission format information, said transmission format information including including an identifier, set-up information and processing term information related to said identifier, said identifier identifying content to be activated by a receiving apparatus, said processing term information indicating a term for processing said content in the receiving apparatus at a future point of time and said set-up information including an estimated time required for the receiving apparatus to set-up prior to processing said content at the future point of time, and activating said content based on said identifier and based on a comparative result of a current time and said term for processing said content, wherein said content is transmitted to the receiving apparatus before the term for processing said content.

20. A method of communicating comprising:

transmitting transmission format information, said transmission format information includes an identifier, set-up information and starting time information related to said identifier, said identifier identifying content, said starting time information indicating a starting time for activating said content at a future point of time and said set-up information including an estimated time required for a receiving apparatus which receives the transmission format information to set-up prior to activating said content at the future point of time;

wherein the transmission format information including the starting time information indicating a same starting time for activating said content at the future point of time is repeatedly transmitted; and receiving the repeatedly transmitted transmission format information; and activating said content based on said identifier and based on a comparative result of a current time and said starting time, wherein said content is transmitted before the starting time for activating said content.

21. A method of communicating comprising:

transmitting transmission format information, said transmission format information includes an identifier, set-up information and processing term information related to said identifier, said identifier identifying content, said processing term information indicating a term for processing said content at a future point of time and said set-up information including an estimated time required for a receiving apparatus which receives the transmission format information to set-up prior to processing said content at the future point of time;

wherein the transmission format information including the processing term information indicating a same term for processing said content at the future point of time is repeatedly transmitted; and receiving the repeatedly transmitted transmission format information; and activating said content based on said identifier and based on a comparative result of a current time and said term for processing said content, wherein said content is transmitted before the term for processing said content.

* * * * *

UNITED STATES PATENT AND TRADEMARK OFFICE
CERTIFICATE OF CORRECTION

PATENT NO. : 7,502,070 B2
APPLICATION NO. : 10/626271
DATED : March 10, 2009
INVENTOR(S) : Takao Yamaguchi et al.

Page 1 of 1

It is certified that error appears in the above-identified patent and that said Letters Patent is hereby corrected as shown below:

<u>Column 49</u>

At claim 19, line 8, "including including" should read -- including --.

Signed and Sealed this

Seventh Day of July, 2009

JOHN DOLL
*Acting Director of the United States Patent and Trademark Office*